United States Patent [19]

Mochizuki

[11] Patent Number: 5,490,278

[45] Date of Patent: Feb. 6, 1996

[54] DATA PROCESSING METHOD AND APPARATUS EMPLOYING PARALLEL PROCESSING FOR SOLVING SYSTEMS OF LINEAR EQUATIONS

[75] Inventor: Yoshiyuki Mochizuki, Osaka, Japan

[73] Assignee: Matsushita Electric Industrial Co., Ltd., Osaka, Japan

[21] Appl. No.: 912,180

[22] Filed: Jul. 13, 1992

[30] Foreign Application Priority Data

Jul. 12, 1991 [JP] Japan .................................... 3-172168
Jul. 15, 1991 [JP] Japan .................................... 3-173616

[51] Int. Cl.⁶ ............................ G06F 17/16; G06F 17/11
[52] U.S. Cl. ...................... 395/800; 364/735; 364/931.4; 364/931.41; 364/937.1; 364/DIG. 2
[58] Field of Search ............................ 395/800; 364/735, 364/754, 724.05, 807

[56] References Cited

U.S. PATENT DOCUMENTS

| | | | |
|---|---|---|---|
| 4,787,057 | 11/1988 | Hammond | 364/754 |
| 5,113,523 | 5/1992 | Colley et al. | 395/800 |
| 5,274,832 | 12/1993 | Khan | 395/800 |
| 5,301,342 | 4/1994 | Scott | 395/800 |

OTHER PUBLICATIONS

B. Smith et al, "Sparse Matrix Computations on an FFP Machine," IEEE, Oct. 1988, pp. 215–218.
A. El–Amawy et al, "Efficient Linear and Bilinear Arrays for Matrix Triangularisation with Partial Pivoting," IEE Proceedings, vol. 137, No. 4, Jul. 1990, pp. 295–300.
Transaction Of The Institute Of Electronics, Information And Communications Engineers Of Japan, vol. 72, No. 12, Dec. 1989, Tokyo, Japan, pp. 1336–1343, Nobuyuki Tanaka et al. "Special Parallel Machine for LU Decomposition of a Large Scale Circuit Matrix and Its Performance".
Parallel Computing, vol. 11, No. 4, Aug. 1989, Amsterdam, NL, pp. 201–221, Gita Alaghband, "Parallel Pivoting Combined with Parallel Reduction and Fill–In Control".
IEEE Transactions On Computers, vol. 32, No. 12, Dec. 1983, New York, US, pp. 1109–1117, Mandayam A. Srinivas, "Optimal Parallel Scheduling of Gaussian Elimination DEG's".
Parallel Computing, vol. 13, No. 3, Mar. 1990, Amsterdam, NL, pp. 289–294, Hyoung Joong Kim et al., "A Parallel Algorithm Solving Tridiagonal Toeplitz Linear System".
Proceedings Of The 1989 Power Industry Computer Application Conference, IEEE Press, New York, US, 1 May 1989, Seattle, Washington, US, pp. 9–15, D. C. Yu et al., "A New Approach for the Forward and Backward Substitution of Parallel Solution of Sparse Linear Equations Based on Dataflow Architecture".
Proceedings Of The IEEE 1983 International Symposium On Circuits And Systems, IEEE Press, New York, US, vol. 1/3, 2 May 1983, Newport Beach, California, US, pp. 214–217, R. M. Kieckhafer et al., "A Clustered Processor Array for the Solution of the Unstructured Sparse Matrix Equations".
Proceedings Of The 1986 IBM Europe Instutute Seminar On Parallel Computing, North Holland Amsterdam NL, 11 Aug. 1986, Oberlech, Austria, pp. 99–106, Iain S. Duff, "Parallelism in Sparse Matrices".

Primary Examiner—Thomas G. Black
Assistant Examiner—Paul Harrity
Attorney, Agent, or Firm—Wenderoth, Lind & Ponack

[57] ABSTRACT

A linear calculating equipment comprises a memory for storing a coefficient matrix, a known vector and an unknown vector of a given system of linear equations, a pivoting device for choosing pivots of the matrix, a plurality of preprocessors for executing K steps of preprocessing for multi-pivot simultaneous elimination, an updating device for updating the elements of the matrix and the components of the vectors, a register set for storing values of the variables, a back-substitution device for obtaining a solution and a main controller for controlling the linear calculating equipment as a whole.

13 Claims, 22 Drawing Sheets

DATA PROCESSING METHOD AND APPARATUS EMPLOYING PARALLEL PROCESSING FOR SOLVING SYSTEMS OF LINEAR EQUATIONS

BACKGROUND OF THE INVENTION

1. Field of the Invention

The present invention relates to calculating equipment for solving systems of linear equations, parallel calculating equipment for solving systems of linear equations, and methods of parallel computation for solving systems of linear equations.

2. Description of the Related Art

The need for solving systems of linear equations at high speed frequently arises in numerical analysis of the finite element method and the boundary element method and other processes of technical calculation.

Among algorithms based on direct methods of solving systems of linear equations is Gauss elimination method based on bi-pivot simultaneous elimination, which is described in Takeo Murata, Chikara Okuni and Yukihiko Karaki, "Super Computer-Application to Science and Technology," Maruzen 1985 pp 95–96. The bi-pivot simultaneous elimination algorithm eliminates two columns at the same time by choosing two pivots at one step. It limits simultaneous elimination to two columns and the choice of pivots to partial pivoting by row interchanges. Furthermore it considers the speeding up of its process in terms of numbers of repetition of do-loops only.

If simultaneous elimination is not limited to two columns and extended to more than two columns, the corresponding algorithms will be hereafter called multi-pivot simultaneous elimination algorithms.

A similar algorithm to multi-pivot simultaneous elimination algorithms is described in Jim Armstrong, "Algorithm and Performance Notes for Block LU Factorization," International Conference on Parallel Processing, 1988, Vol. 3, pp 161–164. It is a block LU factorization algorithm intended to speed up matrix operations and should be implemented in vector computers or computers with a few multiplexed processors.

Therefore, according to prior art, there has not yet been developed Gauss elimination method or Gauss-Jordan elimination method which is based on multi-pivot simultaneous elimination and can be efficiently implemented in scalar computers and parallel computers.

SUMMARY OF THE INVENTION

The object of the present invention is therefore to provide high-speed parallel calculating equipment and methods of parallel computation for solving systems of linear equations by means of Gauss elimination method and Gauss-Jordan's method based on multi-pivot simultaneous elimination.

In order to achieve the aforementioned objective, according to one aspect of the present invention, there are provided a memory that stores reduced coefficient matrices $A^{(r)}$ with zeroes generated from the first to the r-th column and corresponding known vectors $b^{(r)}$ and an unknown vector x expressed by $$A^{(r)} = (a_{ij}^{(r)}), \quad 1 \leq i, j \leq n,$$

$$b^{(r)} = (b_1^{(r)}, b_2^{(r)}, \ldots, b_n^{(r)})^t,$$ (1)

$$x = (x_1, x_2, \ldots, x_n)^t$$

for a given system of linear equations $$A^{(0)} x = b^{(0)}.$$ (2)

a pivot choosing section that is connected to the memory, chooses a pivot in the i-th row of $A^{(i-1)}$, and interchanges the i-th column with the chosen pivotal column, a preprocessing section $A_1$ that, immediately after the pivot choosing section's above operation determines the transposed pivot $$a_{pk+1 pk+1,}^{(pk)}$$ (3)

calculates $$a_{pk+1 j}^{(pk+1)} = a_{pk+1 j}^{(pk)} / a_{pk+1 pk+1,}^{(pk)}$$ (4)

for $pk+2 \leq j \leq n$ and $$b_{pk+1}^{(pk+1)} = b_{pk+1}^{(pk)} / a_{pk+1 pk+1,}^{(pk)}$$ (5)

k−1 preprocessing sections $A_t$, where $t=2, 3, \ldots, k$, each of which is connected to the memory and calculates $$Reg^{(0)}{}_{pk+t} = a^{(pk)}{}_{pk+t pk+1},$$ (6)

$$Reg^{(1)}{}_{pk+t} = a^{(pk)}{}_{pk+t pk+2} - Reg^{(0)}{}_{pk+t} a^{(pk+1)}{}_{pk+1 pk+2},$$ (7)

$\ldots,$ $$Reg^{(t-2)}_{pk+t} = a^{(pk)}_{pk+t pk+t-1} - \sum_{m=1}^{t-2} Reg^{(m-1)}_{pk+t} a^{(pk+m)}_{pk+m pk+t-1},$$ (8)

$$a^{(pk+t-1)}_{pk+t j} = a^{(pk)}_{pk+t j} - \sum_{m=1}^{t-1} Reg^{(m-1)}_{pk+t} a^{(pk+m)}_{pk+m j},$$ (9)

$$b^{(pk+t-1)}_{pk+t} = b^{(pk)}_{pk+t} - \sum_{m=1}^{t-1} Reg^{(m-1)}_{pk+t} b^{(pk+m)}_{pk+m},$$ (10)

for $pk+t \leq j \leq n$, and, immediately after the pivot choosing section determines the transposed pivot $$a_{pk+t pk+t,}^{(pk+t-1)}$$ (11)

calculates $$a_{pk+t j}^{(pk+t)} = a_{pk+t j}^{(pk+t-1)} / a_{pk+t pk+t,}^{(pk+t-1)}$$ (12)

$$b_{pk+t}^{(pk+t)} = b_{pk+t}^{(pk+t-1)} / a_{pk+t pk+t,}^{(pk+t-1)}$$ (13)

for $pk+t+1 \leq j \leq n$, an updating section B that is connected to the memory, comprises a set of k registers and an arithmetic unit, and calculates $$Reg_i^{(0)} = a^{(pk)}{}_{i pk+1},$$ (14)

$$Reg_i^{(1)} = a^{(pk)}{}_{i pk+2} - Reg_i^{(0)} a^{(pk+1)}{}_{pk+1 pk+2},$$ (15)

$\ldots$ $$Reg_i^{(k-1)} = a^{(pk)}_{i(p+1)k} - \sum_{m=1}^{k-1} Reg_i^{(m-1)} a^{(pk+m)}_{pk+m (p+1)k},$$ (16)

$$a_{ij}^{((p+1)k)} = a_{ij}^{(pk)} - \sum_{m=1}^{k} Reg_i^{(m-1)} a^{(pk+m)}_{pk+m j},$$ (17)

$$b_i^{((p+1)k)} = b_i^{(pk)} - \sum_{m=1}^{k} Reg_i^{(m-1)} b^{(pk+m)}_{pk+m},$$ (18)

for $(p+1)k+1 \leq i, j \leq n$ retaining the values of $Reg_i^{(0)}, \ldots, Reg_i^{(k)}$ in the register set, a back-substitution section that is connected to the memory and obtains the value of the unknown vector x by calculating $$x_i = b_i^{(n)} \tag{19}$$

and $$b_h^{(n+h-i+1)} = b_h^{(n+h-i)} - a_{hi}^{(h)} x_i \tag{20}$$

for $1 \leq h \leq i-1$ for $i=n, n-1, \ldots, 1$ in this order of i, and a main controller G that, if n is a multiple of k, instructs the pivot choosing section, the preprocessing sections $A_1, \ldots, A_k$, and the updating section B to repeat their above operations for $p=0, 1, \ldots, n/k-2$, and instructs the pivot choosing section and the preprocessing sections $A_1, \ldots, A_k$ to execute their above operations for $p=n/k-1$, and, if n is not a multiple of k, instructs the pivot choosing section, the preprocessing sections $A_1, \ldots, A_k$, and the updating section B to repeat their above operations for $p=0, 1, \ldots [n/k]-1$, where [x] denotes the greatest integer equal or less than x, and instructs the pivot choosing section and the preprocessing sections $A_1, \ldots, A_{n-[n/k]k}$ to execute their above operations, and in both cases, instructs the back-substitution section to obtain the unknown vector x.

According to another aspect of the present invention there are provided a memory that stores coefficient matrices $A^{(r)}$, known vectors $b^{(r)}$ and the unknown vector x expressed by (1) for a given system of linear equations (2), a pivot choosing section that is connected to the memory, chooses a pivot in the i-th row of $A^{(i-1)}$, and interchanges the i-th column with the chosen pivotal column, a preprocessing section $A_1$ that, immediately after the pivot choosing section's above operation determines the transposed pivot (3), calculates (4) for $pk+2 \leq j \leq n$ and (5), $k-1$ preprocessing sections $A_t$, where $t=2, 3, \ldots, k$, each of which is connected to the memory, calculates (6), (7), ..., (10) for $pk+t \leq j \leq n$, and, immediately after the pivot choosing section determines the transposed pivot (11), calculates (12) and (13) for $pk+t+1 \leq j \leq n$, an updating section B' which is connected to the memory, comprises a set of k registers and an arithmetic unit, and calculates (14), (15), ..., (18) for $1 \leq i \leq pk$, $(p+1)k+1 \leq i \leq n$, $(p+1)k+1 \leq j \leq n$ if n is a multiple of k or $p<[n/k]$ and for $1 \leq i \leq [n/k]k$, $[n/k]k+1 \leq j \leq n$ otherwise, retaining the values of $\text{Reg}_i^{(0)}, \ldots, \text{Reg}_i^{(k)}$ in the register set, $k-1$ postprocessing sections $C_t$, where $t=1, 2, \ldots, k-1$, each of which is connected to the memory and calculates $$\text{Reg}^{(0)} = a_{pk+1 pk+t+1,}^{(pk+t)} \tag{21}$$

$$\text{Reg}^{(1)} = a_{pk+2 pk+t+1,}^{(pk+t)} \tag{22}$$

$$\text{Reg}^{(t-1)} = a_{pk+t pk+t+1,}^{(pk+t)} \tag{23}$$

$$a_{pk+1j}^{(pk+t+1)} = a_{pk+1j}^{(pk+t)} - \text{Reg}^{(0)} a_{pk+t+1j,}^{(pk+t+1)} \tag{24}$$

$$a_{pk+2j}^{(pk+t+1)} = a_{pk+2j}^{(pk+t)} - \text{Reg}^{(1)} a_{pk+t+1j,}^{(pk+t+1)} \tag{25}$$

$$a_{pk+tj}^{(pk+t+1)} = a_{pk+tj}^{(pk+t)} - \text{Reg}^{(t-1)} a_{pk+t+1j,}^{(pk+t+1)} \tag{26}$$

$$b_{pk+1}^{(pk+t+1)} = b_{pk+1}^{(pk+t)} - \text{Reg}^{(0)} b_{pk+t+1,}^{(pk+t+1)} \tag{27}$$

$$b_{pk+2}^{(pk+t+1)} = b_{pk+2}^{(pk+t)} - \text{Reg}^{(1)} b_{pk+t+1,}^{(pk+t+1)} \tag{28}$$

$$b_{pk+t}^{(pk+t+1)} = b_{pk+t}^{(pk+t)} - \text{Reg}^{(t-1)} b_{pk+t+1,}^{(pk+t+1)} \tag{29}$$

for $pk+t+2 \leq j \leq n$, a main controller J that, if n is a multiple of k, instructs the pivot choosing section, the preprocessing sections $A_1, \ldots,$ $A_k$, the updating section B', and the postprocessing sections $C_1, \ldots, C_{k-1}$ to repeat their above operations for $p=0, 1, \ldots, n/k-1$, and, if n is not a multiple of k, instructs the pivot choosing section, the preprocessing sections $A_1, \ldots, A_k$, the updating section B', and the postprocessing sections $C_1, \ldots, C_{k-1}$ to repeat their above operations for $p=0, 1, \ldots [n/k]-1$, and instructs the pivot choosing section, the preprocessing sections $A_1, \ldots, A_{n-[n/k]k}$, the updating section B', and the postprocessing sections $C_1, \ldots, C_{n-[n/k]k}$ to execute their above operations for $p=[k/n]$.

According to another aspect of the present invention there is provided a system of nodes $\alpha_0, \ldots, \alpha_{P-1}$, each of which is connected to each other by a network and comprises:

a memory that stores blocks of k rows of each coefficient matrix $A^{(r)}$ and corresponding k components of each known vector $b^{(r)}$ and an unknown vector x expressed by (1) for a given system of linear equations (2), a pivot choosing section that is connected to the memory, chooses a pivot in the i-th row of $A^{(i-1)}$, and interchanges the i-th column with the chosen pivotal column, a preprocessing section $A_1$ that is connected to the memory and calculates (4) for $pk+2 \leq j \leq n$ and (5), $k-1$ preprocessing sections $A_t$, where $t=2, 3, \ldots, k$, each of which is connected to the memory, calculates (6), (7), ..., (10) for $pk+t \leq j \leq n$, and calculates (12) and (13) for $pk+t+1 \leq j \leq n$, an updating section B that is connected to the memory, comprises a set of k registers and an arithmetic unit, and calculates (14), (15), ..., (18) for $(p+1)k+1 \leq j \leq n$ retaining the values of $\text{Reg}_i^{(0)}, \ldots, \text{Reg}_i^{(k)}$ in the register set, a back-substitution section that is connected to the memory and obtains the unknown x by back-substitution, that is, by calculating (19) and (20), a gateway that is connected to the memory and is a junction with the outside, and a transmitter that is connected to the memory and transmits data between the memory and the outside through the gateway.

If the (pk+1)th through (p+1)k-th rows of $A^{(0)}$ and corresponding components of $b^{(0)}$ and x are assigned to the node $\alpha_u$, then the pivot choosing section of the node $\alpha_u$ determines the pivot (3), and the preprocessing section of the node $\alpha_u$ calculates (4) and (5) for $pk+2 \leq j \leq n$, and the transmitter transmits the results to the memory of every other node through the gateway, while the updating section B of the node in charge of the i-th row calculates (14) for every i such that $(p+1)k+1 \leq i \leq n$. This series of operations is below called parallel preprocessing $A_1$.

The preprocessing section $A_t$ of the above node $\alpha_u$ calculates (6), (7), (8), (9), (10) for $pk+t \leq j \leq n$, and, immediately after the pivot choosing section of $\alpha_u$ determines the pivot (11), calculates (12) and (13) for $pk+t+1 \leq j \leq n$, and the transmitter transmits the results to the memory of every other node through the gateway, while the updating section B of the node in charge of the i-th row calculates $$\text{Reg}_i^{(t-1)} = a_{ipk+t}^{(pk)} - \sum_{m=1}^{k-1} \text{Reg}_i^{(m-1)} a_{pk+m pk+t}^{(pk+m)} \tag{30}$$

for every i such that $(p+1)k+1 \leq i \leq n$. This series of operations is below called parallel preprocessing $A_t$, where $2 \leq t \leq k$.

The updating section B of each node in charge of the i-th row such that $(p+1)k+1 \leq i \leq n$ also calculates (14) through (18) retaining the values of $\text{Reg}_i^{(0)}, \ldots, \text{Reg}_i^{(k)}$ in the register set. These operations are below called parallel updating B.

According to a further aspect of the present invention there is provided a main controller $G_p$ that is connected to the system of nodes by the network, distributes and assigns the rows of the coefficient matrix $A^{(0)}$ and the components of $b^{(0)}$ and x to the nodes in such a manner as each block of consecutive k rows and corresponding 2k components is transmitted to the memory of one node in the cyclic order of $\alpha_0, \ldots, \alpha_{P-1}, \alpha_0, \alpha_1, \ldots$, and, if n is a multiple of k, instructs each node to execute parallel preprocessing $A_1$ through $A_k$ and parallel updating B for $p=0, 1, \ldots, n/k-1$, and, if n is not a multiple of k, instructs each node to execute parallel preprocessing $A_1$ through $A_k$ and parallel updating B for $p= 0, 1, \ldots, [n/k]-1$ and to execute parallel preprocessing $A_1$ through $A_{n-[n/k]k}$ for $p=[n/k]$, and instructs the nodes to obtain unknown vector by means of back-substitution.

According to another aspect of the present invention there is provided a system of nodes $\alpha_0, \ldots, \alpha_{P-1}$, each of which is connected to each other by a network and comprises:

a memory that stores blocks of k rows of each coefficient matrix $A^{(r)}$ and corresponding k components of each known vector $b^{(r)}$ and an unknown vector x expressed by (1) for a given system of linear equations (2), a pivot choosing section that is connected to the memory, chooses a pivot in the i-th row of $A^{(i-1)}$, and interchanges the i-th column with the chosen pivotal column, a preprocessing section $A_1$ that is connected to the memory and calculates (4) for $pk+2 \leq j \leq n$ and (5), k-1 preprocessing sections $A_t$, where $t=2, 3, \ldots, k$, each of which is connected to the memory, calculates (6), (7), ..., (10) for $pk+t \leq j \leq n$, and calculates (12) and (13) for $pk+t+1 \leq j \leq n$, an updating section B' that is connected to the memory, comprises a set of k registers and an arithmetic unit, and calculates (14), (15), ..., (18) for $(p+1)k +1 \leq j \leq n$ retaining the values of $Reg_i^{(0)}, \ldots, Reg_i^{(k)}$ in the register set, k-1 postprocessing sections $C_t$, where $t=1, 2, \ldots, k-1$, each of which is connected to the memory and calculates (21), (22), ..., (29) for $pk+2+2 \leq j \leq n$, a gateway that is connected to the memory and is a junction with the outside, and a transmitter that is connected to the memory and transmits data between the memory and the outside through the gateway.

If the $(pk+1)$th through $(p+1)k$-th rows of $A^{(0)}$ and corresponding components of $b^{(0)}$ and x are assigned to the node $\alpha_u$, then the pivot choosing section of $\alpha_u$ determines the pivot (3), and the preprocessing section of $\alpha_u$ calculates (4) and (5) for $pk+2 \leq j \leq n$, and the transmitter transmits the results to the memory of every other node through the gateway, while the updating section B of the element processor in charge of the i-th row calculates (14) for every i such that $(p+1)k+1 \leq i \leq n$. This series of operations is below called parallel preprocessing $A_1$.

The preprocessing section $A_t$ of the node $\alpha_u$ calculates (6), (7), (8), (9), (10) for $pk+t \leq j \leq n$, and, immediately after the pivot choosing section 2 of $\alpha_u$ determines the pivot (11), calculates (12) and (13) for $pk +t+1 \leq j \leq n$, and the transmitter transmits the results to the memory of every other node through the gateway, while the updating section B' of the node in charge of the i-th row calculates (30) for every i such that $(p+1)k+1 \leq i \leq n$. This series of operations is below called parallel preprocessing $A_t$, where $2 \leq t \leq k$.

The updating section B' of each node in charge of the i-th row such that $1 \leq i \leq pk$ or $(p+1)k+1 \leq i \leq n$ if n is a multiple of k or $p<[n/k]$ and $1 \leq i \leq [n/k]k$ otherwise also calculates (14) through (18) for $(p+1)k+ 1 \leq j \leq n$ if n is a multiple of k or $p<[n/k]$ and for $[n/k]k+1 \leq j \leq n$ otherwise, retaining the values of $Reg_i^{(0)}, \ldots, Reg_i^{(k)}$ in the register set. These operations are below called parallel updating B'.

The postprocessing section $C_t$ of the above node $\alpha_u$ calculate (21), (22), ..., (29) for $pk+t+2 \leq j \leq n$ for $t=1, 2, \ldots, k-1$ if n is a multiple of k or $p< [n/k]$ and for $t=1, 2, \ldots, n-[n/k]k$ otherwise. This series of operations is below called post-elimination C.

According to a further aspect of the present invention there is provided a main controller $J_p$ that is connected to the system of nodes by the network, distributes the rows of the coefficient matrix $A^{(0)}$ and the components of $b^{(0)}$ and x to the coefficient matrix $A^{(0)}$ and the components of $b^{(0)}$ and x to the nodes in such a manner as each block of consecutive k rows and corresponding 2k components is transmitted to the memory of one node in the cyclic order of $\alpha_0, \ldots, \alpha_{P-1}$, $\alpha_0, \alpha_1, \ldots$, and, if n is a multiple of k, instructs each node to execute parallel preprocessing $A_1$ through $A_k$, parallel updating B' and post-elimination C for $p=0, \ldots, n/k-1$, and, if n is not a multiple of k, instructs each node to execute parallel preprocessing $A_1$ through $A_k$, parallel updating B' and post-elimination C for $p=0, 1, \ldots, [n/k]-1$ and to execute parallel preprocessing $A_1$ through $A_{n-[n/k]k}$, parallel updating B', and post-elimination C for $p=[n/k]$.

According to another aspect of the present invention there is provided an element processor comprising:

a pivot choosing section that, for coefficient matrices $A^{(r)}$, known vectors $b^{(r)}$ and an unknown vector x expressed by (1) for a given system of linear equations (2), chooses a pivot in the i-th row of $A^{(i-1)}$ and interchanges the i-th column with the chosen pivotal column, a preprocessing section $A_1$ that is connected to the pivot choosing section and calculates (4) for $pk+2 \leq j \leq n$ and (5), k-1 preprocessing sections $A_t$, where $t=2, 3, \ldots, k$, each of which is connected to the pivot choosing section, calculates (6), (7), ..., (10) for $pk+t \leq j \leq n$, and calculates (12) and (13) for $pk+t+1 \leq j \leq n$, an updating section B which is connected to the pivot choosing section, comprises a set of k registers and an arithmetic unit, and calculates (14), (15), ..., (18) for $(p+1)k+1 \leq j \leq n$ retaining the values of $Reg_i^{(0)}, \ldots, Reg_i^{(k)}$ in the register set, a back-substitution section that is connected to the pivot choosing section and obtains the unknown x by back-substitution, that is, by calculating (19) and (20), and a gateway that is connected to the pivot choosing section and is a junction with the outside.

According to a further aspect of the present invention there is provided a system of clusters, $CL_0, \ldots, CL_{P-1}$, each of which is connected to each other by a network and comprises:

above element processors $PE_1, \ldots, PE_{P_c}$, a memory that stores blocks of k rows of each coefficient matrix $A^{(r)}$ and corresponding k components of each known vector $b^{(r)}$ and the unknown vector x, a C gateway that is a junction with the outside, and a transmitter that transmits data between the memory and the outside through the C gateway.

If the $(pk+1)$th through $(p+1)k$-th rows of $A^{(0)}$ and corresponding components of $b^{(0)}$ and x are assigned to the cluster $CL_u$, then the pivot choosing section, the updating section and the back-substitution section of each element processor of $CL_u$ take charge of part of the k rows and 2k components row by row, while the preprocessing section $A_t$ of each element processor of $CL_u$ takes charge of elements of the $(pk+t)$th row of $A^{(r)}$ and the $(pk+t)$th component of $b^{(r)}$ one by one.

specifically, the pivot choosing section of the element processor $PE_1$ of $CL_u$ determines the transposed pivot (3) of the $(pk+1)$th row, and the preprocessing sections $A_1$ of element processors of $CL_u$ simultaneously calculate (4) and (5) for $pk+2 \leq j \leq n$ and (5) with each $A_1$ calculating for elements and components in its charge, and the transmitter transmits the results to the memory of every other cluster through the C gateway, while the updating section B of the element processor in charge of the i-th row calculates (14) for every i such that $(p+1)k +1 \leq i \leq n$. This series of operations is below called parallel preprocessing $CLA_1$.

The preprocessing sections $A_t$ of the above cluster $CL_u$ simultaneously calculate (6), (7), (8), (9), (10) for $pk+t \leq j \leq n$ with each $A_t$ calculating for elements and components in its charge, immediately after the pivot choosing section of $PE_t$ of $CL_u$ determines the pivot (11), simultaneously calculate (12) and (13) for $pk+t+1 \leq j \leq n$, and the transmitter transmits the results to the memory of every other cluster through the C gateway, while the updating section B of the element processor in charge of the i-th row calculates (30) for every i such that $(p+1)k+1 \leq i \leq n$. This series of operations is below called parallel preprocessing $CLA_t$, where $2 \leq t \leq k$.

The updating sections B of each element processor in charge of the i-th row such that $(p+1)k+1 \leq i \leq n$ calculate (14) through (18) for $(p+1)k+1 \leq j \leq n$ retaining the values of $Reg_i^{(0)}, \ldots, Reg_i^{(k)}$ in the register set. These operation are below called parallel updating $B_c$.

According to a further aspect of the present invention there is provided a main controller $G_{pc}$ that is connected to the above system, distributes and assigns the rows of the coefficient matrix $A^{(0)}$ and the components of $b^{(0)}$ and x to the clusters in such a manner as each block of consecutive k rows and corresponding 2k components is transmitted to the memory of one cluster in the cyclic order of $CL_0, \ldots, CL_{P-1}, CL_0, CL_1, \ldots$, and, if n is a multiple of k, instructs each cluster to execute parallel preprocessing $CLA_1$ through $CLA_k$ and parallel updating $B_c$ for $p=0, 1, \ldots, n/k-2$ and to execute $CLA_1$ through $CLA_k$ for $p=n/k-1$, and, if n is not a multiple of k, instructs each cluster to execute $CLA_1$ through $CLA_k$ and $B_c$ for $p=0, 1, \ldots, [n/k]-1$ and to execute $CLA_1$ through $CLA_{n-[n/k]k}$ for $p=[n/k]$, and instructs each cluster to obtain the unknown vector x by means of the back-substitution sections of its element processors and its transmitter.

According to another aspect of the present invention there is provided an element processor comprising:

a pivot choosing section that, for coefficient matrices $A^{(r)}$, known vectors $b^{(r)}$ and an unknown vector x expressed by (1) for a given system of linear equations (2), chooses a pivot in the i-th row of $A^{(i-1)}$ and interchanges the i-th column with the chosen pivotal column, a preprocessing section $A_1$ that is connected to the pivot choosing section and calculates (4) for $pk+2 \leq j \leq n$ and (5), k−1 preprocessing sections $A_t$, where $t=2, 3, \ldots, k$, each of which is connected to the pivot choosing section, calculates (6), (7), \ldots, (10) for $pk+t \leq j \leq n$, and calculates (12) and (13) for $pk+t+1 \leq j \leq n$, an updating section B' which is connected to the pivot choosing section, comprises a set of k registers and an arithmetic unit, and calculates (14), (15), \ldots, (18) for $(p+1)k+1 \leq j \leq n$ retaining the values of $Reg_i^{(0)}, \ldots, Reg_i^{(k)}$ in the register set, k−1 postprocessing sections $C_t$, where $t=1, 2, \ldots, k-1$, each of which is connected to the pivot choosing section and calculates (21), (22). \ldots, (29) for $pk+t+2 \leq j \leq n$, and a gateway that is connected to the pivot choosing section and is a junction with the outside.

According to a further aspect of the present invention there is provided a system of clusters, $CL_0, \ldots, CL_{P-1}$, each of which is connected to each other by a network and comprises:

above element processors $PE_1, \ldots, PE_{P_c}$, a memory that stores the coefficient matrices $A^{(r)}$, the known vectors $b^{(r)}$ and the unknown vector x, a C gateway that is a junction with the outside, and a transmitter that transmits data between the memory and the outside through the C gateway.

If the (pk+1)th through (p+1)k-th rows of $A^{(0)}$ and corresponding components of $b^{(0)}$ and x are assigned to the cluster $CL_u$, then the pivot choosing section and the updating section B' of each element processor of $CL_u$ take charge of part of the k rows and 2k components row by row, while the preprocessing section $A_t$ and postprocessing section $C_t$ of each element processor of $CL_u$ take charge of elements of the (pk+t)th row of $A^{(r)}$ and the (pk+t)th component of $b^{(r)}$ one by one.

Specifically, the pivot choosing section of the element processor $PE_1$ of $CL_u$ determines the transposed pivot (3) of the (pk+1)th row, and the preprocessing sections $A_1$ of element processors of $CL_u$ simultaneously calculate (4) and (5) for $pk+2 \leq j \leq n$ with each $A_1$ calculating for elements and components in its charge, and the transmitter transmits the results to the memory of every other cluster through the C gateway, while the updating section B' of the element processor in charge of the i-th row calculates (14) for every i such that $(p+1)k +1 \leq i \leq n$. This series of operations is below called parallel preprocessing $CLA_1$.

The preprocessing sections $A_t$ of element processors of the above cluster $CL_u$ simultaneously calculate (6), (7), (8), (9), (10) for $pk+t \leq j \leq n$ with each $A_t$ calculating for elements and components in its charge and, immediately after the pivot choosing section of $PE_t$ of $CL_u$ determines the pivot (11), simultaneously calculate (12) and (13) for $pk+t+1 \leq j \leq n$, and the transmitter transmits the results to the memory of every other cluster through the C gateway, while the updating section B' of the element processor in charge of the i-th row calculates (30) for every i such that $(p+1)k+1 \leq i \leq n$. This series of operations is below called parallel preprocessing $CLA_t$, where $2 \leq t \leq k$.

The updating section B' of each element processor in charge of the i-th row such that $1 \leq i \leq pk$ or $(p+1)k +1 \leq i \leq n$ if n is a multiple of k or $p<[n/k]$ and $1 \leq i \leq [n/k]k$ otherwise also calculates (14) through (18) for $(p +1)k+1 \leq j \leq n$ if n is a multiple of k or $p<[n/k]$ and for $[n/k]k+1 \leq j<n$ otherwise, retaining the values of $Reg_i^{(0)}, \ldots, Reg_i^{(k)}$ in the register set. These operations are below called parallel updating $B'_c$.

The postprocessing sections $C_t$ of element processors of the above $CL_u$ simultaneously calculate (21), (22), \ldots, (29) for j such that $pk+t+2 \leq j \leq n$ for $t =1, 2, \ldots, k-1$ if n is a multiple of k or $p<[n/k]$ and for $t=1, 2, \ldots, n-[n/k]k$ otherwise. This series of operations is below called postelimination $C_c$.

According to a further aspect of the present invention there is provided a main controller $J_{pc}$ that is connected to the above system, distributes and assigns the rows of the coefficient matrix $A^{(0)}$ and the components of $b^{(0)}$ and x to the clusters in such a manner as each block of consecutive k rows and corresponding 2k components is transmitted to the memory of one cluster in the cyclic order of $CL_0, \ldots, CL_{P-1}, CL_0, CL_1, \ldots$, and, if n is a multiple of k, instructs each cluster to execute parallel preprocessing $CLA_1$ through $CLA_k$, parallel updating $B'_c$ and parallel postelimination $C_c$ for $p=0, 1, \ldots, n/k-1$, and if n is not a multiple of k, instructs each cluster to execute parallel preprocessing $CLA_1$ through $CLA_k$, parallel updating $B'_c$, and post-elimination $C_c$ for $p=0, 1, \ldots, [n/k]-1$ and to execute parallel preprocessing $CLA_1$ through $CLA_{n-[n/k]k}$, parallel updating $B'_c$, and postelimination $C_c$ for $p=[n/k]$.

According to another aspect of the present invention, there is provided a parallel elimination method for solving the system of linear equations (2) in a parallel computer comprising C clusters $CL_1, \ldots, CL_C$ connected by a network. Each of the clusters comprises $P_c$ element processors and a shared memory that stores part of the reduced matrices $A^{(r)}$ and the known vectors $b^{(r)}$ and the unknown vector x. The method comprises:

a data distribution means that distributes the rows of the coefficient matrix $A^{(0)}$ and the components of $b^{(0)}$ and x to the shared memory of the clusters in such a manner as each block of consecutive k rows and corresponding 2k components is transmitted to the shared memory in the cyclic order of $CL_1, \ldots, CL_C, CL_1, CL_2, \ldots$, and assigns those distributed to the cluster's shared memory to its element processors row by row, a pivot choosing means that chooses a pivot in a row assigned to each element processor, an elementary pre-elimination means that, after the pivot choosing means chooses the pivot $$a_{kP_c+1,kP_c+1,}^{(Pc)} \quad (31)$$

calculates $$a_{kP_c+1j}^{(kPc+1)} = a_{kP_c+1j}^{(kPc)}/a_{kP_c+1,kP_c+1,}^{(kPc)} \quad (32)$$

$$b_{kP_c+1}^{(kPc+1)} = b_{kP_c+1}^{(kPc)}/a_{kP_c+1,kP_c+1}^{(kPc)} \quad (33)$$

in the element processor in charge of the $(kP_c+1)$th row, transmits the results to the shared memory of every other cluster to which the element processor in charge of an i-throw such that $kP_c+1 \leq i \leq n$ belongs, and, for $l=2,\ldots,P_c$, calculates $$t_i^{(l-1)} = a^{(kPc)}_{ikP_c+l} - a^{(kPc)}_{ikP_c+1} a^{(kPc+)}_{kP_c+1kP_c+1} - \sum_{m=2}^{l-1} t_i^{(m-1)} a^{(kPc+m)}_{kP_c+mkP_c+l} \quad (34)$$

for $kP_c+1 \leq i \leq n$ in the element processor in charge of the i-th row, calculates $$a_{kP_c+lj}^{(kPc+l-1)} = a^{(kPc)}_{kP_c+lj} - a^{(kPc)}_{kP_c+lkP_c+1} a^{(kPc+1)}_{kP_c+1j} - \sum_{m=2}^{l-1} t^{(m-1)}_{kP_c+l} a^{(kPc+m)}_{kP_c+mj} \quad (35)$$

$$b_{kP_c+l}^{(kPc+l-1)} = b^{(kPc)}_{kP_c+l} - a^{(kPc)}_{kP_c+lkP_c+1} b^{(kPc+1)}_{kP_c+1} - \sum_{m=2}^{l-1} t^{(m-1)}_{kP_c+l} b^{(kPc+m)}_{kP_c+m} \quad (36)$$

in the element processor in charge of the $(kP_c+1)$th row, and, after the pivot choosing means determines the pivot $$a_{kP_c+lkP_c+l,}^{(kPc+l-1)} \quad (37)$$

calculates $$a_{kP_c+lj}^{(kPc+l)} = a_{kP_c+lj}^{(kPc+l-1)}/a_{kP_c+lkP_c+l,}^{(kPc+l-1)} \quad (38)$$

$$b_{kP_c+l}^{(kPc+l)} = b_{kP_c+l}^{(kPc+l-1)}/a_{kP_c+lkP_c+l}^{(kPc+l-1)} \quad (39)$$

in the element processor in charge of the $(kP_c+1)$th row, transmits the results (38) and (39) to the shared memory of every other cluster to which the element processor in charge of an i-th row such that $kP_c+l+1 \leq i \leq n$ belongs, a multi-pivot elimination means that calculates $$a_{ij}^{((k+1)P_c)} = a_{ij}^{(kP_c)} - \quad (40)$$

$$a^{(kPc)}_{ikP_c+1} a^{(kP_c+1)}_{kP_c+1j} - \sum_{m=2}^{P_c} t_i^{(m-1)} a^{(kP_c+m)}_{kP_c+mj}$$

$$b_i^{((k+1)P_c)} = b_i^{(kP_c)} - \quad (41)$$

$$a^{(kPc)}_{ikP_c+1} b^{(kP_c+1)}_{kP_c+1} - \sum_{m=2}^{P_c} t_i^{(m-1)} b^{(kP_c+m)}_{kP_c+m}$$

in each element processor in charge of the i-th row such that $(k+1)P_c+1 \leq i \leq n$, a means for testing if the operation of the multi-pivot elimination means was repeated $[n/P_c]$ times, and a remainder elimination means that executes the above elementary pre-elimination means for the $([n/P_c]P_c +1)$th row through the n-th row, if the above testing means judges that the operation of the multi-pivot elimination means was executed $[n/P_c]$ times, and n is not a multiple of $P_c$.

According to a further aspect of the present invention, there is provided a parallel computation method comprising:

an elementary back-substitution means that calculates $$x_i = b_i^{(n)} \quad (42)$$

in the element processor in charge of the i-th row after the elimination process of the above parallel elimination method, an elementary back-transmission means that transmits $x_i$ to the shared memory of every cluster to which the element processor in charge of an h-th row such that $1 \leq h \leq i-1$ belongs, an elementary back-calculation means that calculates $$b_h^{(n+h-i+1)} = b_h^{(n+h-i)} - a_{hi}^{(h)} x_i, \quad (43)$$

for $1 \leq h \leq i-1$ in the element processor in charge of the h-th row, and a means for testing if the operation of the elementary back-substitution means was repeated from i=n to i=1.

The solution of the system of linear equation (1) is thus obtained by the elementary back-substitution as $$x_n = b_n^{(n)}, \ldots, x_1 = b_1^{(n)} \quad (44)$$

in this order.

According to another aspect of the present invention, there is provided a parallel elimination method for solving the system of linear equations (2) in a parallel computer comprising C clusters $CL_1, \ldots, CL_C$ connected by a network. Each of the clusters comprises $P_c$ element processors and a shared memory that stores part of the reduced matrices $A^{(r)}$ and the known vectors $b^{(r)}$ and the unknown vector x. The method comprises:

a data distribution means that distributes the rows of the coefficient matrix $A^{(0)}$ and the components of $b^{(0)}$ and x to the clusters in such a manner as each block of consecutive k rows and corresponding 2k components is transmitted to the shared memory in the cyclic order of $CL_1, \ldots, CL_C$, $CL_1, CL_2, \ldots$, and assigns those distributed to the cluster's shared memory to its element processors row by row, a pivot choosing means that chooses a pivot in a row assigned to each element processor, an elementary pre-elimination means that, after the pivot choosing means chooses the pivot (31), calculates (32) and (33) in the element processor in charge of the $(P_c k+1)$th row, transmits the results to the shared memory of every other cluster to which the element processor in charge of an i-th row such that $kP_c+2 \leq i \leq n$ belongs, and, for $l=2, \ldots, P_c$, calculates (34) for $kP_c+1 \leq i \leq n$ in the element processor in charge of the i-th row, calculates (35) and (36) in the element processor in charge of the $(kP_c+1)$th row, and, after the pivot choosing means chooses the pivot (37), calculates (38) and (39) in the element processor in charge of the $(kP_c+1)$th row, and transmits the results (38) and (39) to the shared memory of every other cluster to which an element processor in charge of the i-th row such that $kP_c+l+1 \leq i \leq n$ belongs, calculates, a multi-pivot elimination means that calculates (43) and (44) in each element processor in charge of the i-th row such that $(k+1)P_c+1 \leq i \leq n$, an elementary post-elimination means that calculates $$a_{ij}^{(r+1)} = a_{ij}^{(r)} - a_{ii+l}^{(r)} a_{i+lj}^{(r+1)} \tag{45}$$

$$b_i^{(r+1)} = b_i^{(r)} - a_{ii+l}^{(r)} b_{i+l}^{(r+1)} \tag{46}$$

in the element processor in charge of the i-th row, a post-elimination processing means that calculates (45) and (46) for $l=-w+q+1$ for $w=1, \ldots, q$ and $q=1, \ldots, P_c-1$ for $kP_c+1 \leq i \leq kP_c+q$ in the element processor in charge of the i-th row, a means for testing if the operation of the post-elimination means was executed $[n/P_c]$ times, and a remainder elimination means that executes the above elementary pre-elimination means for the $([n/P_c]P_c+1)$th through the n-th rows and executes the above multi-pivot elimination means and the post-elimination means, if the above testing means judges that the operation of the post-elimination means was executed $[n/P_c]$ times.

According to a further aspect of the present invention, there is provided a search means whereby an above element processor searches for a nonzero element in the order of increasing column numbers from that diagonal element in the same row, if a diagonal element of a coefficient matrix is 0, a column number broadcasting means that notifies other element processors of the column number of a nonzero element found by the above search means, an element interchange means whereby each element processor interchanges the two elements which are in its charge and have the same column numbers as the above diagonal zero element and the found nonzero element, and a component interchange means whereby two element processors interchange the two components of the unknown vector which are in their charge and have the same component indices as the column numbers of the above diagonal zero element and the found nonzero element.

According to a further aspect of the present invention, there is provided a search means whereby an above element processor searches for an element with the greatest absolute value in the order of increasing column numbers from a diagonal element in the same row, a column number broadcasting means that notifies other element processors of the column number of an element found by the above search means, an element interchange means whereby each element processor interchanges the two elements which are in its charge and have the same column number as the above diagonal element and the found element, and a component interchange means whereby two element processors interchange the two components of the unknown vector which are in their charge and have the same component indices as the column numbers of the above diagonal element and the found component.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 1:
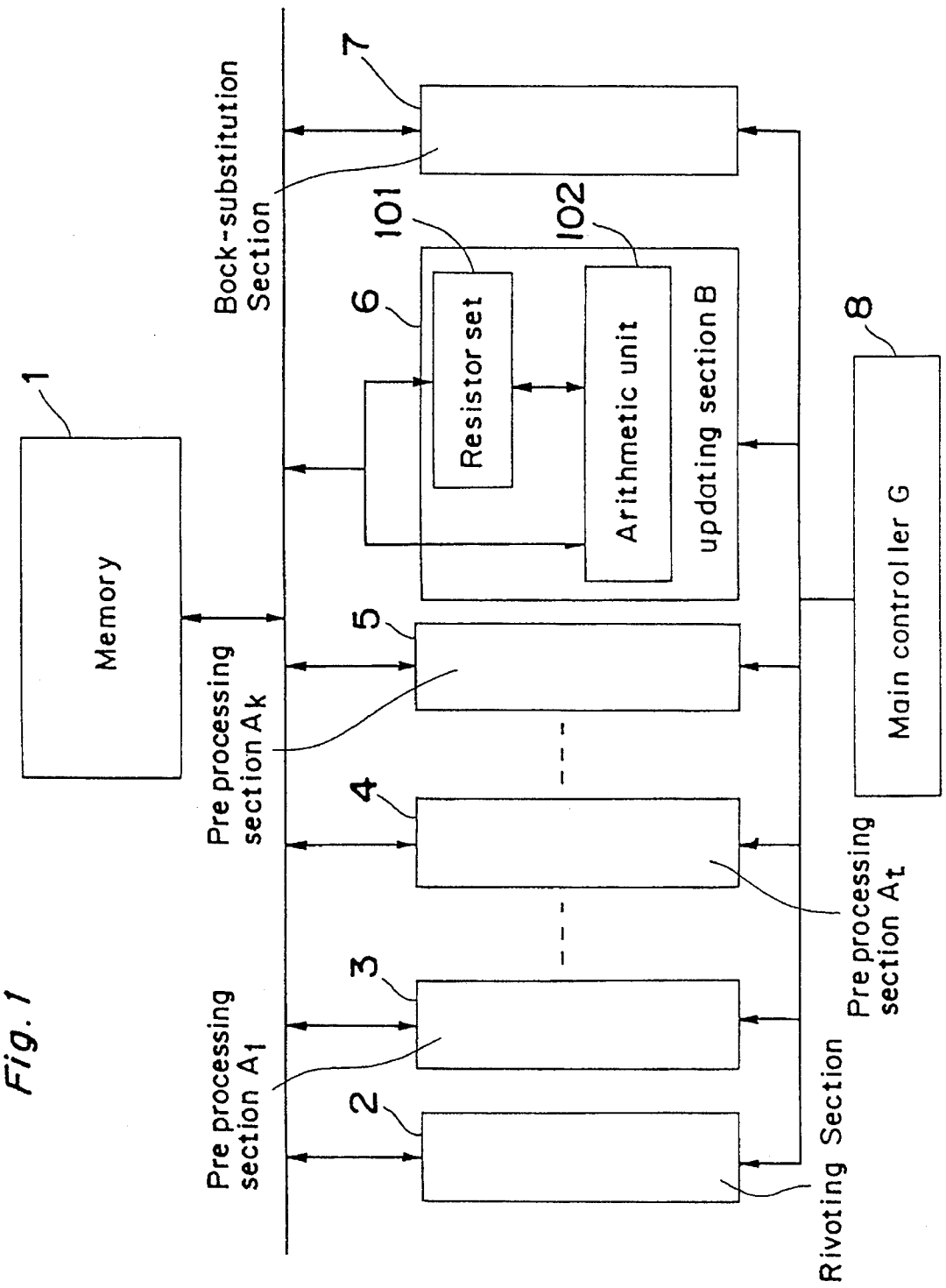
FIG. 1 is a block diagram of a linear calculating equipment according to the first embodiment of the present invention.

FIG. 1 is a block diagram of linear calculating equipment in the first embodiment of the present invention. In FIG. 1, 1 is a memory; 2 is a pivoting section connected to the memory 1; 3, 4, 5 are preprocessing sections $A_1$, $A_t$, $A_k$ respectively, each connected to the memory 1; 6 is an updating section B connected to the memory 1; 7 is a back-substitution section connected to the memory 1; 8 is a main controller G; 101 is a register set composed of k registers; 102 is an arithmetic unit.

Following is a description of the operation of each component of the first embodiment.

The memory 1 is ordinary semiconductor memory and stores reduced coefficient matrices $A^{(r)}$ with zeroes generated from the first to the r-th column and corresponding known vectors $b^{(r)}$ and an unknown vector x expressed by (1) for a given system of linear equations (2).

The pivoting section is connected to the memory 1, chooses a pivot in the i-th row following the instruction of the main controller G 8 when the first (i−1) columns are already reduced, and interchanges the i-th column with the chosen pivotal column and the i-th component with the corresponding component of x. The choice of the pivot is based on a method called partial pivoting whereby an element with the largest absolute value in the i-th row is chosen as the pivot. The interchange can be direct data transfer or transposition of column numbers and component indices.

Immediately after the pivoting section 2 determines the transposed pivot (3), the preprocessing section $A_1$ 3 calculates (4) for $pk+2 \leq j \leq n$ and (5) following the instruction of the main controller G. Each preprocessing sections $A_t$ 4, where $t=2, 3, \ldots, k$, is connected to the memory 1, calculates (6), (7), (8), (9), (10) for $pk+t \leq j \leq n$, and, immediately after the pivoting section determines the transposed pivot (11), calculates (12) and (13) for $pk+t+1 \leq j \leq n$ following the instruction of the main controller G 8.

The updating section B 6 is connected to the memory 1, comprises a register set 101 of k registers and an arithmetic unit 102, and calculates (14), (15), (16), (17), (18) for $(p+1)k+1 \leq i, j \leq n$ in the arithmetic unit 102, retaining each value of $Reg_i^{(0)}, \ldots, Reg_i^{(k)}$ in the corresponding register of the register set 101 following the instruction of the main controller G 8. (14), (15), (16) are preliminary formulas, and (17) and (18) are formulas that determine updated components.

The back-substitution section 7 is connected to the memory 1 and obtains the value of the unknown vector x by calculating (19) and (20) for $1 \leq h \leq i-1$ for $i=n, n-1, \ldots, 1$ in this order of i.

Figure 2:
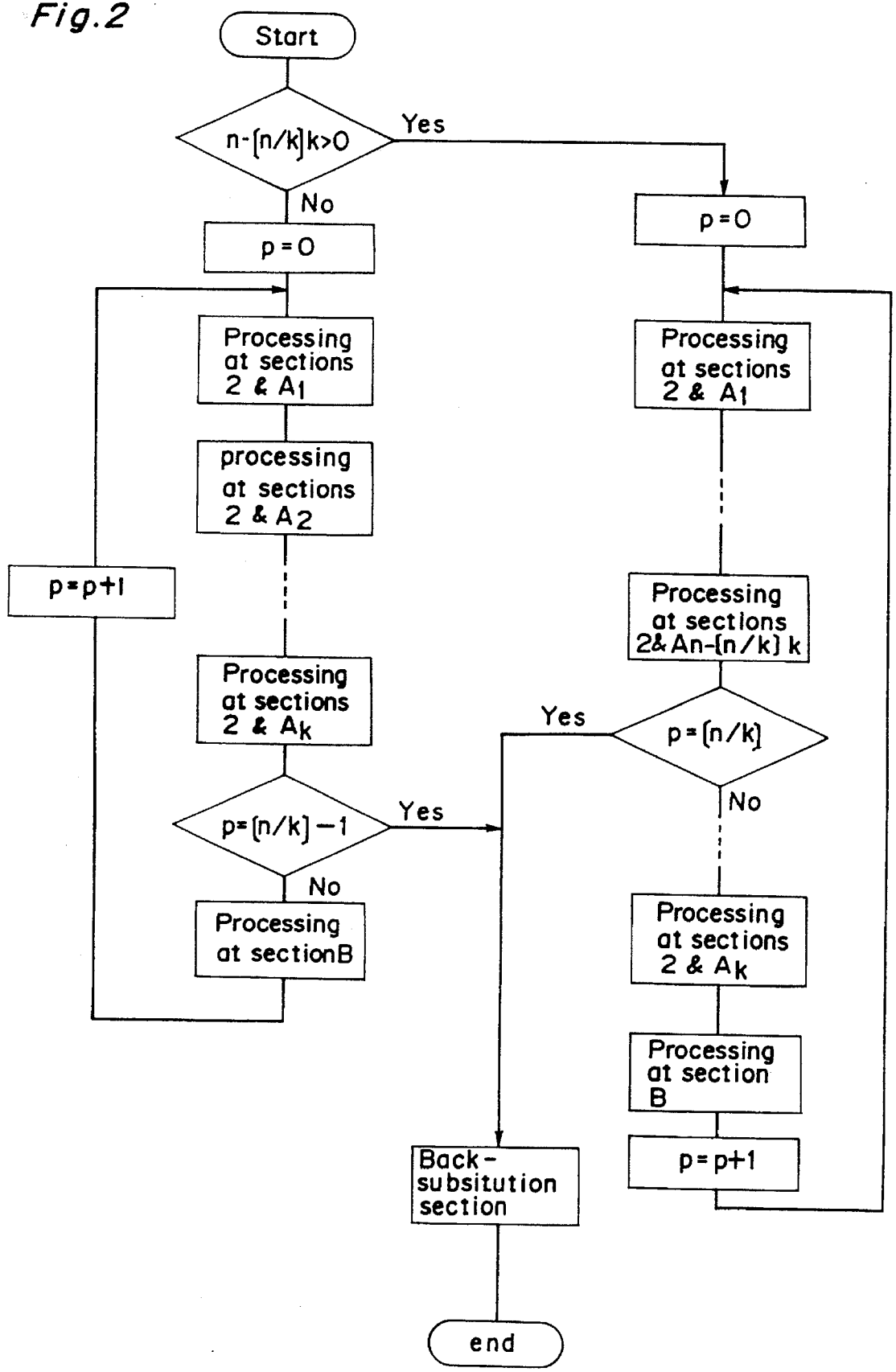
FIG. 2 is a flow chart of a control algorithm to be performed in the first embodiment.

The operation of the main controller G 8 is described below with reference to FIG. 2, which shows a flow chart of its control algorithm.

The first step tests if n is a multiple of k. If it is, then the next step initializes p as p=0 and enters the loop of the left side. The t-th step within this loop where, $t=1, \ldots, k$, instructs the pivoting section 2 and the preprocessing section $A_t$ 4 to execute their operations for the (pk+t)th row of the current reduced matrix $A^{(pk+t-1)}$. The next step tests if p=n/k−1. If it is, then the next step escapes the loop. If p<n/k−1, then the next step instructs the updating section B 6 to execute its operation. The next step increments p by 1 and returns to the operations of the pivoting section 2 and the preprocessing section $A_1$ 3.

If n is not a multiple of k, then the next step initializes p as p=0 and enters the loop of the right side. Within this loop, the operations are the same except the fact that the condition for escaping the loop is p= [n/k], and the position of the testing for escape is immediately after the operation of $A_{n-[n/k]k}$.

After escaping one of the loops the final step instructs the back-substitution section 7 to execute its operation and terminates the whole operation to obtain the unknown vector x.

Figure 3:
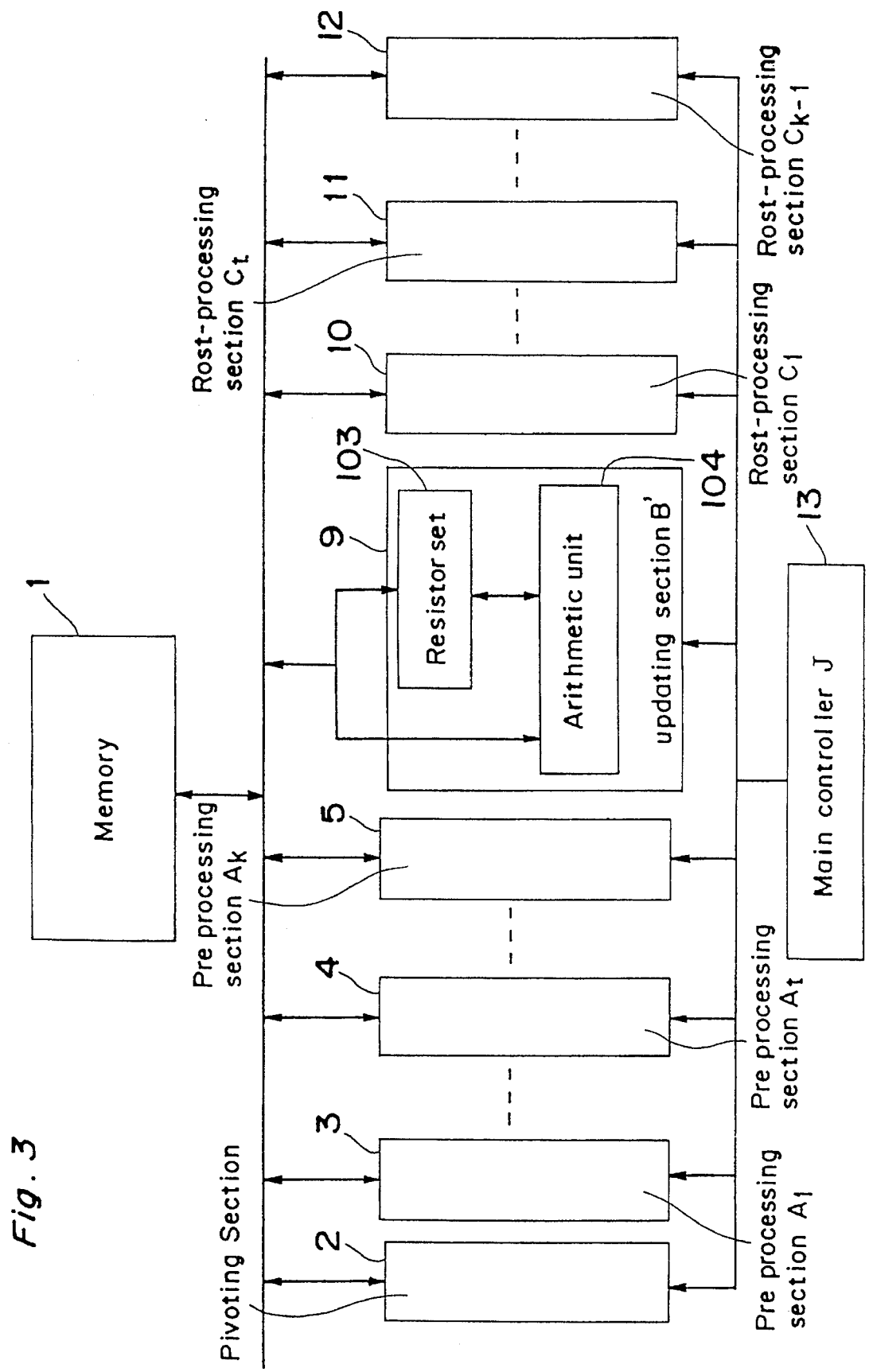
FIG. 3 is a block diagram of a linear calculating equipment according to the second embodiment of the present invention.

FIG. 3 is a block diagram of linear calculating equipment in the second embodiment of the present invention. In FIG. 3, 1 is a memory, 2 is a pivoting section connected to the memory 1; 3, 4, 5 are preprocessing sections $A_1$, $A_t$, $A_k$ respectively, each connected to the memory 1; 9 is an updating section B' connected to the memory 1; 10, 11, 12 are postprocessing sections $C_1$, $C_t$, $C_{k-1}$ respectively, each connected to the memory 1; 13 is a main controller J; 103 is a register set composed of k registers; 104 is an arithmetic unit for, 101 is an arithmetic unit.

Following is a description of the operation of each component, which is different from one in the first embodiment.

The updating section B' 9 is connected to the memory 1 and calculates (14), (15), ..., (18) for $1 \leq i \leq pk$, $(p+1)k+1 \leq i \leq n$, $(p+1)k+1 \leq j \leq n$ if n is a multiple of k or $p<[n/k]$ and for $1 \leq i \leq [n/k]k$, $[n/k]k+1 \leq j \leq n$ otherwise in the arithmetic unit 104, retaining each value of $Reg_i^{(0)}, \ldots, Reg_i^{(k)}$ in the corresponding register of the register set 103.

The k−1 postprocessing sections $C_t$ 11, where $t=1, 2, \ldots, k-1$, are connected to the memory 1 and calculate (21), (22), ..., (29) for $pk+t+2 \leq j \leq n$.

Figure 4:
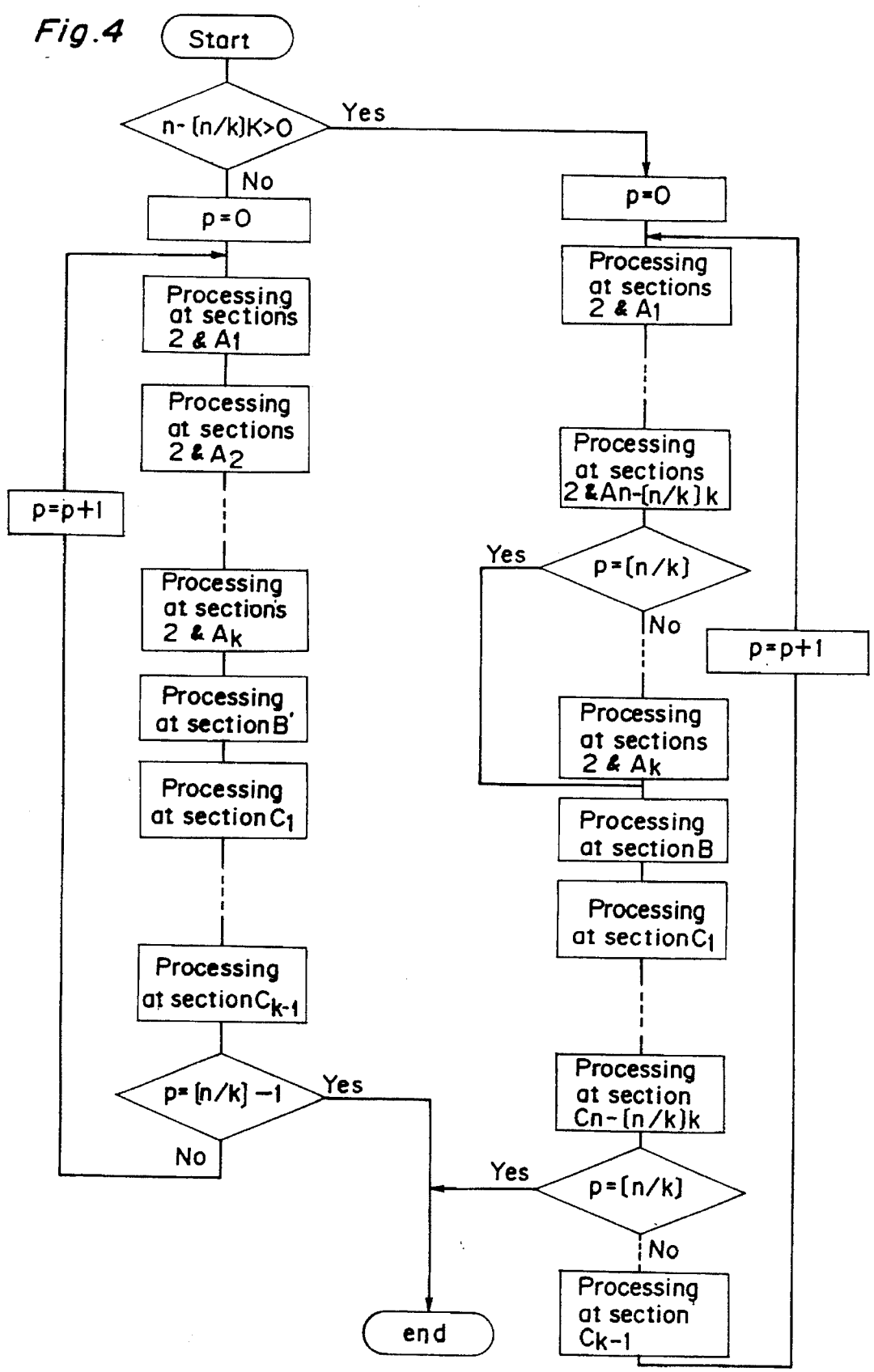
FIG. 4 is a flow chart of the control algorithm to be performed in the second embodiment.

The operation of the main controller J 13 is described below with reference to FIG. 4, which shows a flow chart of its control algorithm.

The first step tests if n is a multiple of k. If it is, then the next step initializes p as p=0 and enters the left side loop. The t-th step within this loop, where $t=1, \ldots, k$, instructs the pivoting section 2 and the preprocessing section $A_t$ 4 to execute their operations for the (pk+t)th row of the current reduced matrix $A^{(pk+t-1)}$. The next step instructs the updating section B' 9 to execute its operation. The following k−1 steps instruct the postprocessing sections $C_1$ 10 through $C_{k-1}$ 12 to execute their operations in this order. The next step tests if p= n/k−1. If it is, then the next step escapes the loop and terminates operation. If p<n/k−1, then the next step increments p by 1 and returns to the operation of the pivoting section 2.

If n is not a multiple of k, then the next step initializes p as p=0 and enters the right side loop. Within this loop, the first n−[n/k]k+1 steps are the same as those in the loop of the left side. After instructing the preprocessing section $A_{n-[n/k]k}$ 4 to execute its operation, the step tests if p=[n/k]. If it is not, then the following steps order the operations of the pivoting section 2 and the preprocessing section $A_{n-[n/k]+1}$ 4 through the operations of the pivoting section 2 and the preprocessing section $A_k$ 5 followed by the operation of the updating section B'9 and then the operations of the postprocessing sections $C_1$ 10 through $C_{k-1}$ 12. Then the step increments p by 1 and returns to the operation of the pivoting section 2. If p=[n/k], then the following steps instruct the updating section B' 9 to execute its operation, instruct the postprocessing sections $C_1$ 10 through $C_{n-[n/k]k}$ 11 to execute their operations, and terminates the whole process to obtain the unknown vector.

Figure 5:
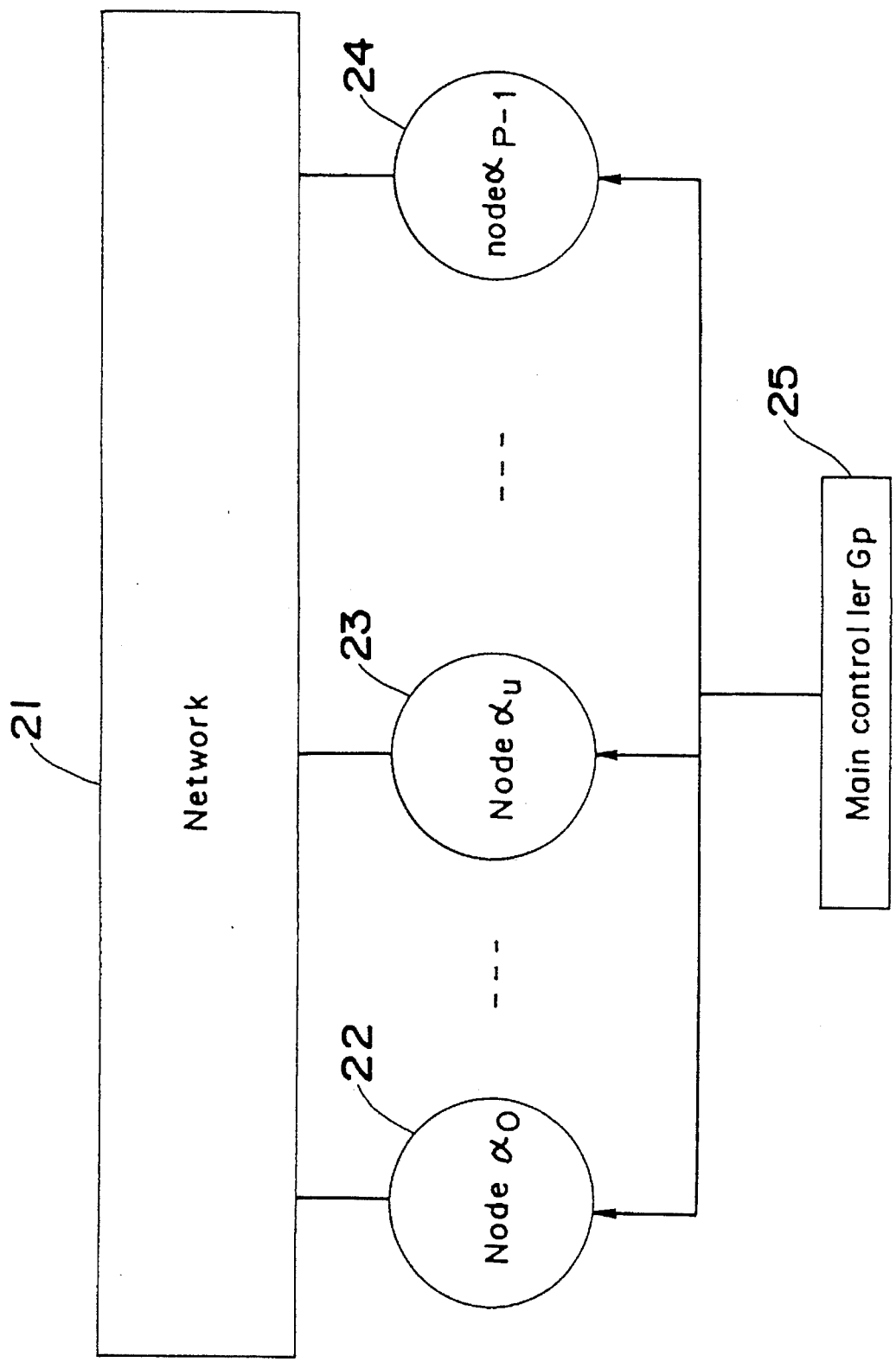
FIG. 5 is a block diagram of a parallel linear calculating equipment according to the third embodiment of the present invention.
Figure 6:
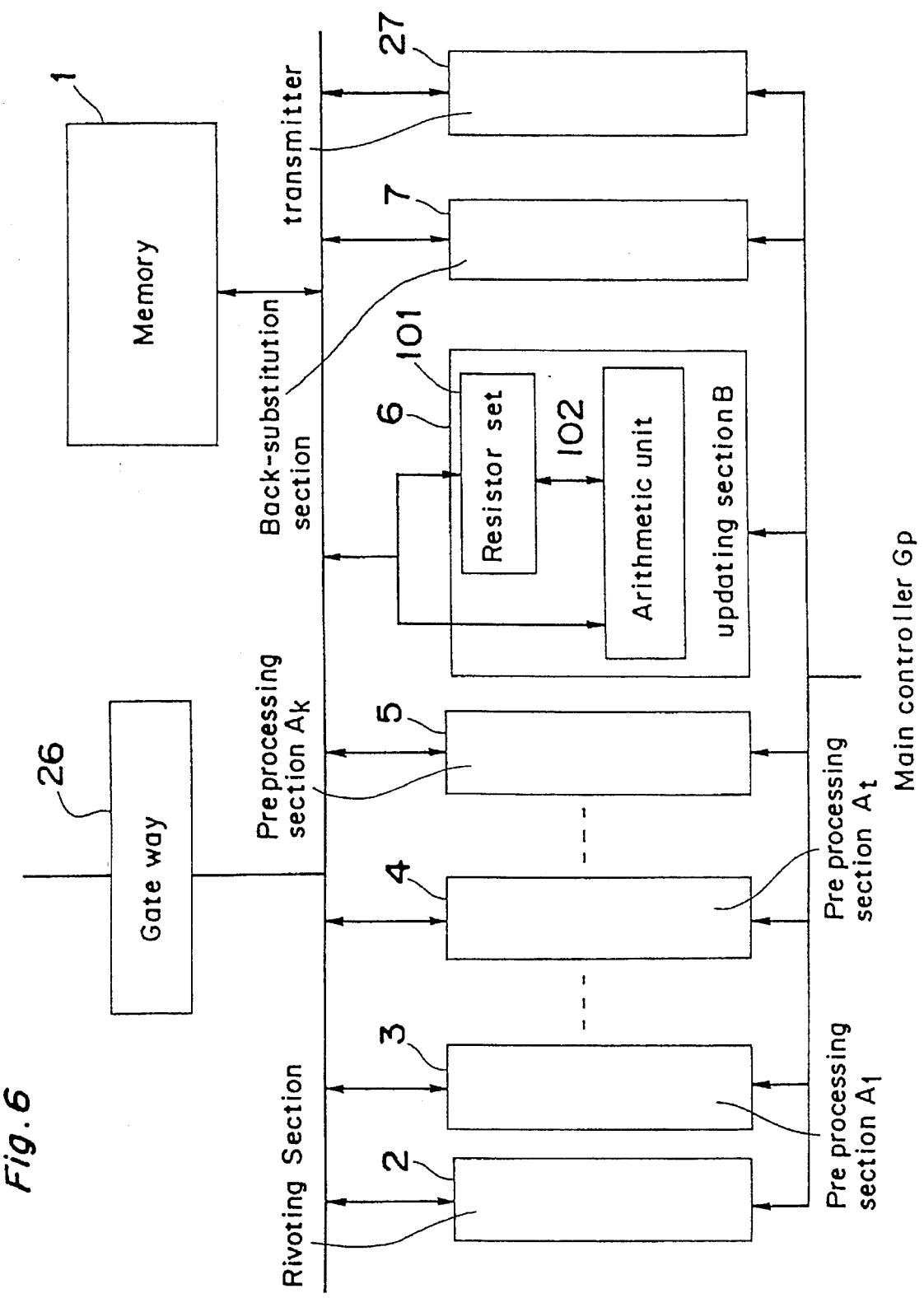
FIG. 6 is a block diagram of a node shown in FIG. 5.

FIG. 5 is a block diagram of parallel linear calculating equipment in the third embodiment of the present invention. In FIG. 5, 21 is a network; 22, 23, 24 are nodes $\alpha_0$, $\alpha_u$, $\alpha_{P-1}$ mutually connected by the network 21; 25 is a main controller $G_p$ connected to each node. FIG. 6 is a block diagram of a node in FIG. 5. In FIG. 6, 1 is a memory; 2 is a pivoting section connected to the memory 1; 3, 4, 5 are preprocessing sections $A_1$, $A_t$, $A_k$ respectively, each connected to the memory 1; 6 is an updating section B connected to the memory 1; 7 is a back-substitution section connected to the memory 1; 26 is a gateway that is a junction with the outside; 27 is a transmitter that transmits data between the memory 1 and the outside through the gateway 26; 101 is a register set composed of k registers; 102 is an arithmetic unit.

Following is a description of the operation of each component of the third embodiment.

If the (pk+1)th through (p+1)k-th rows of $A^{(0)}$ and corresponding components of $b^{(0)}$ and x are assigned to the node $\alpha_u$ 23, then the pivoting section 2 of the node $\alpha_u$ 23 determines the pivot (3), and the preprocessing section of the node $\alpha_u$ 23 calculates (4) and (5) for pk+2≦j≦n, and the transmitter 27 transmits the results to the memory 1 of every other node through the gateway 26, while the updating section B 6 of the element processor in charge of the i-th row calculates (14) for every i such that (p+1)k+1≦i≦n. This series of operations is below called parallel preprocessing $A_1$.

The preprocessing section $A_t$ 4 of the node $\alpha_u$ 23 calculates (6), (7), (8), (9), (10) for pk+t≦j≦n, and, immediately after the pivoting section 2 of $\alpha_u$ 23 determines the pivot (11), calculates (12) and (13) for pk +t+1≦j≦n, and the transmitter 27 transmits the results to the memory 1 of every other node through the gateway 26, while the updating section B 6 of the element processor in charge of the i-th row calculates (30) for every i such that (p+1)k+1≦i≦n. This series of parallel operations is below called parallel preprocessing $A_t$, where 2≦t≦k.

The updating section B 6 of each node in charge of the i-th row such that (p+1)k+1≦i≦n also calculates (14) through (18) for (p+1)k+1≦j≦n retaining the values of $Reg_i^{(0)}, \ldots, Reg_i^{(k)}$ in the register set. These operations are below called parallel updating B.

The back-substitution sections 7 of nodes $\alpha_u$ 23 calculate (19) and (20) using necessary data transmitted by the transmitters 27 of other nodes. These operations are called back-substitution.

Figure 7:
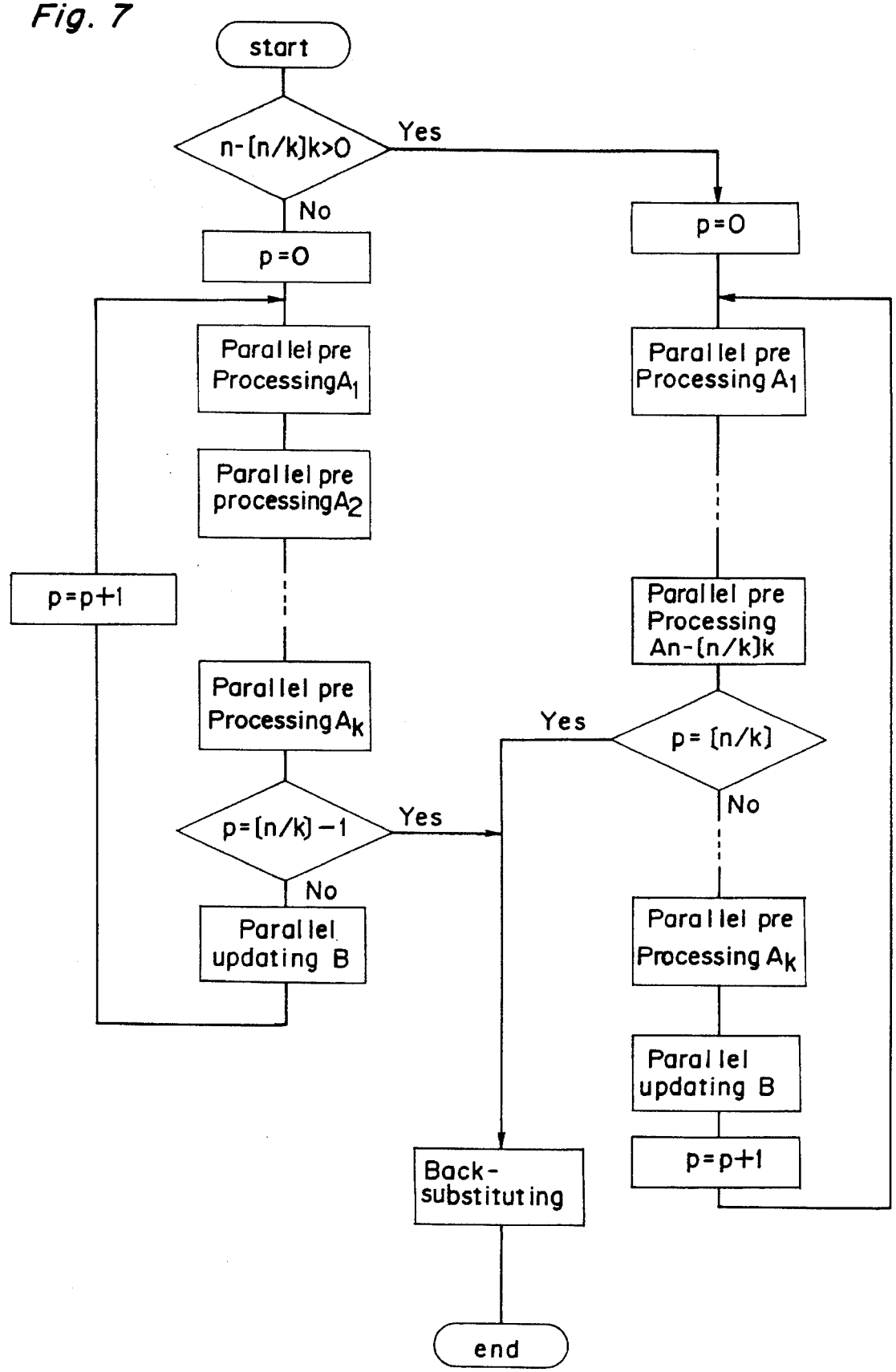
FIG. 7 is a flow chart of the control algorithm to be performed in the third embodiment.

The operation of the main controller $G_p$ 25 is described below with reference to FIG. 7, which shows a flow chart of its control algorithm at the level of above definition.

The first step distributes and assigns the rows of the coefficient matrix $A^{(0)}$ and the components of $b^{(0)}$ and x to the nodes $\alpha_0$ 22, ..., $\alpha_u$ 23, ..., $\alpha_{P-1}$ 24 in such a manner as each block of k rows and corresponding 2k components (n−[n/k]k rows and 2(n−[n/k]k) components in the final distribution) are transmitted to the memory 1 of one node at a time in the cyclic order of $\alpha_0, \ldots, \alpha_{P-1}, \alpha_0, \alpha_1, \ldots$ The next step tests if n is a multiple of k. If it is, then the next step initializes p as p=0 and enters the loop of the left side. The t-th step within this loop orders the execution of the parallel preprocessing $A_t$ for the (pk+t)th row of the current reduced matrix $A^{(pk+t-1)}$. The next step tests if p=n/k−1. If it is, then the next step escapes the loop. If p<n/k−1, then the next step orders the execution of the parallel updating B. The next step increments p by 1 and returns to the execution of the parallel preprocessing $A_1$.

If n is not a multiple of k, then the next step initializes p as p=0 and enters the loop of the right side. Within this loop, the operations are the same except the fact that the condition for escaping the loop is p=[n/k], and the position of the testing for escape is between the parallel preprocessing $A_{n-[n/k]k}$ and $A_{n-[n/k]k+1}$.

After escaping one of the loops the final step orders the execution of back-substitution and terminates the whole operation to obtain the unknown vector x.

Figure 8:
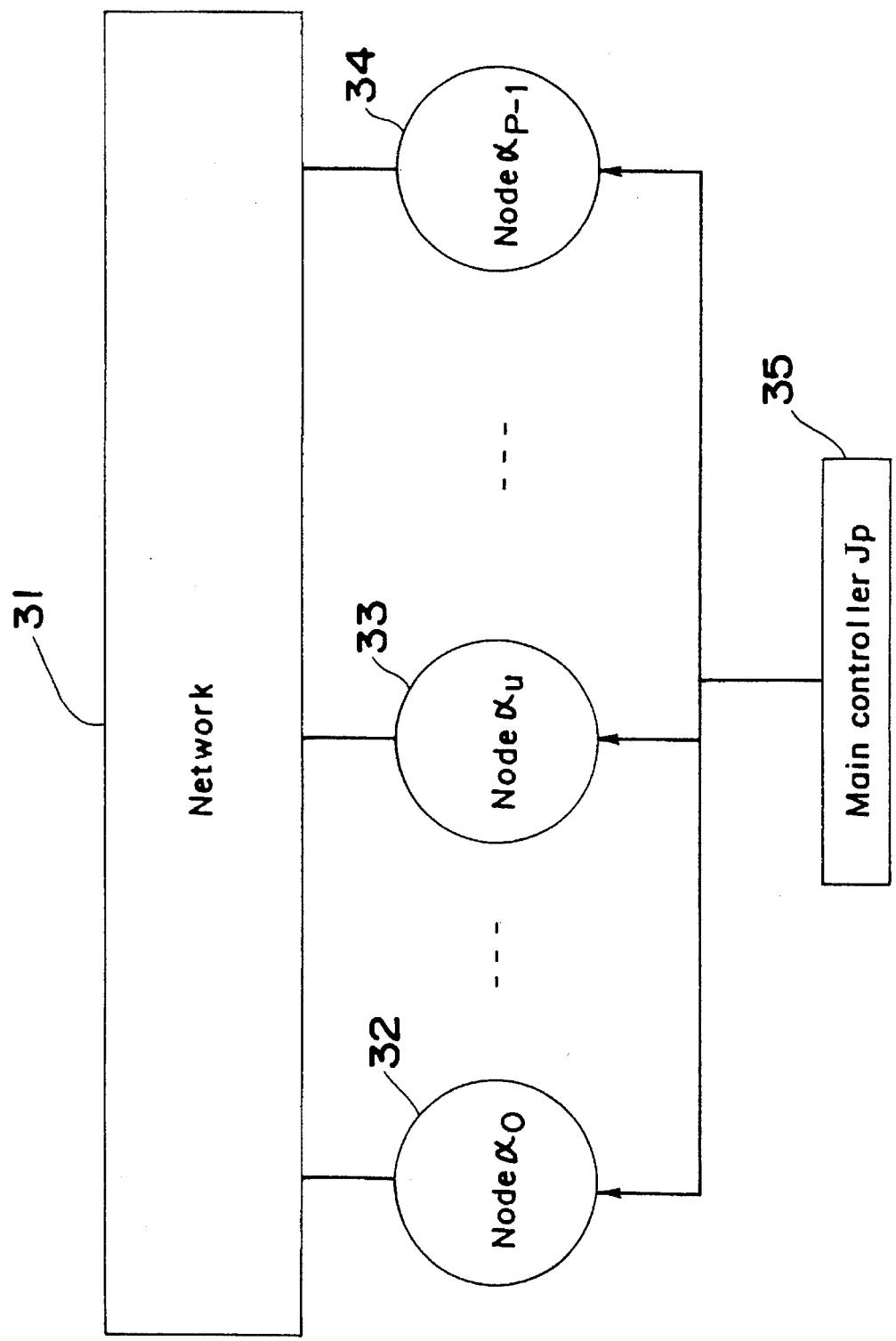
FIG. 8 is a block diagram of a parallel linear calculating equipment according to the fourth embodiment of the present invention.
Figure 9:
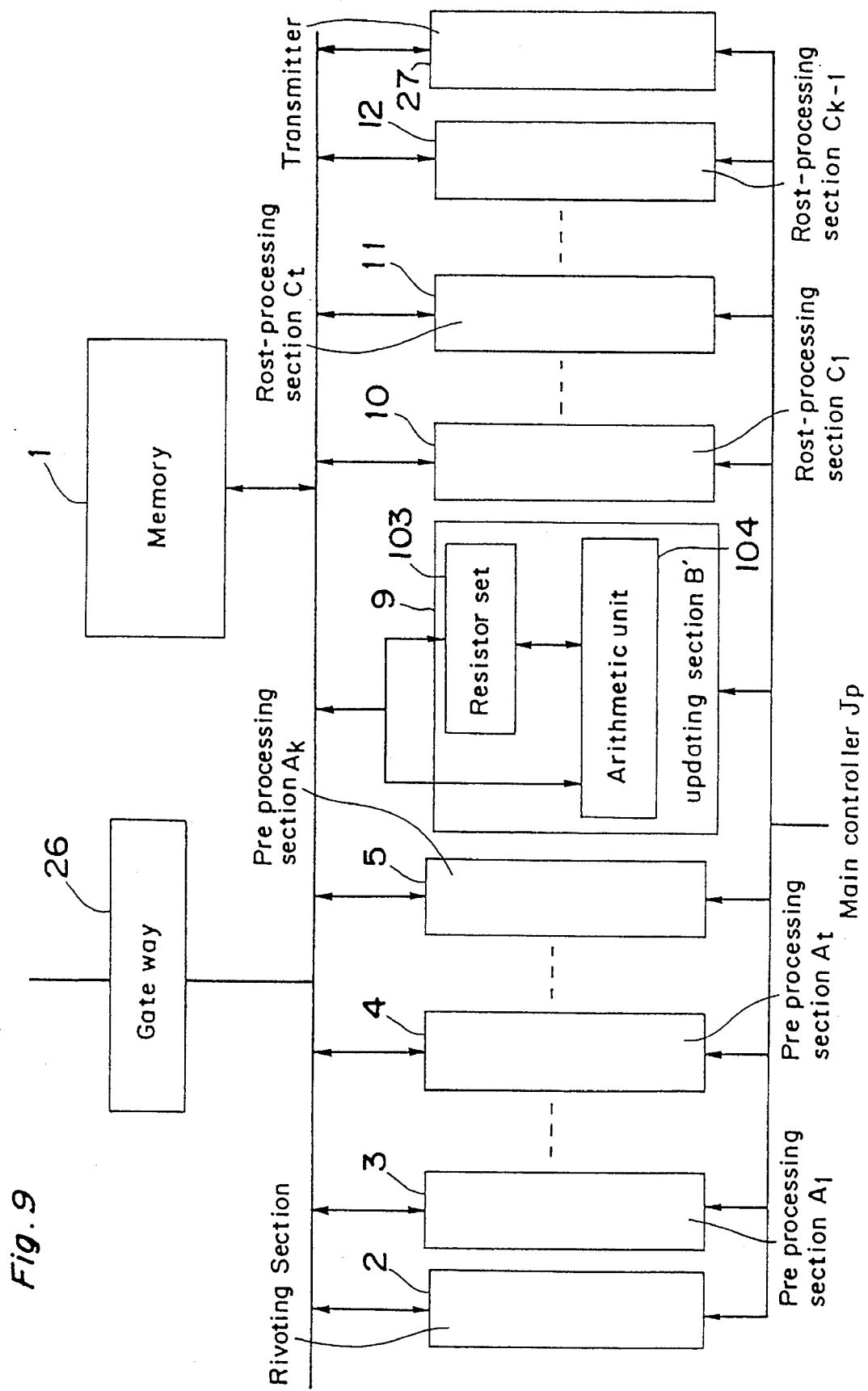
FIG. 9 is a block diagram of a node shown in FIG. 8.

FIG. 8 is a block diagram of parallel linear calculating equipment in the fourth embodiment of the present invention. In FIG. 8, 31 is a network; 32, 33, 34 are nodes $\alpha_0$, $\alpha_u$, $\alpha_{P-1}$ mutually connected by the network 31; 35 is a main controller $J_p$ connected to each node. FIG. 9 is a block diagram of a node in FIG. 8. In FIG. 9, 1 is a memory; 2 is a pivoting section connected to the memory 1; 3, 4, 5 are preprocessing sections $A_1$, $A_t$, $A_k$ respectively, each connected to the memory 1; 9 is an updating section B' connected to the memory 1; 10, 11, 12 are postprocessing sections $C_1$, $C_t$, $C_{k-1}$ respectively, each connected to the memory 1; 26 is a gateway that is a junction with the outside; 27 is a transmitter that transmits data between the memory 1 and the outside through the gateway 26; 103 is a register set composed of k registers; 104 is an arithmetic unit.

Following is a description of the operation of each component of the fourth embodiment.

If the (pk+1)th through (p+1)k-th rows of $A^{(0)}$ and corresponding components of $b^{(0)}$ and x are assigned to the node $\alpha_u$ 33, then the pivoting section 2 of the node $\alpha_u$ 33 determines the pivot (3), and the preprocessing section of the node $\alpha_u$ 33 calculates (4) and (5) for pk+2≦j≦n, and the transmitter 27 transmits the results to the memory 1 of every other node through the gateway 26, while the updating section B 6 of the element processor in charge of the i-th row calculates (14) for every i such that (p+1)k+1≦i≦n. This series of operations is below called parallel preprocessing $A_1$.

The preprocessing section $A_t$ 4 of the node $\alpha_u$ 23 calculates (6), (7), (8), (9), (10) for pk+t≦j≦n, and, immediately after the pivoting section 2 of $\alpha_u$ 23 determines the pivot (11), calculates (12) and (13) for pk +t+1≦j≦n, and the transmitter 27 transmits the results to the memory 1 of every other node through the gateway 26, while the updating section B' 9 of the element processor in charge of the i-th row calculates (30) for every i such that (p+1)k+1≦i≦n. This series of operations is below called parallel preprocessing $A_t$, where 2≦t≦k.

The updating section B' 9 of each node in charge of the i-th row such that 1≦i≦pk or (p+1)k+1≦i≦n if n is a multiple of k or p<[n/k] and 1≦i≦[n/k]k otherwise also calculates (14) through (18) for (p+1)k+ 1≦j≦n if n is a multiple of K or p<[n/k] and for [n/k]k+1≦j≦n otherwise, retaining the values of $Reg_i^{(0)}, \ldots Reg_i^{(k)}$ in the register set. These operations are below called parallel updating B'.

The postprocessing section $C_t$ 11 of the above node $\alpha_u$ 33 calculate (21), (22), ..., (29) for pk+t+ 2≦j≦n for t=1, 2, ..., k−1 if n is a multiple of k or p<[n/k] and for t=1, 2, ..., n−[n/k]k otherwise. This series of operations is below called post-elimination C.

Figure 10:
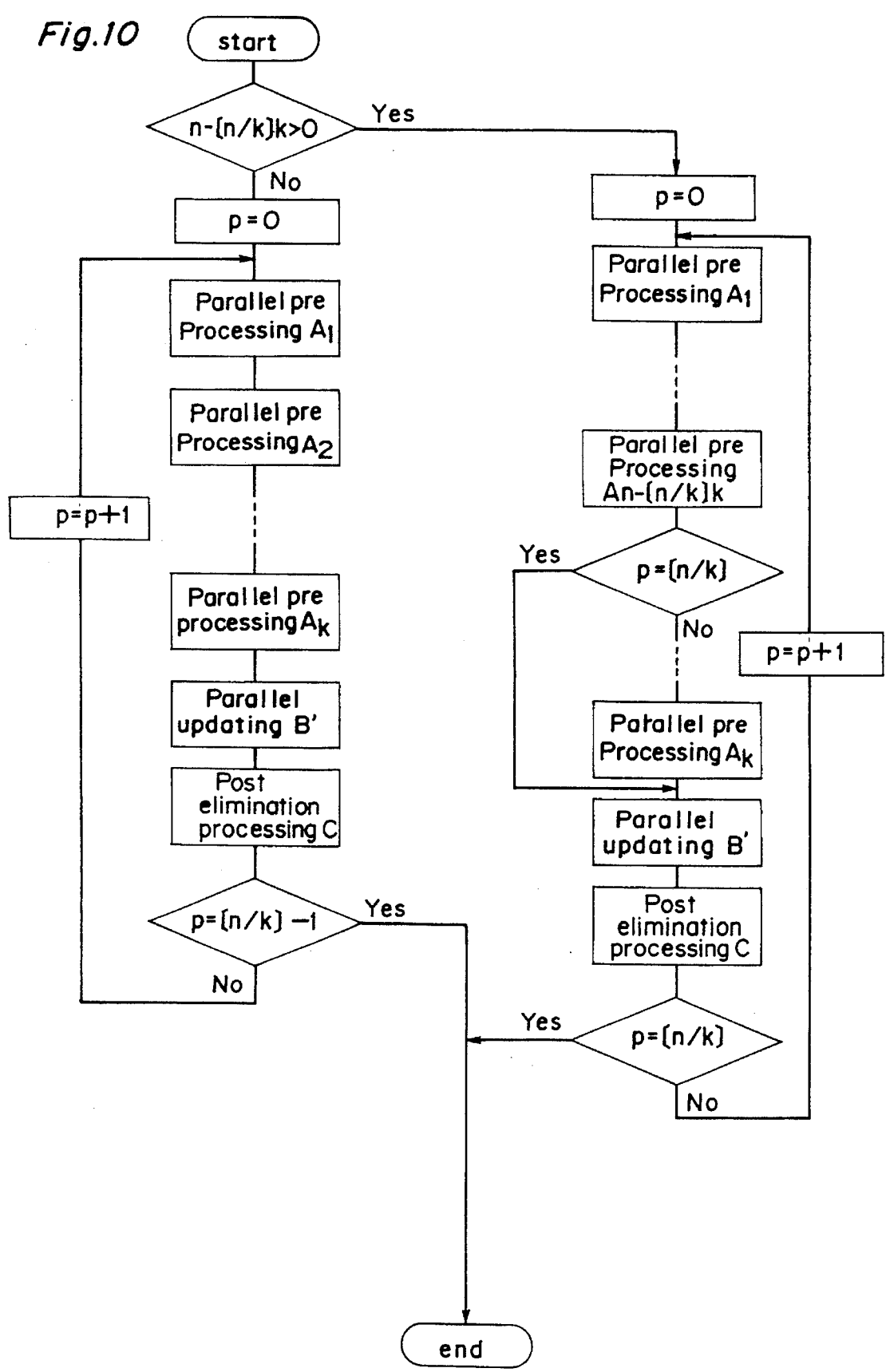
FIG. 10 is a flow chart of the control algorithm to be performed in the fourth embodiment.

The operation of the main controller $J_p$ 35 is described below with reference to FIG. 10, which shows a flow chart of its control algorithm at the level of above definition.

The first step distributes and assigns the rows of the coefficient matrix $A^{(0)}$ and the components of $b^{(0)}$ and x to the nodes $\alpha_0$ 32, ..., $\alpha_u$ 33, ..., $\alpha_{P-1}$ 34 in such a manner as each block of k rows and corresponding 2k components (n−[n/k]k rows and 2(n−[n/k]k) components in the final distribution) are transmitted to the memory 1 of one node at a time in the cyclic order of $\alpha_0, \ldots, \alpha_{P-1}, \alpha_0, \alpha_1, \ldots$ The next step tests if n is a multiple of k. If it is, then the next step initializes p as p=0 and enters the loop of the left side. The t-th step within this loop orders the execution of the parallel preprocessing $A_t$ for the (pk+t)th row of the current reduced matrix $A^{(pk+t-1)}$. The next step orders the execution of the parallel updating B'. The next step orders the execution of the post-elimination C. The next step tests if p=n/k−1. If it is, then the next step escapes the loop. If p<n/k−1, then the next step increments p by 1 and returns to the execution of the parallel preprocessing $A_1$.

If n is not a multiple of k, then the next step initializes p as p=0 and enters the loop of the right side. Within this loop, the operations are the same except the fact that the condition for escaping the loop is p= [n/k], and if p=[n/k], the steps skip the order for the execution of the parallel preprocessing $A_{n-[n/k]k+1}$ through $A_k$.

By the above processing, the unknown vector is obtained.

Figure 11:
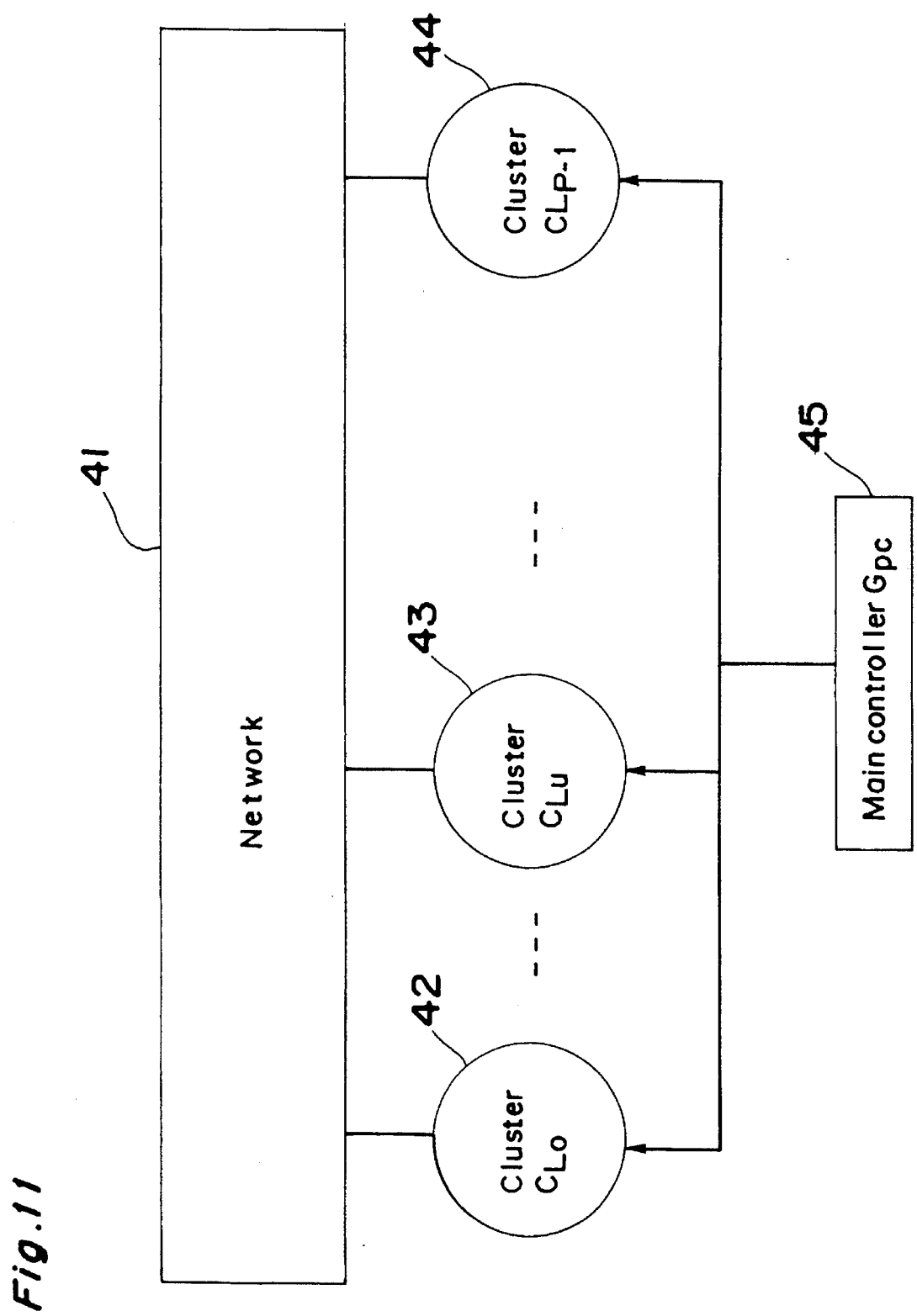
FIG. 11 is a block diagram of a parallel linear calculating equipment according to the fifth embodiment of the present invention.
Figure 12:
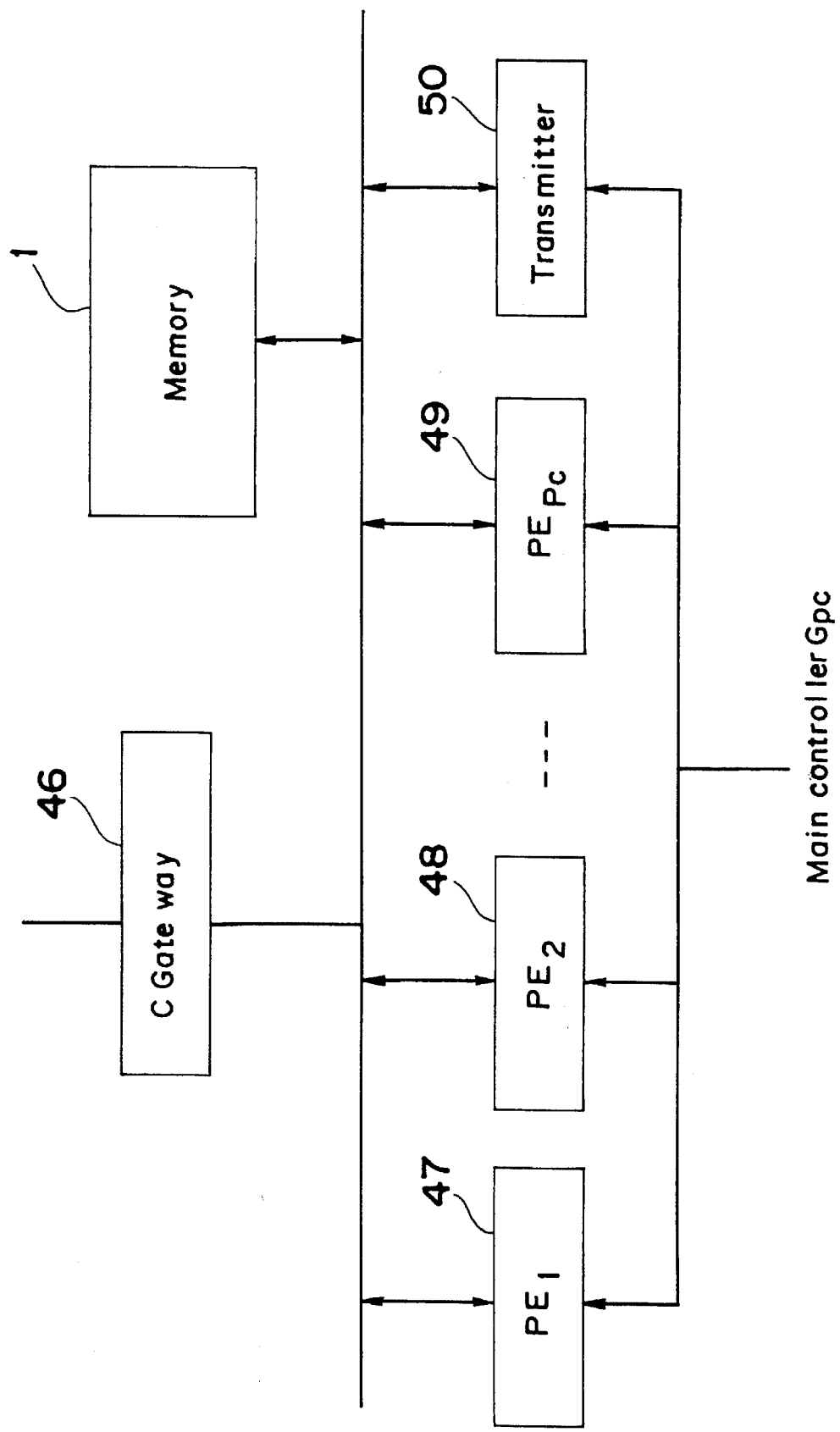
FIG. 12 is a block diagram of a cluster shown in FIG. 11.
Figure 13:
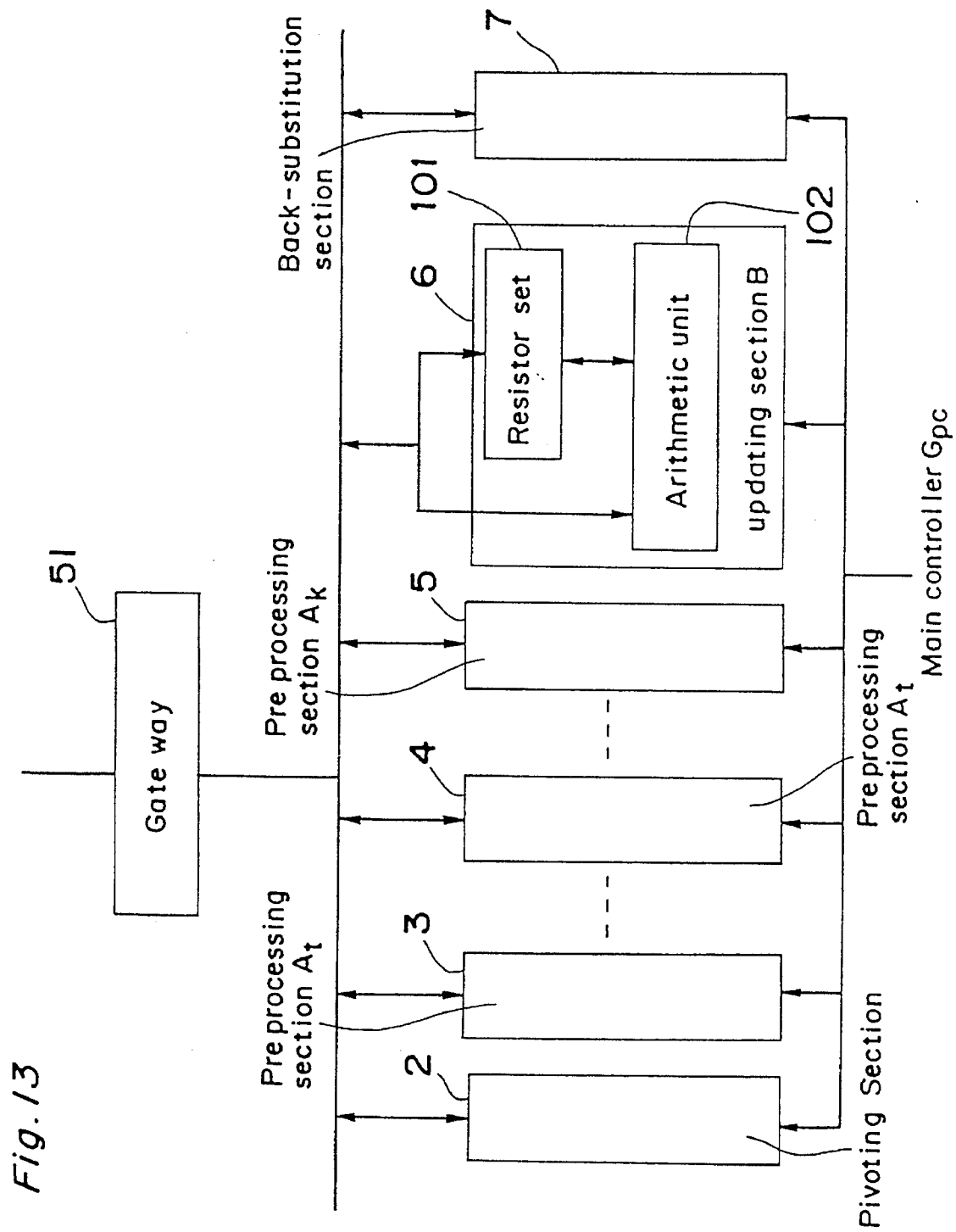
FIG. 13 is a block diagram of an element processor shown in FIG. 12.

FIG. 11 is a block diagram of a parallel linear calculating equipment according to the fifth embodiment of the present invention. In FIG. 11, 41 is a network; 42, 43, 44 are clusters $CL_0$, $CL_u$, $CL_{P-1}$ mutually connected by the network 41; 45 is a main controller $G_{pc}$ connected to each cluster. FIG. 12 is a block diagram of a cluster in FIG. 11. In FIG. 12, 1 is a memory; 46 is a C gateway that is a junction with the outside; 47, 48, 49 are element processors $PE_1$, $PE_2$, $PE_{P_c}$, each connected to the memory 1; 50 is a transmitter that transmits data between the memory 1 and the outside through the C gateway 46. FIG. 13 is a block diagram of an element processor in FIG. 12. In FIG. 13, 2 is a pivoting section; 3, 4, 5 are preprocessing sections $A_1$, $A_t$, $A_k$ respectively, each connected to the pivoting section 2; 6 is an updating section B connected to the pivoting section 2; 7 is a back-substitution section connected to the pivoting section 2; 51 is a gateway that is a junction with the outside; 101 is a register set composed of k registers; 102 is an arithmetic unit.

Following is a description of the operation of each component of the fifth embodiment.

If the (pk+1)th through (p+1)k-th rows of $A^{(0)}$ and corresponding components of $b^{(0)}$ and x are assigned to the cluster $CL_u$ 43, then the pivoting section 2, the updating section 6 and the back-substitution section 7 of each element processor of $CL_u$ 43 take charge of part of the k rows and 2k components row by row, while the preprocessing section $A_t$ 4 of each element processor of $CL_u$ 43 takes charge of elements of the (pk+t)th row of $A^{(r)}$ and the (pk+t)th component of $b^{(r)}$ one by one.

Specifically, the pivoting section 2 of the element processor $PE_1$ of $CL_u$ 43 determines the transposed pivot (3) of the (pk+1)th row, and the preprocessing sections $A_1$ 3 of element processors of $CL_u$ simultaneously calculate (4) and (5) for pk+2≦j≦n with each $A_1$ 3 calculating for elements and components in its charge, and the transmitter 50 transmits the results to the memory of every other cluster through the C gateway 46, while the updating section B 6 of the element processor in charge of the i-th row calculates (14) for every i such that (p+1)k +1≦i≦n. This series of operations is below called parallel preprocessing $CLA_1$.

The preprocessing sections $A_t$ 4 of the above cluster $CL_u$ 43 simultaneously calculate (6), (7), (8), (9), (10) for pk+t≦j≦n with each $A_t$ 4 calculating for elements and components in its charge and, immediately after the pivoting section of $PE_t$ of $CL_u$ 43 determines the pivot (11), simultaneously calculate (12) and (13) for pk+ t+1≦j≦n, and the transmitter 50 transmits the results to the memory 1 of every other cluster through the C gateway 46, while the updating section B 6 of the element processor in charge of the i-th row calculates (30) for every i such that (p+1)k+1≦i≦n. This series of operations is below called parallel preprocessing $CLA_t$, where 2≦t≦k.

The updating sections B 6 of each element processor in charge of the i-th row such that (p+1)k+1≦i≦n calculate (14) through (18) for (p+1)k+1≦j≦ n retaining the values of $Reg_i^{(0)}, \ldots, Reg_i^{(k)}$ in the register set 101. These operations are below called parallel updating $B_c$.

The back-substitution sections 7 of element processors calculate (19) and (20) using necessary data transmitted by the transmitters 50 of other clusters. These operations are called back-substitution.

Figure 14:
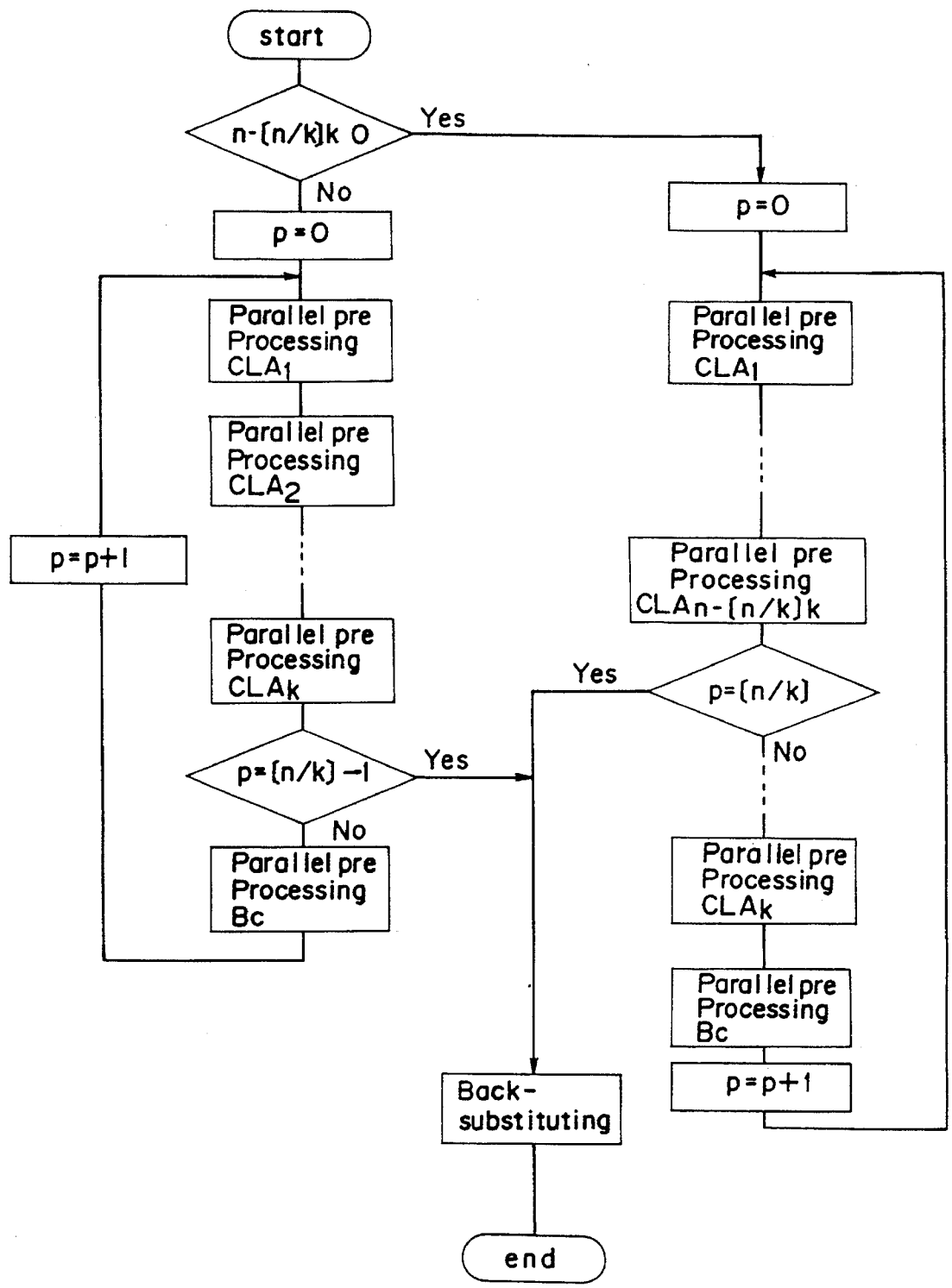
FIG. 14 is a flow chart of the control algorithm to be performed in the fifth embodiment.

The operation of the main controller $G_{pc}$ 45 is described below with reference to FIG. 14, which shows a flow chart of its control algorithm at the level of above definition.

The first step distributes and assigns the rows of the coefficient matrix $A^{(0)}$ and the components of $b^{(0)}$ and x to the cluster $CL_0$ 42, ..., $CL_u$ 43, ..., $CL_{P-1}$ 44 in such a manner as each block of k rows and corresponding 2k components (n−[n/k]k rows and 2(n−[n/k]k) components in the final distribution) are transmitted to the memory 1 of one node at a time in the cyclic order of $CL_0, \ldots, CL_{P-1}, CL_0, CL_1, \ldots$ The next step tests if n is a multiple of k. If it is, then the next step initializes p as p=0 and enters the loop of the left side. The t-th step within this loop orders the execution of the parallel preprocessing $CLA_t$ for the (pk+t)th row of the current reduced matrix $A^{(pk+t-1)}$. The next step tests if p=n/k−1. If it is, then the next step escapes the loop. If p<n/k−1, then the next step orders the execution of the parallel updating $B_c$. The next step increments p by 1 and returns to the execution of the parallel preprocessing $CLA_1$.

If n is not a multiple of k, then the next step initializes p as p=0 and enters the loop of the right side. Within this loop, the operations are the same except the fact that the condition for escaping the loop is p= [n/k], and the position of the testing for escape is between the parallel preprocessing $CLA_{n-[n/k]k}$ and $CLA_{n-[n/k]k+1}$.

After escaping one of the loops the final step orders the execution of back-substitution and terminates the whole operation to obtain the unknown vector x.

Figure 15:
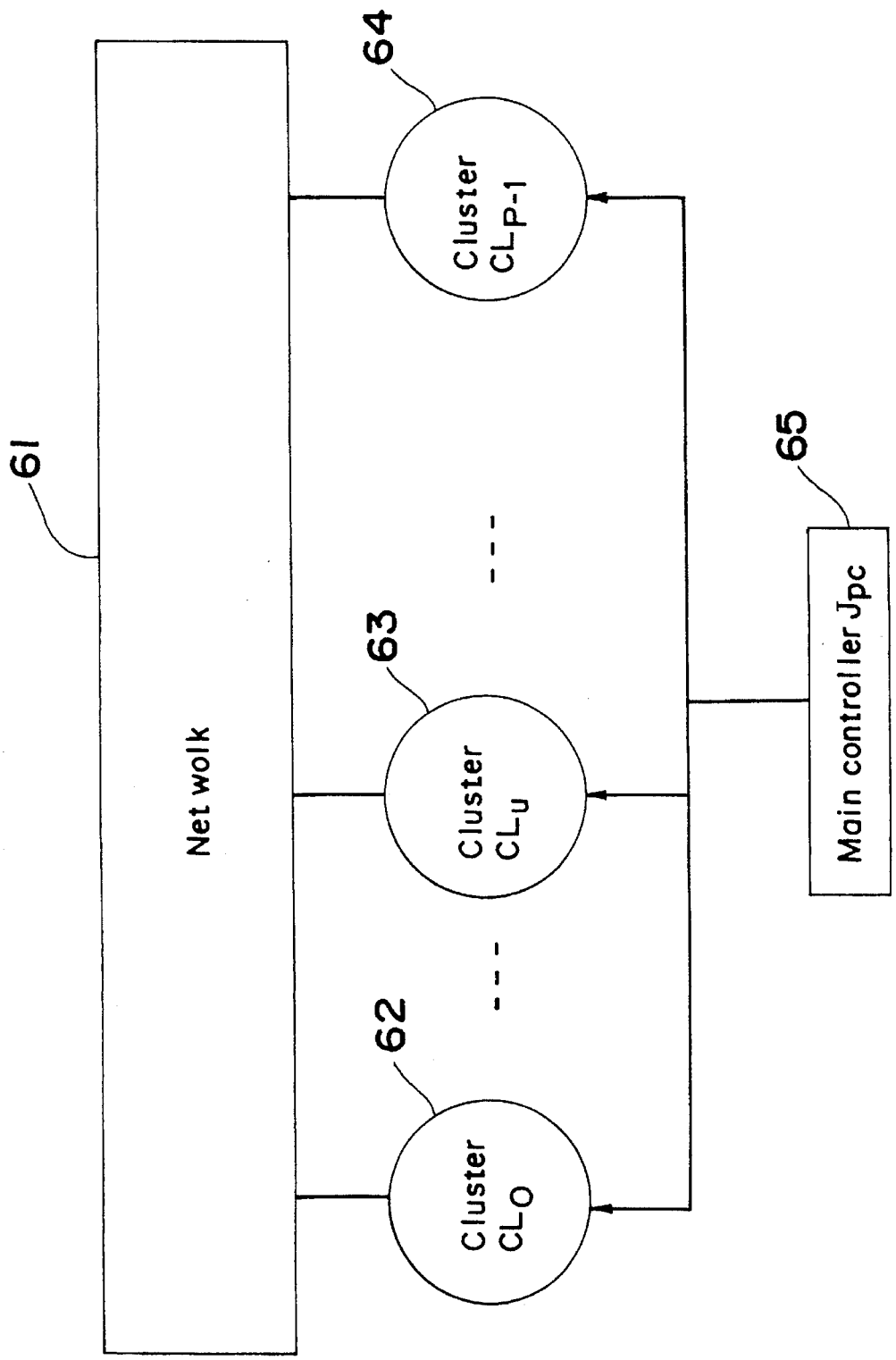
FIG. 15 is a block diagram of a parallel linear calculating equipment according to the sixth embodiment of the present invention.
Figure 16:
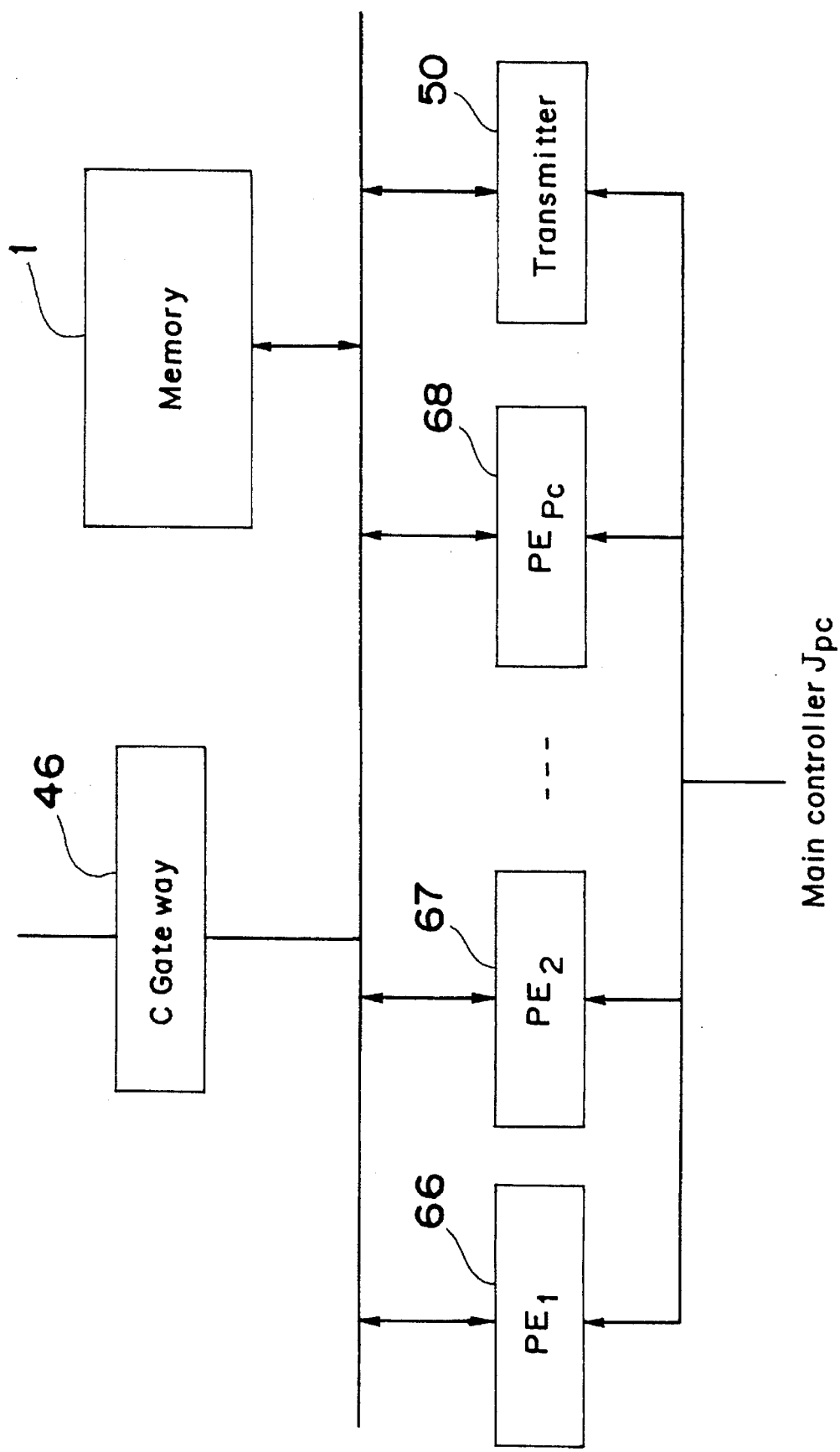
FIG. 16 is a block diagram of a cluster shown in FIG. 15.
Figure 17:
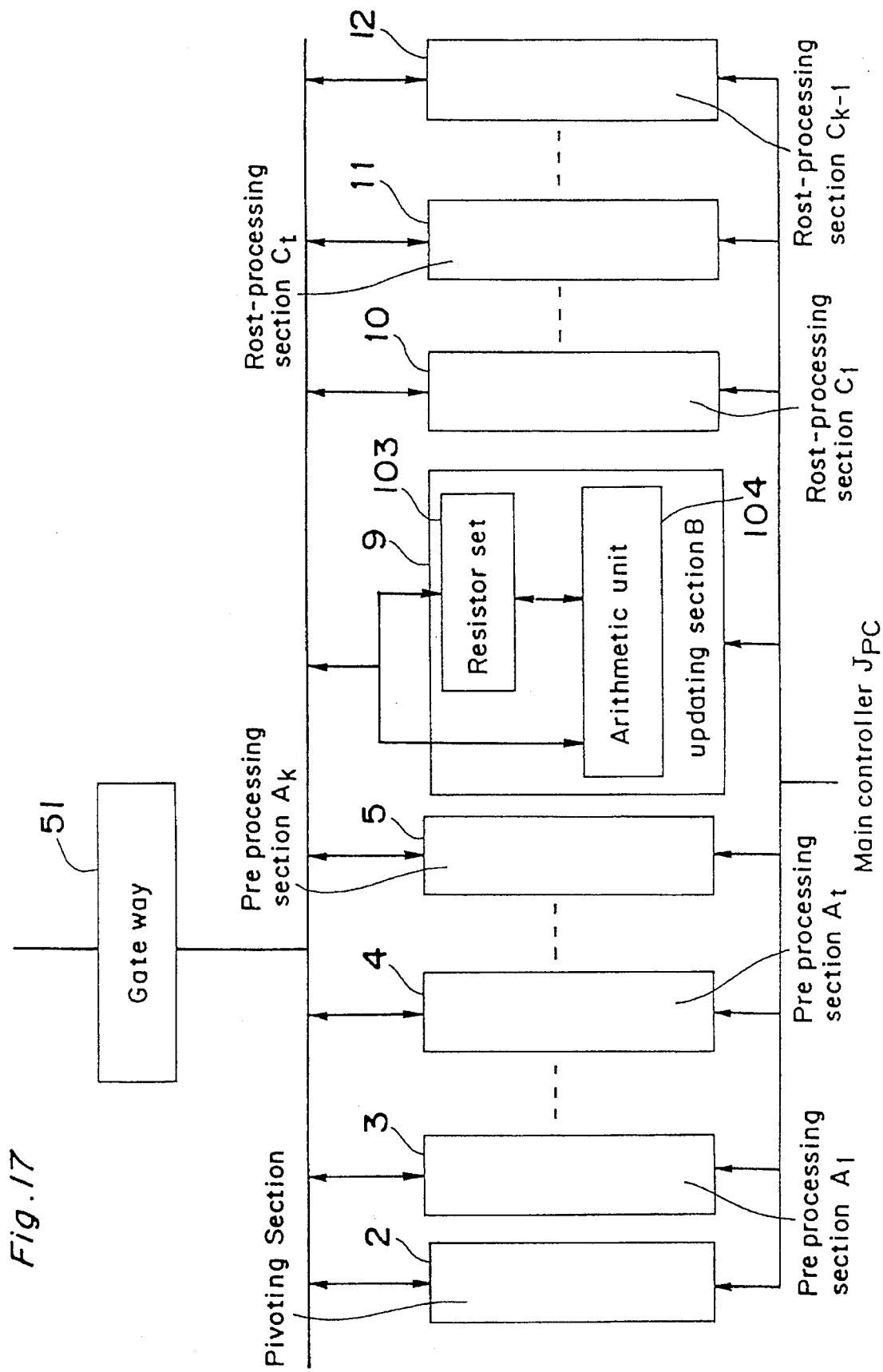
FIG. 17 is a block diagram of an element processor shown in FIG. 16.

FIG. 15 is a block diagram of a parallel linear calculating equipment according to the sixth embodiment of the present invention. In FIG. 15, 61 is a network; 62, 63, 64 are clusters $CL_0$, $CL_u$, $CL_{P-1}$ mutually connected by the network 61; 65 is a main controller $J_{pc}$ connected to each cluster. FIG. 16 is a block diagram of a cluster in FIG. 15. In FIG. 16, 1 is a memory; 46 is a C gateway that is a junction with the outside; 66, 67, 68 are element processors $PE_1$, $PE_2$, $PE_{P_c}$, each connected to the memory 1; 50 is a transmitter that transmits data between the memory 1 and the outside through the C gateway 46. FIG. 17 is a block diagram of an element processor shown in FIG. 16. In FIG. 17, 2 is a pivoting section; 3, 4, 5 are preprocessing sections $A_1$, $A_t$, $A_k$ respectively, each connected to the pivoting section 2; 9 is an updating section B' connected to the pivoting section 2; 10, 11, 12 are postprocessing sections $C_1$, $C_t$, $C_{k-1}$ respectively, each connected to the pivoting section 2; 51 is a gateway that is a junction with the outside; 103 is a register set composed of k registers; 104 is an arithmetic unit.

Following is a description of the operation of each component of the fourth embodiment.

If the (pk+1)th through (p+1)k-th rows of $A^{(0)}$ and corresponding components of $b^{(0)}$ and x are assigned to the cluster $CL_u$ 63, then the pivoting section 2 and the updating section B' 9 of each element processor of $CL_u$ 63 take charge of part of the k rows and 2k components row by row, while the preprocessing section $A_t$ 4 and postprocessing section $C_t$ 11 of each element processor of $CL_u$ 63 take charge of elements of the (pk+t)th row of $A^{(r)}$ and the (pk+t)th component of $b^{(r)}$ one by one.

Specifically, the pivoting section 2 of the element processor $PE_1$ of $CL_u$ 63 determines the transposed pivot (3) of the (pk+1)th row, and the preprocessing sections $A_1$ 3 of element processors of $CL_u$ 63 simultaneously calculate (4) and (5) for pk+2≦j≦n with each $A_1$ 3 calculating for elements and components in its charge, and the transmitter 50 transmits the results to the memory 1 of every other cluster through the C gateway 46, while the updating section B' 9 of the element processor in charge of the i-th row calculates (14) for every i such that (p+1)k +1≦i≦n. This series of operations is below called parallel preprocessing $CLA_1$.

The preprocessing sections $A_t$ 4 of the above cluster $CL_u$ 63 simultaneously calculate (6), (7), (8), (9), (10) for pk+t≦j≦n with each $A_t$ 4 calculating for elements and components in its charge and, immediately after the pivoting section 2 of the element processor $PE_t$ of $CL_u$ 63 determines the pivot (11), simultaneously calculate (12) and (13) for pk+t+1≦j≦n, and the transmitter 50 transmits the results to the memory 1 of every other cluster through the C gateway 46, while the updating section B' 9 of the element processor in charge of the i-th row calculates (30) for every i such that (p+1)k +1≦i≦n. This series of operations is below called parallel preprocessing $CLA_t$, where 2≦t≦k.

The updating section B' 9 of each element processor in charge of the i-th row such that 1≦i≦pk or (p+1)k+1≦i≦n if n is a multiple of k or p<[n/k] and 1≦i≦[n/k]k otherwise also calculates (14) through (18) for (p+1)k+1≦j≦n if n is a multiple of k or p <[n/k] and for [n/k]k+1≦j≦n otherwise, retaining the values of $Reg_i^{(0)}, \ldots, Reg_i^{(k)}$ in the register set. These operations are below called parallel updating $B'_c$.

The postprocessing sections $C_t$ 11 of element processors of the above $CL_u$ 63 simultaneously calculate (21), (22), . . ., (29) for j such that pk+t+2≦j≦n for t=1, 2, . . . , k−1 if n is a multiple of k or p< [n/k] and for t=1, 2, . . . , n−[n/k]k otherwise with each $C_t$ 11 calculating for elements and components in its charge. This series of operations is below called post-elimination $C_c$.

Figure 18:
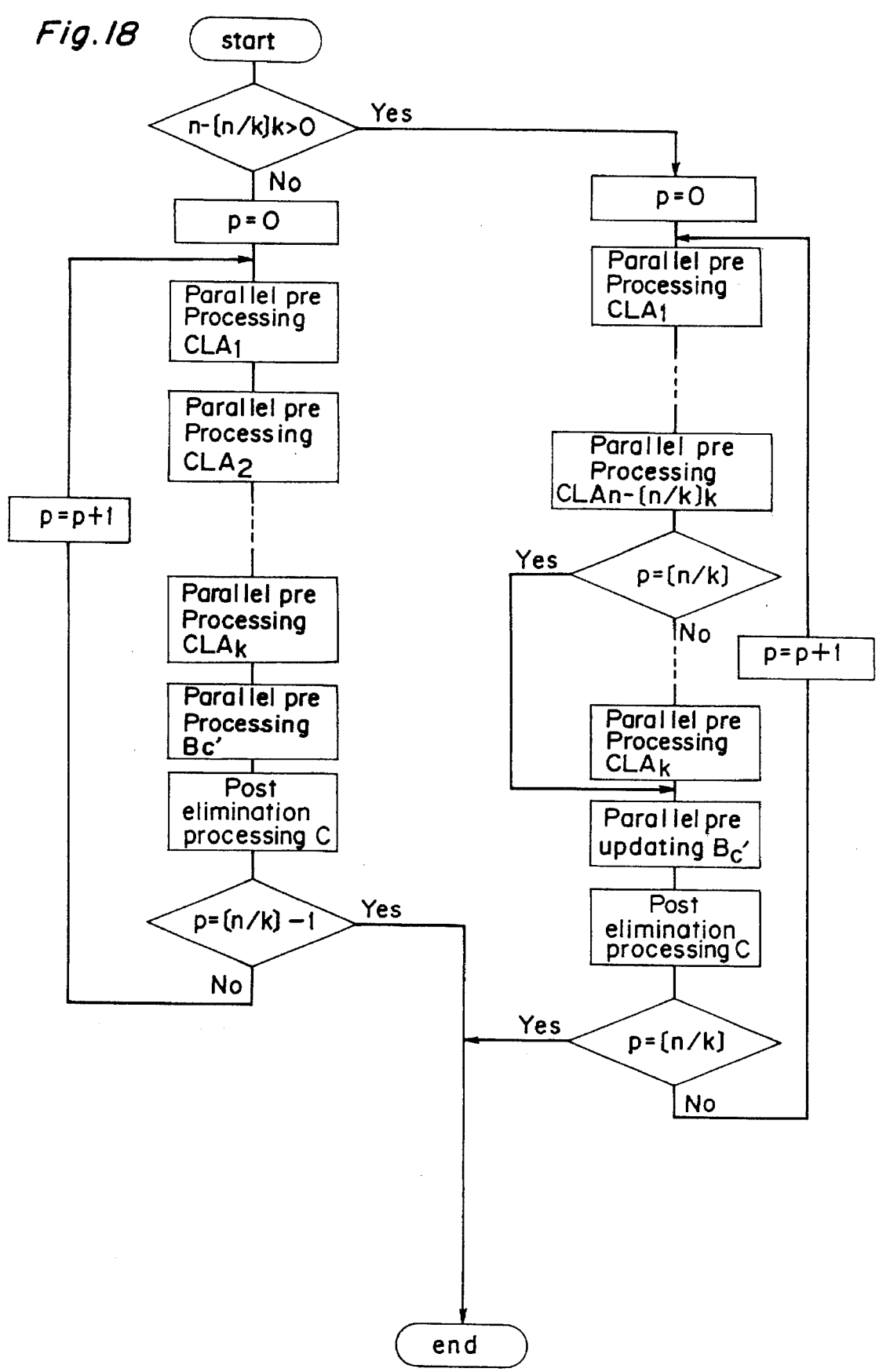
FIG. 18 is a flow chart of the control algorithm to be performed in the sixth embodiment.

The operation of the main controller $J_{pc}$ 65 is described below with reference to FIG. 18, which shows a flow chart of its control algorithm at the level of above definition.

The first step distributes and assigns the rows of the coefficient matrix $A^{(0)}$ and the components of $b^{(0)}$ and x to the clusters $CL_0$ 62, . . . , $CL_u$ 63, . . . , $CL_{P−1}$ 64 in such a manner as each block of k rows and corresponding 2k components (n−[n/k]k rows and 2(n−[n/k]k) components in the final distribution) are transmitted to the memory 1 of one node at a time in the cyclic order of $CL_0, \ldots, CL_{P−1}, CL_0, CL_1, \ldots$ The next step tests if n is a multiple of k. If it is, then the next step initializes p as p=0 and enters the loop of the left side. The t-th step within this loop orders the execution of the parallel preprocessing $CLA_t$ for the (pk+t)th row of the current reduced matrix $A^{(pk+t−1)}$. The next step orders the execution of the parallel updating $B'_c$. The next step orders the execution of the post-elimination $C_c$. The next step tests if p=n/k−1. If it is, then the next step escapes the loop. If p<n/k−1, then the next step increments p by 1 and returns to the execution of the parallel preprocessing $CLA_1$.

If n is not a multiple of k, then the next step initializes p as p=0 and enters the loop of the right side. Within this loop, the operations are the same except the fact that the condition for escaping the loop is p= [n/k], and if p=[n/k], the steps skip the order for the execution of the parallel preprocessing $CLA_{n−[n/k]k+1}$ through $CLA_k$.

By the above processing, the unknown vector is obtained.

Figure 19:
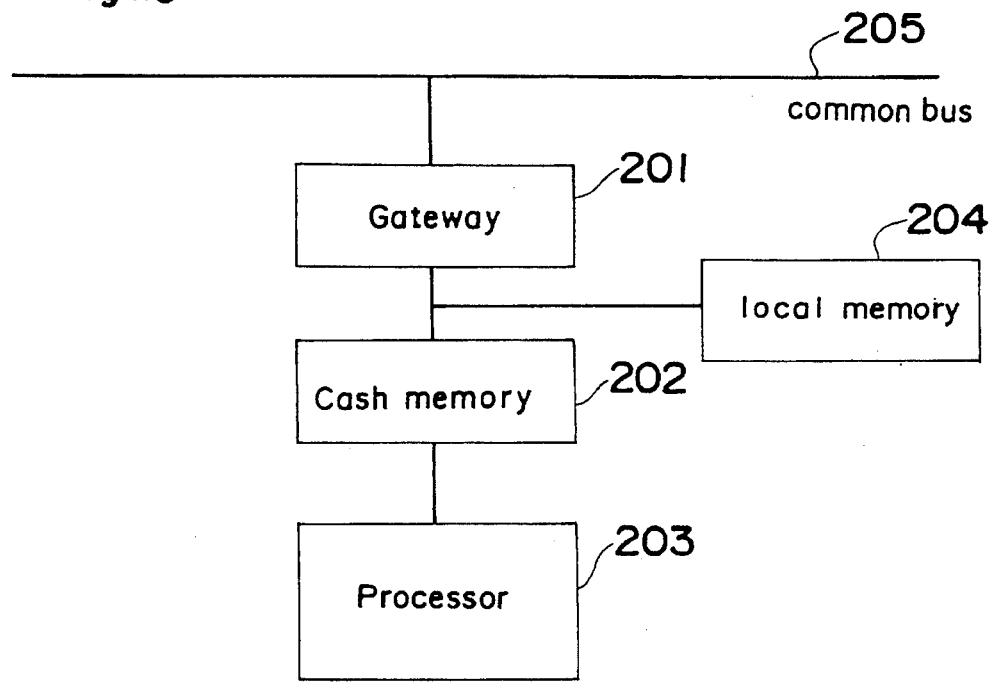
FIG. 19 is a block diagram of an element processor or processor module in a parallel computer which implements the 7th and 8th embodiments.
Figure 20:
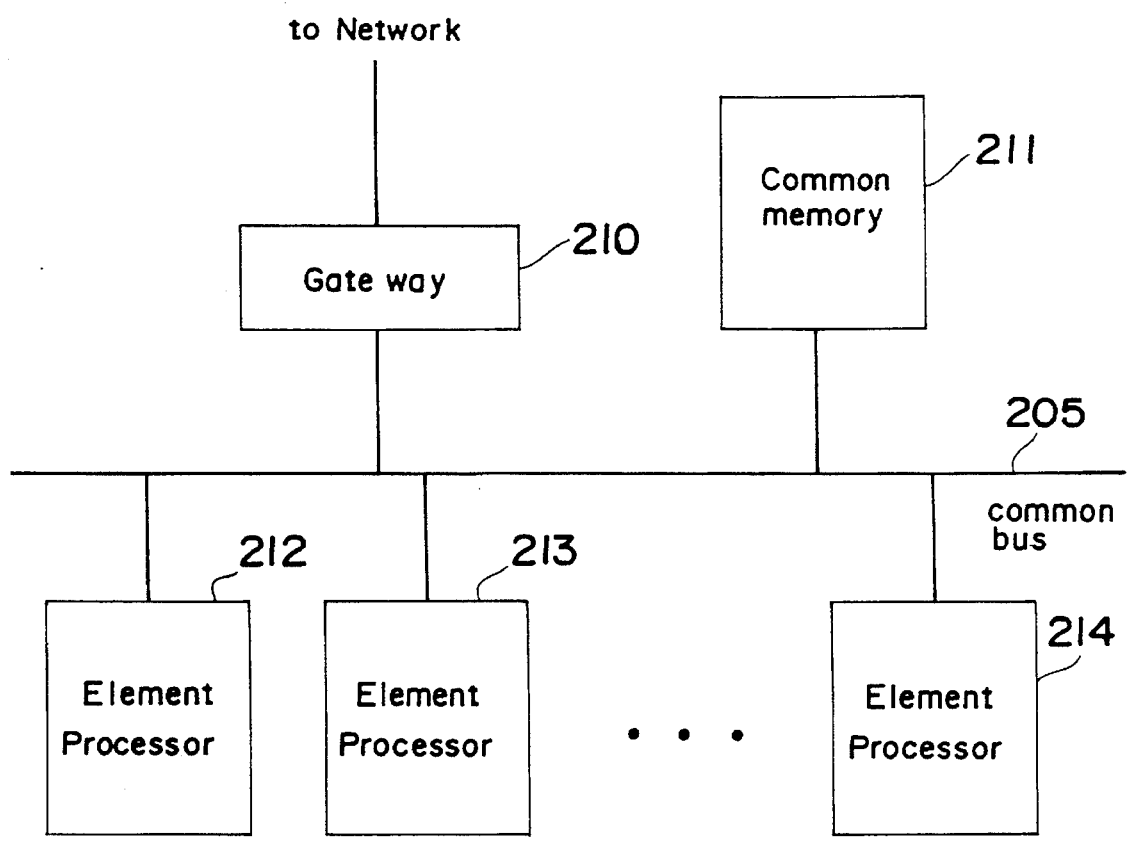
FIG. 20 is a block diagram of a cluster used in the 7th and 8th embodiments.

FIG. 19 shows a block diagram of an element processor or processor module of a parallel computer that implements the seventh embodiment of the present invention. In FIG. 19, 201 is a gate way; 202 is a cache memory; 203 is a central processing unit; 204 is a local memory; 205 is a shared buss. FIG. 20 shows a block diagram of a cluster composed of element processors 212, 213, . . . , 214, a C gateway 210, and a shared memory 211. A network of the parallel computer connects each of the clusters to each other, so that data can be transmitted between any two clusters. Let the number of element processors in each cluster be $P_c$ and the total number of clusters be C. Then the total number P of element processors in the parallel computer is $C \cdot P_c$. Furthermore, let the clusters be denoted by $CL_1, CL_2, \ldots, CL_C$, and let the element processors of $CL_u$ be denoted by $PR_{u\ 1}, \ldots, PR_{u\ P_c}$.

Figure 21:
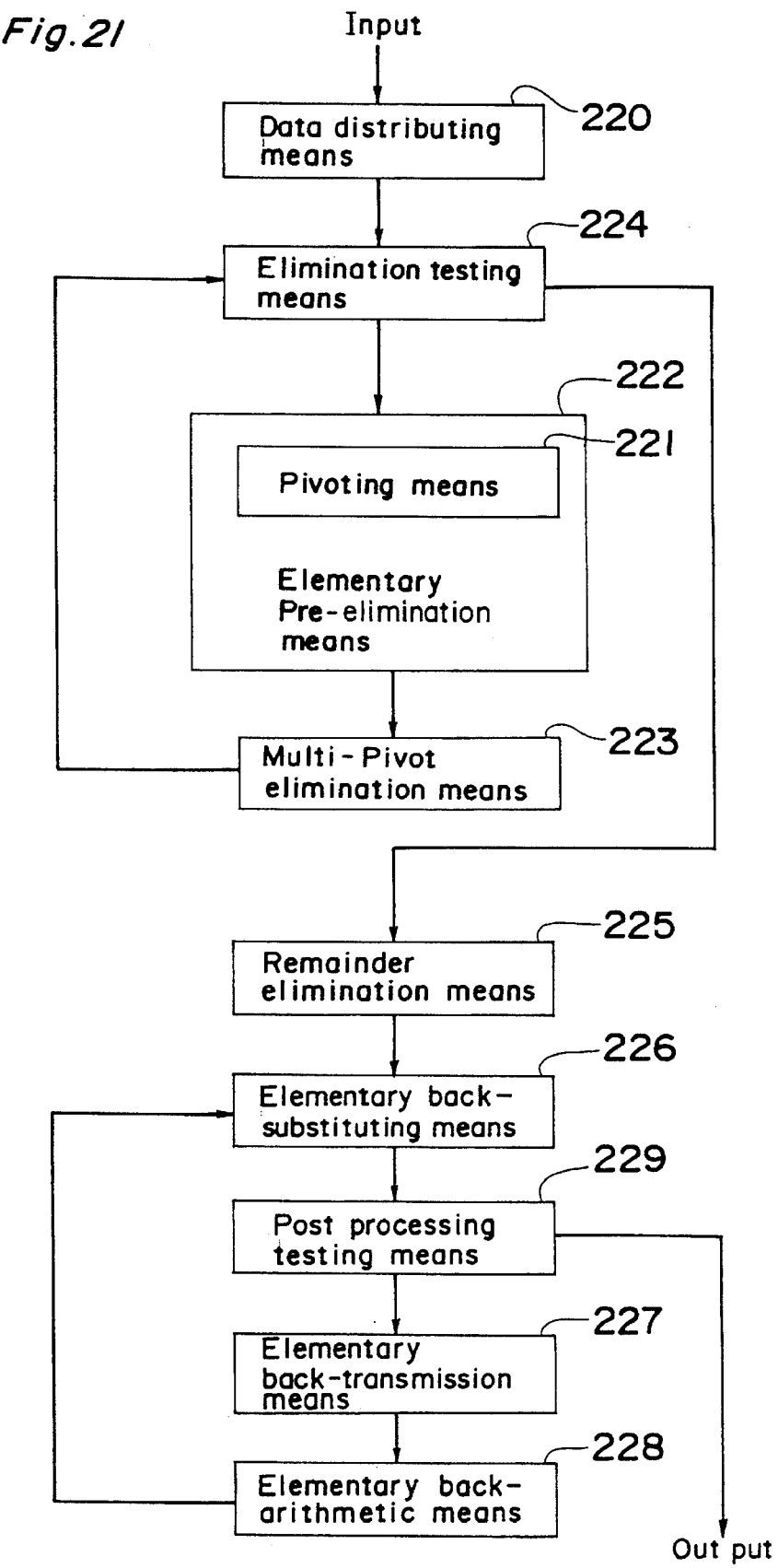
FIG. 21 is a block diagram of the parallel computation method according to the 7th embodiment.

FIG. 21 is a block diagram of parallel linear computation method according to the seventh embodiment of the present invention implemented by a parallel computer structured above. In FIG. 21, 220 is a data distribution means; 221 is a pivoting means; 222 is an elementary pre-elimination means; 223 is a multi-pivot elimination means; 224 is an elimination testing means; 225 is a remainder elimination means; 226 is an elementary back-substitution mean; 227 is an elementary back-transmission means; 228 is an elementary back-calculation means; 229 is a back-processing testing means.

The operation of the parallel linear computation method of the seventh embodiment is described below with reference to FIG. 21.

In the first step, the data distribution means 220 distributes each i-th row of $A^{(0)}$ and i-th component of $b^{(0)}$ and x to the cluster $CL_u$ such that $u=[i/P_c]−[[i/P_c]/C]C+1$. Then the data distribution means 220 assigns each i-th row of $A^{(0)}$ and i-th component of $b^{(0)}$ distributed to the cluster $CL_u$ to the element processor $PR_{u\ v}$ such that $v=i−[i/P_c]P_c+1$. Then the data distribution means initializes k as k=0.

In the second step, the elimination testing means 224 tests if the multi-pivot elimination means repeated its operation $[n/P_c]$ times, that is, whether $k=[n/P_c]$. If it did, then the process jumps to the fifth step. If it did not, the process goes to the third step.

In the third step, the elementary pre-elimination means 222 executes preliminary processing for the i-th rows of reduced matrices and the corresponding known vectors such that $i=kP_c+l$ and $l=1, \ldots, P_c$ in this order. The processing involves a pivot choosing process for each l.

Methods of choosing a pivot are in general classified into either partial pivoting or full pivoting. Partial pivoting chooses as a pivot in each reduced matrix $A^{(r)}$ an element with the largest absolute value in the relevant column or row. Full pivoting chooses as a pivot in each reduced matrix $A^{(r)}$ an element with the largest absolute value in the submatrix of the columns or rows which have not hitherto been pivotal. Besides, if precision is not important so much, then choosing of a pivot is necessary only when the relevant diagonal element is 0, and in that case any nonzero element can be chosen as a pivot in partial pivoting. Pivoting methods in the present invention employ partial pivoting, and the present first method chooses the first nonzero element in the relevant row, and the present second method chooses an element with the greatest absolute value in the relevant row.

Figure 23:
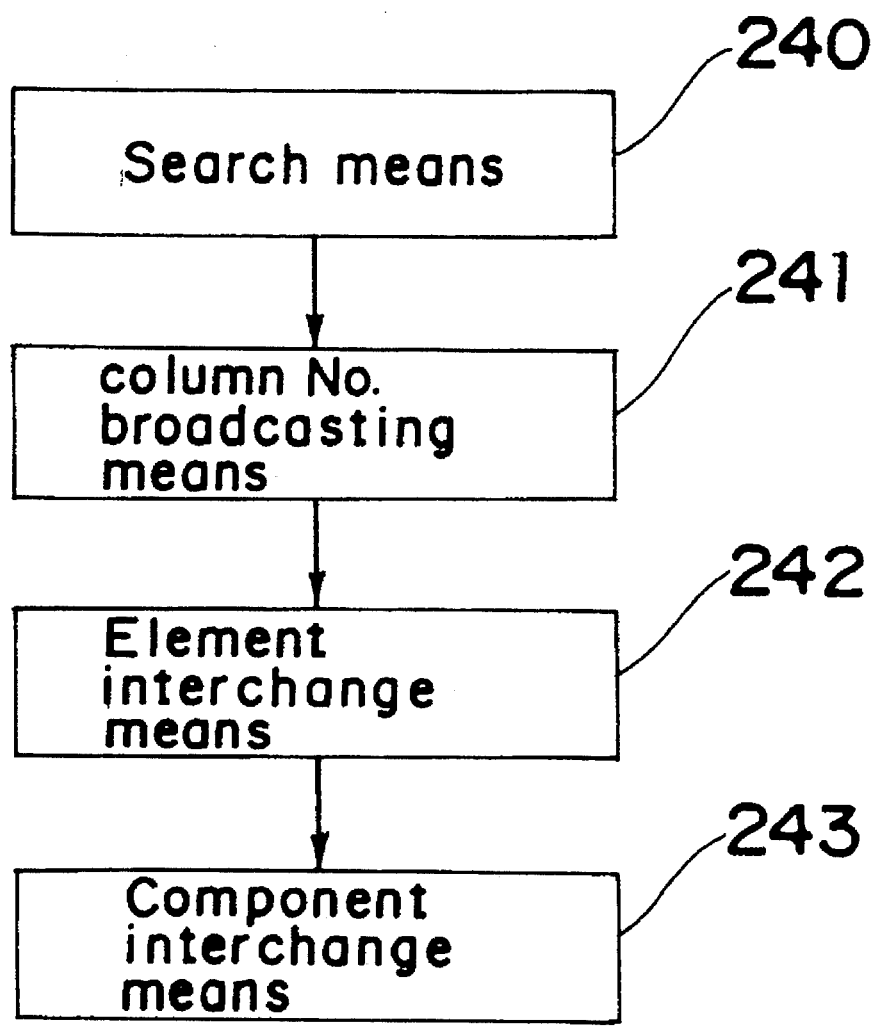
FIG. 23 is a diagram for showing the pivoting method according to the 7th and 8th embodiments.

FIG. 23 shows the process of the pivot choosing means 221. In FIG. 23, 240 is a search means; 241 is a column number broadcasting means; 242 is an element interchange means; 243 is an component interchange means.

In the present first method of pivot choosing, the element processor in charge of each i-th row, by the search means 240, tests if $a^{(i-1)}_{i,i}=0$. If it is not, then the process terminates. If it is, then the element processor, by the search means 240, searches for a nonzero element in the i-th row of $A^{(i-1)}$ from $a^{(i-1)}_{i,i+1}$ to $a^{(i-1)}_{i,n}$ in this order. If $a^{(i-1)}_{i,h}$ is the first such element, then the element processor, by the broadcasting means 241, notifies each element processor of the column number h by a broadcast. Specifically, the element processor either transmits h to a specified word of the shared memory 211 of each cluster, and each element processor refers to the word, or the element processor transmits h to a dedicated bus line, and each element processor fetches h into its local memory 204. Then each element processor, by the element interchange means 242, simultaneously interchanges the element with the column number i with the element with the column number h in the row in its charge. Then two element processors in charge of the i-th component and the h-th component of the unknown vector x respectively interchange these component by the component interchange means 243. The pivot choosing process terminates hereby.

In the present second method of pivot choosing, the element processor in charge of each i-th row, by the search means 240, sets Max=$|a^{(i-1)}_{i,i}|$ and Col=i. The element processor then compares max with $|a^{(i-1)i,j}|$ for j= i+1, ..., n in this order and updates Max and Col as Max=$|a^{(i-1)}_{i,j}|$ and Col=j, only if $|a^{(i-1)}_{i,j}|$ is greater than Max. Then the element processor notifies each element processor of Col by a broadcast. The remaining steps are the same as above.

In the process of the elementary pre-elimination means 222, if l=1, then the element processor $PR_{u,1}$ in charge of the $(kP_c+1)$th row in the cluster $CL_u$, where u= k−[k/C]+1, calculates (32) and (33), and transmits the results to the shared memory of every other cluster to which the element processor in charge of an i-th row such that $kP_c+2≤i≤n$ belongs. If $2≤l≤P_c$, then each element processor in charge of the i-th row such that $kP_c+1≤i≤n$ calculates (34), and the element processor $PR_{u,l}$ calculates (35) and (36). Then after the pivot choosing means determines the pivot (37), the element processor $PR_{u,l}$ calculates (38) and (39) and transmits the results to the shared memory of every other cluster to which the element processor in charge of an i-th row such that $kP_c+l+1≤i≤n$ belongs.

In the fourth step, by the multi-pivot elimination means 223, each element processor in charge of the i-th row such that $(k+1)P_c+1≤i≤n$ calculate (40) and (41) for i.

In the fifth step, by the remainder elimination means 225, each element processor in charge of the i-th row such that $[n/P_c]P_c+1≤i≤n$ executes the same operation as in the elementary pre-elimination means 232 for l=2, ..., n−[n/$P_c$]$P_c$. Then this step initializes i as i=n, and goes to the sixth step.

In the sixth step, by the elementary back-substitution means 226, the element processor in charge of the i-th row calculates (42).

In the seventh step, the back-processing testing means 229 tests if i=n. If it is, then the solution of the system of linear equation (2) has been obtained by the above elementary back-substitution as (44), and the process terminates. If it is not, then the process proceeds to the eighth step.

In the eighth step, an elementary back-transmission means that transmits $x_i$ to the shared memory of every clusters such that the element processor in charge of an h-th row such that $1≤h≤i−1$ belongs.

In the ninth step, by the elementary back-calculation means, each element processor in charge of the h-th row such that $1≤h≤i−1$ calculates (43). Then this step decrements i by 1, and increments goes to the sixth step.

Figure 22:
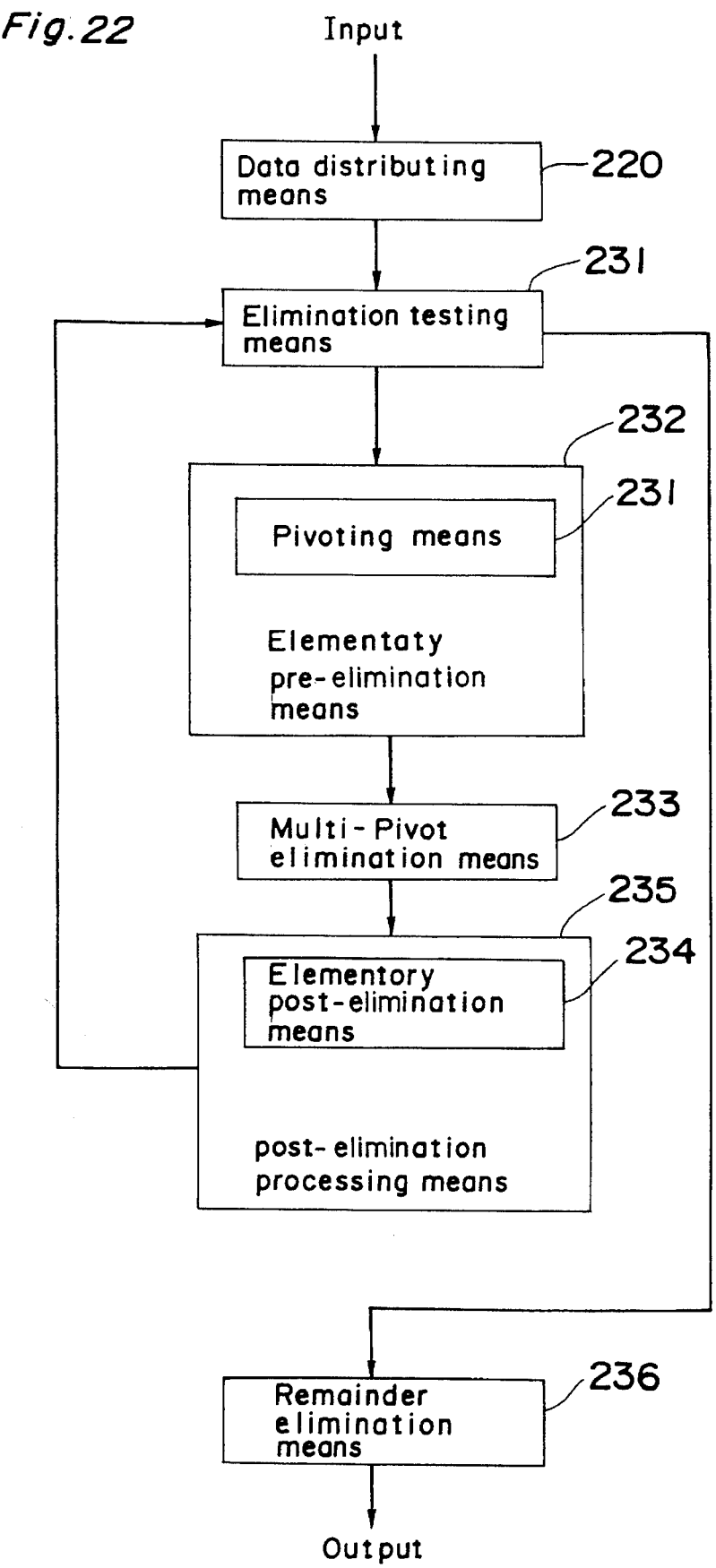
FIG. 22 is a block diagram of the parallel computation method according to the 8th embodiment.

FIG. 22 is a block diagram of parallel linear calculating method in the eighth embodiment of the present invention implemented by a parallel computer structured as in the seventh embodiment. In FIG. 22, 220 is a data distribution means; 221 is a pivot choosing means; 231 is an elimination testing means, 232 is an elementary pre-elimination means; 233 is a multi-pivot elimination means; 234 is an elementary post-elimination means; 225 is a post-elimination processing means; 236 is a remainder elimination means.

The operation of the parallel linear computation method of the seventh embodiment is described below with reference to FIG. 22.

In the first step, the data distribution means 220 distributes each i-th row of $A^{(0)}$ and i-th component of $b^{(0)}$ and x to the cluster $CL_u$ such that u=[i/$P_c$]−[[i/$P_c$]/C]C+1. Then the data distribution means 220 assigns each i-th row of $A^{(0)}$ and i-th component of $b^{(0)}$ distributed to the cluster $CL_u$ to the element processor $PR_{u,v}$ such that v=i−[i/$P_c$]$P_c$+1. Then the data distribution means initializes k as k=0.

In the second step, the elimination testing means 231 tests if the multi-pivot elimination means repeated its operation [n/$P_c$] times, that is, whether k=[n/$P_c$]. If it did, then the process jumps to the sixth step. If it did not, the process goes to the third step.

In the third step, the elementary pre-elimination means 232 executes preliminary processing for the i-th rows of the reduced matrices and the corresponding known vectors such that i=k$P_c$+1 and l=1, ..., $P_c$ in this order. The processing involves a pivot choosing process for each l, which is the same as in the seventh embodiment.

In the pre-elimination means 232, if l=1, then after the pivot choosing means 221 determines the pivot (31), the element processor $PR_{u,1}$ in charge of the $(kP_c+1)$th row in the cluster $CL_u$, where u=k−[k/C]+1, calculates (32) and (33), and transmits the results to the shared memory of every other cluster. If $2≤l≤P_c$, then each element processor in charge of the i-th row such that $kP_c+l≤i≤n$ calculates (34), and the element processor $PR_{u,l}$ calculates (35) and (36). Then after the pivot choosing means determines the pivot (37), the element processor $PR_{u,l}$ calculates (38) and (39) and transmits the results to the shared memory of every other cluster.

In the fourth step, by the multi-pivot elimination means 233, each element processor in charge of the i-th row such that $1≤i≤kP_c$ or $(k+1)P_c+1≤i≤n$ calculates (40) and (41).

In the fifth step, the post-elimination processing means 235 eliminates unnecessary elements generated by the multi-pivot elimination means 233. The core of the post-elimination processing means 235 is the elementary post-elimination means 234, which calculates (45) and (46) in the element processor in charge of the i-th row.

By the post-elimination processing means the element processor in charge of the $(kP_c+w)$th row calculates (45) and (46), where i=$P_c$+w and l=−w+q +1, from w=1 to w=q for q=1, 2, ..., $P_c$−1.

In the sixth step, by the remainder elimination means 236, each element processor in charge of the i-th row such that $[n/P_c]P_c+1≤i≤n$ executes the operation of the elementary pre-elimination means 232. Then the remainder elimination means executes operation of the multi-pivot elimination means 233 followed by the post-elimination processing means 235. The operation of pre-elimination processing means 232 should be executed for l=1, ..., n−[n/$P_c$]$P_c$. The operation of the multi-pivot elimination means 233 should be executed by calculating (40) and (41) for $1 \leq i \leq [n/P_c]P_c$ and $k=[n/P_c]$. The operation of the post-elimination processing means 235 should be executed from $q=1$ to $q=n-[n/P_c]P_c$ for $k=[n/P_c]$.

The unknown vector x is obtained as the vector $b^{(r)}$ after the above operation.

If the preprocessing section $A_t$ and the postprocessing section $C_t$ have their own register sets as the updating section B and B' in the first embodiment through the six embodiment, and their operations are executed by retaining values of variables and divisors, then the number of load-and-store operations for the memory are reduced, and further improvement in computation speed can be achieved.

In the seventh and eighth embodiments two components of the unknown vector should be interchanged if the corresponding columns are interchanged by the pivoting means. However, it is not necessary to actually transpose the components. By simply memorizing the correct position of the components after each interchange of columns, the correct solution is obtained by considering the positions in the final substitution to the components of the unknown vector.

Thus the present invention provides high-speed linear calculating equipment and parallel linear calculating equipment for solving systems of linear equations by means of Gauss's elimination method and Gauss-Jordan's method based on multi-pivot simultaneous elimination and scalar operations. The speed-up is achieved by reducing the number of load-and-store operations for the memory by retaining values of variables in register sets in updating processing, and reducing the number of iteration by multi-pivot simultaneous elimination. And the present invention is easily implementation in scalar computers. In fact, an experiment done in a scalar computer by means of software showed that Gauss's method and Gauss-Jordan's method based on 8-pivot simultaneous elimination was 2.5 times faster than original Gauss's elimination method and Gauss-Jordan's elimination method.

As for the parallel calculating equipment of the third through sixth embodiments of the seventh and eighth embodiments, each memory is assigned blocks of k rows of the coefficient matrix $A^{(0)}$ for the k-pivot simultaneous elimination method, so that effects of parallel computation are enhanced. In the fifth and sixth embodiments, where element processors are clustered, the preprocessing or both the preprocessing and the postprocessing are also made parallel, and the computation is more effective. In these embodiments, a theoretical estimation has shown that if the number of components of the unknown vector X is sufficiently large for a definite number of processors, then the effects of parallel computation are sufficiently powerful. Therefore, parallel linear calculating equipment effectively employing Gauss method and Gauss-Jordan method based on multi-pivot simultaneous elimination has been obtained.

Furthermore, the present invention effectively makes possible high-speed parallel computation for solving systems of linear equations using a parallel computer with a number of element processors by means of the methods of the seventh and eighth embodiments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data processing machine for the numerical solution of linear equations represented by $Ax=b$, where $A=(a_{i,j})$ ($1 \leq i \leq n$, $1 \leq j \leq n$, and n is an integer larger than 1) is a coefficient matrix of n rows and n columns, $x=(x_1, x_2, \ldots, x_n)^{Trans}$ is an unknown vector and $b=(b_1, b_2, \ldots, b_n)^{Trans}$ is a known vector, comprising:

a memory;

a pivot choosing section connected to said memory for choosing pivots by searching said coefficient matrix in a row direction and interchanging elements of said coefficient matrix according to a column-interchange method;

a preprocessing section $A_1$ connected to said memory for calculating $$a_{pk+1,j}^{(pk+1)} = a_{pk+1,j}^{(pk)} / a_{pk+1,pk+1}^{(pk)} \quad \text{Eq. 1}$$

$$b_{pk+1}^{(pk+1)} = b_{pk+1}^{(pk)} / a_{pk+1,pk+1}^{(pk)} \quad \text{Eq. 2}$$

after said pivot choosing section chooses $$a_{pk+1,pk+1}^{(pk)} \quad \text{Eq. 3}$$

wherein $a_{i,j}^{(r)}$ denotes (i,j) element of a coefficient matrix obtained when first to r-th columns are eliminated from $A=(a_{i,j})$, $b_i^{(r)}$ denotes i-th component of a known vector obtained when first to r-th columns are eliminated from $A=(a_{i,j})$, k is an integer satisfying $1 \leq k \leq n-1$, wherein if $n-\{n/k\}k=0$, $\{n/k\}$ denotes a maximum integer not exceeding n/k, p is an integer satisfying $0 \leq p \leq \{n/k\}-1$, and, if $n-\{n/k\}k>0$, p is an integer satisfying $0 \leq p \leq \{n/k\}$, and j is an integer satisfying $pk+2 \leq j \leq n$;

2nd to k-th preprocessing sections $A_t$ (t is an integer satisfying $2 \leq t \leq k$) connected to said memory, respectively, each for calculating the following equations:

$$Reg_{pk+t}^{(0)} = a_{pk+t,pk+1}^{(pk)} \quad \text{Eq. 4}$$

$$Reg_{pk+t}^{(1)} = a_{pk+t,pk+2}^{(pk)} - Reg_{pk+t}^{(0)} Reg_{pk+1,pk+2}^{(pk+1)} \quad \text{Eq. 5}$$

$\ldots$
$\ldots$
$\ldots$ $$Reg_{pk+t}^{(t-2)} = a_{pk+t,pk+t-1}^{(pk)} - \sum_{m=1}^{t-2} Reg_{pk+t}^{(m-1)} a_{pk+m,pk+t-1}^{(pk+m)} \quad \text{Eq. 6}$$

wherein j is integer satisfying $pk+t \leq j \leq n$ and, after said $$a_{pk+t,j}^{(pk+t-1)} = a_{pk+t,j}^{(pk)} - \sum_{m=1}^{t-1} Reg_{pk+t}^{(m-1)} a_{pk+m,j}^{(pk+m)} \quad \text{Eq. 7}$$

$$b_{pk+t}^{(pk+t-1)} = b_{pk+t}^{(pk)} - \sum_{m=1}^{t-1} Reg_{pk+t}^{(m-1)} b_{pk+m}^{(pk+m)} \quad \text{Eq. 8}$$

pivot choosing section chooses $$a_{pk+t,pk+t}^{(pk+t-1)} \quad \text{Eq. 9}$$

calculating equations $$a_{pk+t,j}^{(pk+t)} = a_{pk+t,j}^{(pk+t-1)} / a_{pk+t,pk+t}^{(pk+t-1)} \quad \text{Eq. 10}$$

$$b_{pk+t}^{(pk+t)} = b_{pk+t}^{(pk+t-1)} / a_{pk+t,pk+t}^{(pk+t-1)} \quad \text{Eq. 11}$$

for each element of a (pk+t)-th row of said coefficient matrix and for a (pk+t)-th component of said known vector wherein j is integer satisfying pk+t+1≦j≦n;

an updating section B connected to said memory and comprised of a register set consisting of k registers for registering variables Reg and an arithmetic unit;

said arithmetic unit for calculating the following equations:

$$Reg_i^{(0)} = a^{(pk)}_{i,pk+1} \quad \text{Eq. 12}$$

$$Reg_i^{(1)} = a^{(pk)}_{i,pk+2} - Reg_i^{(0)} a^{(pk+1)}_{pk+1,pk+2} \quad \text{Eq. 13}$$

$$\ldots,$$

$$Reg_i^{(k-1)} = a^{(pk)}_{i,(p+1)k} - \sum_{m=1}^{k-1} Reg_i^{(m-1)} a^{(pk+m)}_{pk+m,(p+1)k} \quad \text{Eq. 14}$$

$$a^{((p+1)k)}_{i,j} = a^{(pk)}_{i,j} - \sum_{m=1}^{k} Reg_i^{(m-1)} a^{(pk+m)}_{pk+m,j} \quad \text{Eq. 15}$$

$$b_i^{((p+1)k)} = b_i^{(pk)} - \sum_{m=1}^{k} Reg_i^{(m-1)} b^{(pk+m)}_{pk+m} \quad \text{Eq. 16}$$

for i and j satisfying (p+1)k+1≦(i, j)≦n while holding variables Reg in said register set;

a main controller G which, if n−{n/k}k=0, instructs said pivot choosing section, said preprocessing sections $A_1$ to $A_k$ and said updating section B to repeat their operations for every p from zero to {n/k}−2 while incrementing p by one and, further, to execute their operations after incrementing p from p={n/k}−2 to p={n/k}−1, and if n−{n/k}k>0, instructs said pivot choosing section, said preprocessing sections $A_1$ to $A_k$ and said updating section B to repeat their operations for every p from zero to {n/k}−1 while incrementing p by one, and instructs said pivot choosing section and said preprocessing sections $A_1$ to $A_{n-\{n/k\}}$ to execute their operations after incrementing p by one from p={n/k}−1;

a backward substitution section connected to said memory for calculating the following equations, repeatedly $$x_i = b_i^{(n)} \quad \text{Eq. 17}$$

$$b_i^{(r+1)} = b_i^{(r)} - a_{i,j}^{(i)} x_j \quad \text{Eq. 18}$$

while decrementing i from i=n to i=1, thereby obtaining said unknown vector.

2. A data processing machine for the numerical solution of linear equations represented by Ax=b, where A= ($a_{i,j}$)1≦i≦n, 1≦j≦n, and n is an integer larger than 1) is a coefficient matrix of n rows and n columns, x=($x_1, x_2, \ldots, x_n$)$^{Trans}$ is an unknown vector and b=($b_1, b_2, \ldots, b_n$)$^{Trans}$ is a known vector, comprising:

a memory;

a pivot choosing section connected to said memory for choosing pivots by searching said coefficient matrix in a row direction and interchanging elements of said coefficient matrix according to a column-interchange method;

a preprocessing section $A_1$ connected to said memory for calculating $$a_{pk+1,j}^{(pk+1)} = a_{pk+1,j}^{(pk)} / a_{pk+1,pk+1}^{(pk)} \quad \text{Eq. 1}$$

$$b_{pk+1}^{(pk+1)} = b_{pk+1}^{(pk)} / a_{pk+1,pk+1}^{(pk)} \quad \text{Eq. 2}$$

after said pivot choosing section chooses $$a_{pk+1,pk+1}^{(pk)} \quad \text{Eq. 3}$$

wherein $a_{i,j}^{(r)}$ denotes (i,j) element of a coefficient matrix obtained when first to r-th columns are eliminated from A=($a_{i,j}$), $b_i^{(r)}$ denotes i-th component of a known vector obtained when first to r-th columns are eliminated from A=($a_{i,j}$), k is an integer satisfying 1≦k≦n−1, if n−{n/k}k=0, wherein {n/k} denotes a maximum integer not exceeding n/k, p is an integer satisfying 0≦p≦{n/k}−1, and, if n−{n/k}k>0, p is an integer satisfying 0≦p≦{n/k}, and j is an integer satisfying pk+2≦j≦n;

2nd to k-th preprocessing sections $A_t$ (t is an integer satisfying 2≦t≦k) connected to said memory, respectively, each for calculating the following equations:

$$Reg_{pk+t}^{(0)} = a^{(pk)}_{pk+t,pk+1} \quad \text{Eq. 4}$$

$$Reg_{pk+t}^{(1)} = a^{(pk)}_{pk+t,pk+2} - Reg_{pk+1}^{(0)} Reg_{pk+1,pk+2}^{(pk+1)} \quad \text{Eq. 5}$$

$$\ldots$$

wherein j is integer satisfying pk+t≦j≦n and, after said $$Reg_{pk+t}^{(t-2)} = a^{(pk)}_{pk+t,pk+t-1} - \sum_{m=1}^{t-2} Reg_{pk+2}^{(m-1)} a^{(pk+m)}_{pk+m,pk+t-1} \quad \text{Eq. 6}$$

$$a^{(pk+t-1)}_{pk+t,j} = a^{(pk)}_{pk+t,j} - \sum_{m=1}^{t-1} Reg_{pk+t}^{(m-1)} a^{(pk+m)}_{pk+m,j} \quad \text{Eq. 7}$$

$$b_{pk+t}^{(pk+t-1)} = b_{pk+t}^{(pk)} - \sum_{m=1}^{t-1} Reg_{pk+t}^{(m-1)} b^{(pk+m)}_{pk+m} \quad \text{Eq. 8}$$

pivot choosing section chooses $$a_{pk+t,pk+t}^{(pk+t-1)} \quad \text{Eq. 9}$$

calculating equations $$a_{pk+t,j}^{(pk+t)} = a_{pk+t,j}^{(pk+t-1)} / a_{pk+t,pk+t}^{(pk+t-1)} \quad \text{Eq. 10}$$

$$b_{pk+t}^{(pk+t)} = b_{pk+t}^{(pk+t-1)} / a_{pk+t,pk+t}^{(pk+t-1)} \quad \text{Eq. 11}$$

for each element of a (pk+t)-th row of said coefficient matrix and for a (pk+t)-th component of said known vector wherein j is integer satisfying pk+t+1≦j≦n;

an updating section B connected to said memory and comprised of a register set consisting of k registers for registering variables Reg and an arithmetic unit;

said arithmetic unit for calculating the following equations:

$$Reg_i^{(0)} = a^{(pk)}_{i,pk+1} \quad \text{Eq. 12}$$

$$Reg_i^{(1)} = a^{(pk)}_{i,pk+2} - Reg_i^{(0)} a^{(pk+1)}_{pk+1,pk+2} \quad \text{Eq. 13}$$

$$\ldots,$$

$$Reg_i^{(k-1)} = a^{(pk)}_{i,(p+1)k} - \sum_{m=1}^{k-1} Reg_i^{(m-1)} a^{(pk+m)}_{pk+m,(p+1)k} \quad \text{Eq. 14}$$

$$a^{((p+1)k)}_{i,j} = a^{(pk)}_{i,j} - \sum_{m=1}^{k} Reg_i^{(m-1)} a^{(pk+m)}_{pk+m,j} \quad \text{Eq. 15}$$

$$b_i^{((p+1)k)} = b_i^{(pk)} - \sum_{m=1}^{k} Reg_i^{(m-1)} b^{(pk+m)}_{pk+m} \quad \text{Eq. 16}$$

using (i, j) elements of an i-th row of said coefficient matrix for i satisfying 1≦i≦pk or (p+1)k+1≦i≦n and j satisfying (p+1)k+1≦j≦n while holding variables Reg in said register set;

(k–1) postprocessors $C_1$ to $C_{k-1}$ each connected to said memory for calculating $$Reg^{(0)} = a_{pk+1,pk+t+1}^{(pk+t)} \qquad \text{Eq. 17}$$

$$Reg^{(1)} = a_{pk+2,pk+t+1}^{(pk+t)} \qquad \text{Eq. 18}$$

$$Reg^{(t-1)} = a_{pk+t,pk+t+1}^{(pk+t)} \qquad \text{Eq. 19}$$

$$a_{pk+1,j}^{(pk+t+1)} = a_{pk+1,j}^{(pk+t)} - Reg^{(0)} a_{pk+t+1,j}^{(pk+t+1)} \qquad \text{Eq. 20}$$

$$a_{pk+2,j}^{(pk+t+1)} = a_{pk+2,j}^{(pk+t)} - Reg^{(1)} a_{pk+t+1,j}^{(pk+t+1)} \qquad \text{Eq. 21}$$

$$a_{pk+t,j}^{(pk+t+1)} = a_{pk+t,j}^{(pk+t)} - Reg^{(t-1)} a_{pk+t+1,j}^{(pk+t+1)} \qquad \text{Eq. 22}$$

$$b_{pk+1}^{(pk+t+1)} = b_{pk+1}^{(pk+t)} - Reg^{(0)} b_{pk+t+1}^{(pk+t+1)} \qquad \text{Eq. 23}$$

$$b_{pk+2}^{(pk+t+1)} = b_{pk+2}^{(pk+t)} - Reg^{(1)} b_{pk+t+1}^{(pk+t+1)} \qquad \text{Eq. 24}$$

$$b_{pk+t}^{(pk+t+1)} = b_{pk+t}^{(pk+t)} - Reg^{(t-1)} b_{pk+t+1}^{(pk+t+1)} \qquad \text{Eq. 25}$$

using elements of a (pk+1)-th row to a (pk+t)-th row and (pk+1)-th to (pk+t)-th components of said known vector for j satisfying pk+t+2≦j≦n;

a main controller J which obtains said unknown vector by,
if n–{n/k} k=0, instructing said pivot choosing section, said preprocessing sections $A_1$ to $A_k$, said updating section B and said postprocessors $C_1$ to $C_{k-1}$ to repeat their linking operations from p=0 to p=[n/k]–1, and,
if n–{n/k}k>0, instructing said pivot choosing section, said preprocessing section $A_1$ to $A_k$, said updating section B and said postprocessors $C_1$ to $C_{k-1}$ to repeat their linking operations from p=0 to p={n/k}–1 and, thereafter, instructing after setting p={n/k}, said pivot choosing section, said preprocessing sections $A_1$ to $A_{n-\{n/k\}k}$, said updating section B and said postprocessors $C_1$ to $C_{n-\{n/k\}k}$ to execute linking operations of said pivot choosing section and said preprocessing sections $A_1$ to $A_{n-\{n/k\}k}$, a processing wherein a number of pivots in said updating section B is set at n–{n/k}k and linking operations of said postprocessing sections $C_1$ to $C_{n-\{n/k\}k}$.

3. A data processing machine for the numerical solution of linear equations represented by Ax=b, where A= $(a_{i,j})(1 \leq i \leq n, 1 \leq j \leq n,$ and n is an integer larger than 1) is a coefficient matrix of n rows and n columns, $x=(x_1, x_2, \ldots, x_n)^{Trans}$ is an unknown vector and $b=(b_1, b_2, \ldots, b_n)^{Trans}$ is a known vector, comprising:

a network comprising P nodes $\alpha_0$ to $\alpha_{P-1}$ connected with each other, each node comprising;
a memory;
a pivot choosing section connected to said memory for choosing pivots by searching said coefficient matrix in a row direction and interchanging elements of said coefficient matrix according to a column-interchange method;
a preprocessing section $A_1$ connected to said memory for calculating $$a_{pk+1,j}^{(pk+1)} = a_{pk+1,j}^{(pk)}/a_{pk+1,pk+1}^{(pk)} \qquad \text{Eq. 1}$$

$$b_{pk+1}^{(pk+1)} = b_{pk+1}^{(pk)}/a_{pk+1,pk+1}^{(pk)} \qquad \text{Eq. 2}$$

after said pivot choosing section chooses $$a_{pk+1,pk+1}^{(pk)} \qquad \text{Eq. 3}$$

wherein $a_{i,j}^{(r)}$ denotes (i,j) element of a coefficient matrix obtained when first to r-th columns are eliminated from A=$(a_{i,j})$, $b_i^{(r)}$ denotes i-th component of a known vector obtained when first to r-th columns are eliminated from A=$(a_{i,j})$,
k is an integer satisfying 1≦k≦n–1,
if n–{n/k}k=0, wherein {n/k} denotes a maximum integer not exceeding n/k, p is an integer satisfying 0≦p≦{n/k}–1,
and, if n–{n/k}k>0, p is an integer satisfying 0≦p≦{n/k}, and
j is an integer satisfying pk+2≦j≦n;
2nd to k-th preprocessing sections $A_t$ (t is an integer satisfying 2≦t≦k) connected to said memory, respectively, each for calculating the following equations:

$$Reg_{pk+t}^{(0)} = a_{pk+t,pk+1}^{(pk)} \qquad \text{Eq. 4}$$

$$Reg_{pk+t}^{(1)} = a_{pk+t,pk+2}^{(pk)} - Reg_{pk+t}^{(0)} Reg_{pk+1,pk+2}^{(pk+1)} \qquad \text{Eq. 5}$$

$$\ldots$$
$$\ldots$$
$$\ldots$$

$$Reg_{pk+t}^{(t-2)} = a_{pk+t,pk+t-1}^{(pk)} - \sum_{m=1}^{t-2} Reg_{pk+2}^{(m-1)} a_{pk+m,pk+t-1}^{(pk+m)} \qquad \text{Eq. 6}$$

$$a_{pk+t,j}^{(pk+t-1)} = a_{pk+t,j}^{(pk)} - \sum_{m=1}^{t-1} Reg_{pk+t}^{(m-1)} a_{pk+m,j}^{(pk+m)} \qquad \text{Eq. 7}$$

$$b_{pk+t}^{(pk+t-1)} = b_{pk+t}^{(pk)} - \sum_{m=1}^{t-1} Reg_{pk+t}^{(m-1)} b_{pk+m}^{(pk+m)} \qquad \text{Eq. 8}$$

wherein j is integer satisfying pk+t≦j≦n and, after said pivot choosing section chooses $$a_{pk+t,pk+t}^{(pk+t-1)} \qquad \text{Eq. 9}$$

calculating equations $$a_{pk+t,j}^{(pk+t)} = a_{pk+t,j}^{(pk+t-1)}/a_{pk+t,pk+t}^{(pk+t-1)} \qquad \text{Eq. 10}$$

$$b_{pk+t}^{(pk+t)} = b_{pk+t}^{(pk+t-1)}/a_{pk+t,pk+t}^{(pk+t-1)} \qquad \text{Eq. 11}$$

for each element of a (pk+t)-th row of said coefficient matrix and for a (pk+t)-th component of said known vector wherein j is integer satisfying pk+t+1≦j≦n;
an updating section B connected to said memory and comprised of a register set consisting of k registers for registering variables Reg and an arithmetic unit;
said arithmetic unit for calculating the following equations:

$$Reg_i^{(0)} = a_{i,pk+1}^{(pk)} \qquad \text{Eq. 12}$$

$$Reg_i^{(1)} = a_{i,pk+2}^{(pk)} - Reg_i^{(0)} a_{pk+1,pk+2}^{(pk+1)} \qquad \text{Eq. 13}$$

$$\ldots,$$

$$Reg_i^{(k-1)} = a_{i,(p+1)k}^{(pk)} - \sum_{m=1}^{k-1} Reg_i^{(m-1)} a_{pk+m,(p+1)k}^{(pk+m)} \qquad \text{Eq. 14}$$

$$a_{i,j}^{((p+1)k)} = a_{i,j}^{(pk)} - \sum_{m=1}^{k} Reg_i^{(m-1)} a_{pk+m,j}^{(pk+m)} \qquad \text{Eq. 15}$$

$$b_i^{((p+1)k)} = b_i^{(pk)} - \sum_{m=1}^{k} Reg_i^{(m-1)} b_{pk+m}^{(pk+m)} \qquad \text{Eq. 16}$$

a gateway connected to said memory and provided as a junction for an external apparatus; and
a transmitter connected to said memory for transmitting data between said memory and said external apparatus through said gateway; and
a main controller $G_p$ for obtaining said unknown vector by executing control of (a) allocating every k rows of said coefficient matrix and every k components of each of said unknown vector and said known vector each of which has a component number equal to a row number of each of every k rows allocated to said memories of said P nodes $\alpha_0$ to $\alpha_{P-1}$ in an order of $\alpha_0$ to $\alpha_{P-1}$ cyclically until all elements of said coefficient matrix and all components of each of said unknown vector and said known vector are completely allocated to said memories of said P nodes $\alpha_0$ to $\alpha_{P-1}$, (b) if n−{n/k}k=0, instructing said P nodes $\alpha_0$ to $\alpha_{P-1}$ to repeat parallel preprocess $PA_1$ to parallel preprocess $PA_k$ and parallel updating process PB from p=0 to p={n/k}−2 and, further, to execute parallel preprocess $PA_1$ to parallel preprocess $PA_k$ for p= {n/k}−1, and if n−{n/k}k>0, instructing said P nodes $\alpha_0$ to $\alpha_{P-1}$ to repeat parallel preprocess $PA_1$ to parallel preprocess $PA_k$ and parallel updating process PB from p=0 to p={n/k}−1 and, further, to execute parallel preprocess $PA_1$ to $PA_{n-\{n/k\}k}$ for p={n/k}, and (c) instructing each node to obtain values of said unknown vector using backward substitution and transmitter of each node after completion of steps of (a) and (b);

said parallel preprocess $PA_1$ including calculating Eq. 1 and Eq. 2 (pk+2≤j≤n) for elements of a (pk+1)-th row of said coefficient matrix and a (pk+1)-th component of said known vector at node $\alpha_u$ (0≤u≤P−1), after said pivot choosing section of said node chooses a pivot represented by Eq. 3, to which (pk+1)-th to (p+1)k-th rows of said coefficient matrix have been allocated, transmitting results of calculation to respective memories of said nodes other than $\alpha_u$ by said transmitter of $\alpha_u$, calculating Eq. 15 at each updating section B of said nodes other than $\alpha_u$ for respective elements of allocated rows of said coefficient matrix in parallel to calculation of Eq. 1 and Eq. 2, and calculating Eq. 15 at said updating section B of said node $\alpha_u$ if rows other than (pk+1)-th to (p+1)k-th rows of said coefficient matrix are allocated to said node $\alpha_u$;

said parallel preprocess $PA_t$ (2≤t≤k) including calculating Eq. 4, Eq. 5, . . . , Eq. 6, Eq. 7 and Eq. 8 for each element of (pk+t)-th row of said coefficient matrix and (pk+t)-th component of said known vector (pk+t≤j≤n) at said preprocessing section $A_t$ (2≤t≤k) of said node $\alpha_u$, calculating Eq. 10 and Eq. 11, after choice of a pivot represented by Eq. 9, at said pivot choosing section for each element of (pk+t)-th row of said coefficient matrix and (pk+t)-th component of said known vector, transmitting results of calculation of respective memories of nodes other than $\alpha_u$, and calculating $$Reg_i^{(t-1)} = a_{i,pk+t}^{(pk)} - \sum_{m=1}^{t-1} Reg_i^{(m-1)} a_{pk+m,pk+t}^{(pk+m)} \quad \text{Eq. 17}$$

for allocated rows of said coefficient matrix at respective updating sections B of nodes other than $\alpha_u$ and calculating Eq. 17 at said updating section B of said node $\alpha_u$ if rows other than (pk+1)-th to (p+1)k-th rows of said coefficient matrix have been allocated to said node $\alpha_u$; and said parallel updating process PB including calculating Eq. 15 and Eq. 16 for ((p+1)k+1)-th row to n-th row at respective updating sections of all nodes to which ((p+1)k+1)-th row to n-th row have been allocated, respectively, while holding variables Reg in said register set.

4. A data processing machine for the numerical solution of linear equations represented by Ax=b, where A= ($a_{i,j}$)(1≤i≤n, 1≤j≤n, and n is an integer larger than 1) is a coefficient matrix of n rows and n columns, x=($x_1, x_2, \ldots, x_n$)$^{Trans}$ is an unknown vector and b=($b_1, b_2, \ldots, b_n$)$^{Trans}$ is a known vector, comprising:

a network comprising P nodes $\alpha_0$ to $\alpha_{P-1}$ connected with each other, each node comprising;

a memory;

a pivot choosing section connected to said memory for choosing pivots by searching said coefficient matrix in a row direction and interchanging elements of said coefficient matrix according to a column-interchange method;

a preprocessing section $A_1$ connected to said memory for calculating $$a_{pk+1,j}^{(pk+1)} = a_{pk+1,j}^{(pk)} / a_{pk+1,pk+1}^{(pk)} \quad \text{Eq. 1}$$

$$b_{pk+1}^{(pk+1)} = b_{pk+1}^{(pk)} / a_{pk+1,pk+1}^{(pk)} \quad \text{Eq. 2}$$

after said pivot choosing section chooses $$a_{pk+1,pk+1}^{(pk)} \quad \text{Eq. 3}$$

wherein $a_{i,j}^{(r)}$ denotes (i,j) element of a coefficient matrix obtained when first to r-th columns are eliminated from A=($a_{i,j}$), $b_i^{(r)}$ denotes i-th component of a known vector obtained when first to r-th columns are eliminated from A=($a_{i,j}$), k is an integer satisfying 1≤k≤n−1, if n−{n/k}k=0, wherein {n/k} denotes a maximum integer not exceeding n/k, p is an integer satisfying 0≤p≤{n/k}−1, and, if n−{n/k}k>0, p is an integer satisfying 0≤p≤{n/k}, and j is an integer satisfying pk+2≤j≤n;

2nd to k-th preprocessing sections $A_t$ (t is an integer satisfying 2≤t≤k) connected to said memory, respectively, each for calculating the following equations:

$$Reg_{pk+t}^{(0)} = a_{pk+t,pk+1}^{(pk)} \quad \text{Eq. 4}$$

$$Reg_{pk+t}^{(1)} = a_{pk+t,pk+2}^{(pk)} - Reg_{pk+1}^{(0)} Reg_{pk+1,pk+2}^{(pk+1)} \quad \text{Eq. 5}$$

$\ldots$
$\ldots$
$\ldots$ $$Reg_{pk+t}^{(t-2)} = a_{pk+t,pk+t-1}^{(pk)} - \sum_{m=1}^{t-2} Reg_{pk+2}^{(m-1)} a_{pk+m,pk+t-1}^{(pk+m)} \quad \text{Eq. 6}$$

$$a_{pk+t,j}^{(pk+t-1)} = a_{pk+t,j}^{(pk)} - \sum_{m=1}^{t-1} Reg_{pk+t}^{(m-1)} a_{pk+m,j}^{(pk+m)} \quad \text{Eq. 7}$$

$$b_{pk+t}^{(pk+t-1)} = b_{pk+t}^{(pk)} - \sum_{m=1}^{t-1} Reg_{pk+t}^{(m-1)} b_{pk+m}^{(pk+m)} \quad \text{Eq. 8}$$

wherein j is integer satisfying pk+t≤j≤n and, after said pivot choosing section chooses $$a_{pk+t,pk+t}^{(pk+t-1)} \quad \text{Eq. 9}$$

calculating equations $$a_{pk+t,j}^{(pk+t)} = a_{pk+t,j}^{(pk+t-1)} / a_{pk+t,pk+t}^{(pk+t-1)} \quad \text{Eq. 10}$$

$$b_{pk+t}^{(pk+t)} = b_{pk+t}^{(pk+t-1)} / a_{pk+t,pk+t}^{(pk+t-1)} \quad \text{Eq. 11}$$

for each element of a (pk+t)-th row of said coefficient matrix and for a (pk+t)-th component of said known vector wherein j is integer satisfying pk+t+1≦j≦n;

an updating section B connected to said memory and comprised of a register set consisting of k registers for registering variables Reg and an arithmetic unit;

said arithmetic unit for calculating the following equations:

$$Reg_i^{(0)} = a^{(pk)}_{i,pk+1} \qquad \text{Eq. 12}$$

$$Reg_i^{(1)} = a^{(pk)}_{i,pk+2} - Reg_i^{(0)} a^{(pk+1)}_{pk+1,pk+2} \qquad \text{Eq. 13}$$

..., $$Reg_i^{(k-1)} = a^{(pk)}_{i,(p+1)k} - \sum_{m=1}^{k-1} Reg_i^{(m-1)} a^{(pk+m)}_{pk+m,(p+1)k} \qquad \text{Eq. 14}$$

$$a^{((p+1)k)}_{i,j} = a^{(pk)}_{i,j} - \sum_{m=1}^{k} Reg_i^{(m-1)} a^{(pk+m)}_{pk+m,j} \qquad \text{Eq. 15}$$

$$b_i^{((p+1)k)} = b_i^{(pk)} - \sum_{m=1}^{k} Reg_i^{(m-1)} b^{(pk+m)}_{pk+m} \qquad \text{Eq. 16}$$

using (i, j) elements of i-th row of said coefficient matrix for i satisfying 1≦i≦pk or (p+1)k+1≦i≦n and j satisfying (p+1)k+1≦j≦n while holding variables Reg in said register set;

(k−1) postprocessors $C_1$ to $C_{k-1}$ each connected to said memory for calculating $$Reg^{(0)} = a^{(pk+t)}_{pk+1,pk+t+1} \qquad \text{Eq. 17}$$

$$Reg^{(1)} = a^{(pk+t)}_{pk+2,pk+t+1} \qquad \text{Eq. 18}$$

$$Reg^{(t-1)} = a^{(pk+t)}_{pk+t,pk+t+1} \qquad \text{Eq. 19}$$

$$a^{(pk+t+1)}_{pk+1,j} = a^{(pk+t)}_{pk+1,j} - Reg^{(0)} a^{(pk+t+1)}_{pk+t+1,j} \qquad \text{Eq. 20}$$

$$a^{(pk+t+1)}_{pk+2,j} = a^{(pk+t)}_{pk+2,j} - Reg^{(1)} a^{(pk+t+1)}_{pk+t+1,j} \qquad \text{Eq. 21}$$

$$a^{(pk+t+1)}_{pk+t,j} = a^{(pk+t)}_{pk+t,j} - Reg^{(t-1)} a^{(pk+t+1)}_{pk+t+1,j} \qquad \text{Eq. 22}$$

$$b^{(pk+t+1)}_{pk+1} = b^{(pk+t)}_{pk+1} - Reg^{(0)} b^{(pk+t+1)}_{pk+t+1} \qquad \text{Eq. 23}$$

$$b^{(pk+t+1)}_{pk+2} = b^{(pk+t)}_{pk+2} - Reg^{(1)} b^{(pk+t+1)}_{pk+t+1} \qquad \text{Eq. 24}$$

$$b^{(pk+t+1)}_{pk+t} = b^{(pk+t)}_{pk+t} - Reg^{(t-1)} b^{(pk+t+1)}_{pk+t+1} \qquad \text{Eq. 25}$$

using elements of (pk+1)-th row to (pk+t)-th row and (pk+1)-th to (pk+t)-th components of said known vector for j satisfying pk+t+2≦j≦n;

a gateway connected to said memory and provided as a junction for an external apparatus; and a transmitter connected to said memory for transmitting data between said memory and said external apparatus through said gateway; and a main controller for obtaining said unknown vector by executing control of (a) allocating every k rows of said coefficient matrix and every k components of each of said unknown vector and said known vector each of which has a component number equal to a row number of each of every k rows allocated to said memories of said P nodes $\alpha_0$ to $\alpha_{P-1}$ in an order of $\alpha_0$ to $\alpha_{P-1}$ cyclically until all elements of said coefficient matrix and all components of each of said unknown vector and said known vector are completely allocated to said memories of said P nodes $\alpha_0$ to $\alpha_{P-1}$, (b) if n−{n/k}k=0, instructing said P nodes $\alpha_0$ to $\alpha_{P-1}$ to repeat parallel preprocess $PA_1$ to parallel preprocessings $PA_2$ to $PA_k$, parallel updating process PB and a post-eliminating processing PC for every p from p=0 to p={n/k}−1 and, if n−{n/k}k>0, instructing said P nodes $\alpha_0$ to $\alpha_{P-1}$ to repeat parallel preprocessing $PA_1$ to parallel preprocessings $PA_2$ to $PA_k$, parallel updating processing PB and post-eliminating processing PC for every p from p=0 to p={n/k}−1 and, further, to execute parallel preprocessings $PA_1$ to $PA_{n-\{n/k\}k}$, after setting p={n/k}, parallel updating processing PB, after setting a number of pivots equal to n−{n/k}k and post-eliminating processing PC;

said parallel preprocess $PA_1$ including calculating Eq. 1 and Eq. 2 (pk+2≦j≦n) for elements of a (pk+1)-th row of said coefficient matrix and a (pk+1)-th component of said known vector at node $\alpha_u$ (0≦u≦P−1), after said pivot choosing section of said node chooses a pivot represented by Eq. 3, to which (pk+1)-th to (p+1)k-th rows of said coefficient matrix have been allocated, transmitting results of calculation to respective memories of said nodes other than $\alpha_u$ by said transmitter of $\alpha_u$, calculating Eq. 15 at each updating section of said nodes other than $\alpha_u$ for respective elements of allocated rows of said coefficient matrix in parallel to calculation of Eq. 1 and Eq. 2, and calculating Eq. 15 at said updating section of said node $\alpha_u$ if rows other than (pk+1)-th to (p+1)k-th rows of said coefficient matrix are allocated to said node $\alpha_u$;

said parallel preprocess $PA_t$ (2≦t≦k) including calculating Eq. 4, Eq. 5, ..., Eq. 6, Eq. 7 and Eq. 8 for each element of (pk+k)-th row of said coefficient matrix and (pk+t)-th component of said known vector (pk+t≦j≦n) at said preprocessing section $A_t$ (2≦t≦k) of said node $\alpha_u$, calculating Eq. 1 and Eq. 11, after choice of a pivot represented by Eq. 9, at said pivot choosing section for each element of (pk+t)-th row of said coefficient matrix and (pk+t)-th component of said known vector, transmitting results of calculation to respective memories of nodes other than $\alpha_u$, and calculating $$Reg_i^{(t-1)} = a^{(pk)}_{i,pk+t} - \sum_{m=1}^{t-1} Reg_i^{(m-1)} = a^{(pk+m)}_{pk+m,pk+t} \qquad \text{Eq. 26}$$

for allocated rows of said coefficient matrix at respective updating sections B of nodes other than $\alpha_u$ and calculating Eq. 17 at said updating section B of said node $\alpha_u$ if rows other than (pk+1)-th to (p+1)k-th rows of said coefficient matrix have been allocated to said node $\alpha_u$, and said parallel updating process PB including calculating Eq. 15 and Eq. 16 for 1≦i≦pk, (p+1)k+1≦i≦n, (p+1)k+1≦j≦n at respective updating sections B of all nodes to which ((p+1)k+1)-th row to n-th row have been allocated, respectively, while holding variables Reg in said register set; and said post-eliminating processing PC including calculating equations from Eq. 17 to Eq. 25 for each element of (pk+1)-th row to (pk+t)-th row of said coefficient matrix and (pk+1)-th to (pk+t)-th components of said known vector (pk+t+2≦j≦n, t=1, 2, ..., k−1).

5. A data processing machine for the numerical solution of linear equations represented by Ax=b, where A= $(a_{i,j})$(1≦i≦n, 1≦j≦n, and n is an integer larger than 1) is a coefficient matrix of n rows and n columns, x=$(x_1, x_2, \ldots, x_n)^{Trans}$ is an unknown vector and b=$(b_1, b_2, \ldots, b_n)^{Trans}$ is a known vector, comprising:

P clusters $CL_0$ to $CL_{P-1}$, connected with each other through a network, each comprising $P_c$ element processors $PE_1$ to $PE_{Pc}$ connected with each other, a memory, a C gate-way for connecting each cluster with an external apparatus, and a transmitter connected to said memory for transmitting data between each cluster and said external apparatus, each element processor comprising;

a memory;

a pivot choosing section connected to said memory for choosing pivots by searching said coefficient matrix in a row direction and interchanging elements of said coefficient matrix according to a column-interchange method;

a preprocessing section $A_1$ connected to said memory for calculating $$a_{pk+1,j}^{(pk+1)} = a_{pk+1,j}^{(pk)} / a_{pk+1,pk+1}^{(pk)} \qquad \text{Eq. 1}$$

$$b_{pk+1}^{(pk+1)} = b_{pk+1}^{(pk)} / a_{pk+1,pk+1}^{(pk)} \qquad \text{Eq. 2}$$

after said pivot choosing section chooses $$a_{pk+1,pk+1}^{(pk)} \qquad \text{Eq. 3}$$

wherein $a_{i,j}^{(r)}$ denotes (i,j) element of a coefficient matrix obtained when first to r-th columns are eliminated from $A = (a_{i,j})$, $b_i^{(r)}$ denotes i-th component of a known vector obtained when first to r-th columns are eliminated from $A = (a_{i,j})$, k is an integer satisfying $1 \leq k \leq n-1$, if $n - \{n/k\}k = 0$, wherein $\{n/k\}$ denotes a maximum integer not exceeding n/k, p is an integer satisfying $0 \leq p \leq \{n/k\} - 1$, and, if $n - \{n/k\}k > 0$, p is an integer satisfying $0 \leq p \leq \{n/k\}$, and j is an integer satisfying $pk+2 \leq j \leq n$;

2nd to k-th preprocessing sections $A_t$ (t is an integer satisfying $2 \leq t \leq k$) connected to said memory, respectively, each for calculating the following equations:

$$Reg_{pk+t}^{(0)} = a_{pk+t,pk+1}^{(pk)} \qquad \text{Eq. 4}$$

$$Reg_{pk+t}^{(1)} = a_{pk+t,pk+2}^{(pk)} - Reg_{pk+t}^{(0)} Reg_{pk+1,pk+2}^{(pk+1)} \qquad \text{Eq. 5}$$

$$\ldots$$
$$\ldots$$
$$\ldots$$

$$Reg_{pk+t}^{(t-2)} = a_{pk+t,pk+t-1}^{(pk)} - \sum_{m=1}^{t-2} Reg_{pk+2}^{(m-1)} a_{pk+m,pk+t-1}^{(pk+m)} \qquad \text{Eq. 6}$$

$$a_{pk+t,j}^{(pk+t-1)} = a_{pk+t,j}^{(pk)} - \sum_{m=1}^{t-1} Reg_{pk+t}^{(m-1)} a_{pk+m,j}^{(pk+m)} \qquad \text{Eq. 7}$$

$$b_{pk+t}^{(pk+t-1)} = b_{pk+t}^{(pk)} - \sum_{m=1}^{t-1} Reg_{pk+t}^{(m-1)} b_{pk+m}^{(pk+m)} \qquad \text{Eq. 8}$$

wherein j is integer satisfying $pk+t \leq j \leq n$ and, after said pivot choosing section chooses $$a_{pk+t,pk+t}^{(pk+t-1)} \qquad \text{Eq. 9}$$

calculating equations $$a_{pk+t,j}^{(pk+t)} = a_{pk+t,j}^{(pk+t-1)} / a_{pk+t,pk+t}^{(pk+t-1)} \qquad \text{Eq. 10}$$

$$b_{pk+t}^{(pk+t)} = b_{pk+t}^{(pk+t-1)} / a_{pk+t,pk+t}^{(pk+t-1)} \qquad \text{Eq. 11}$$

for each element of a (pk+t)-th row of said coefficient matrix and for a (pk+t)-th component of said known vector wherein j is integer satisfying $pk+t+1 \leq j \leq n$;

an updating section B connected to said memory and comprised of a register set consisting of k registers for registering variables Reg and an arithmetic unit;

said arithmetic unit for calculating the following equations:

$$Reg_i^{(0)} = a_{i,pk+1}^{(pk)} \qquad \text{Eq. 12}$$

$$Reg_i^{(1)} = a_{i,pk+2}^{(pk)} - Reg_i^{(0)} a_{pk+1,pk+2}^{(pk+1)} \qquad \text{Eq. 13}$$

$$\ldots,$$

$$Reg_i^{(k-1)} = a_{i,(p+1)k}^{(pk)} - \sum_{m=1}^{k-1} Reg_i^{(m-1)} a_{pk+m,(p+1)k}^{(pk+m)} \qquad \text{Eq. 14}$$

$$a_{i,j}^{((p+1)k)} = a_{i,j}^{(pk)} - \sum_{m=1}^{k} Reg_i^{(m-1)} a_{pk+m,j}^{(pk+m)} \qquad \text{Eq. 15}$$

$$b_i^{((p+1)k)} = b_i^{(pk)} - \sum_{m=1}^{k} Reg_i^{(m-1)} b_{pk+m}^{(pk+m)} \qquad \text{Eq. 16}$$

for i and j satisfying $(p+1)k+1 \leq i, j \leq n$ while holding variables Reg in said register set; and a main controller $G_P$ for obtaining said unknown vector by executing control of (a) allocating every k rows of said coefficient matrix and every k components of each of said unknown vector and said known vector each of which has a component number equal to a row number of each of every k rows allocated to said memories of said P clusters $CL_0$ to $CL_{P-1}$ in an order of $CL_0$ to $CL_{P-1}$ cyclically until all elements of said coefficient matrix and all components of each of said unknown vector and said known vector are completely allocated to said memories of said P clusters $CL_0$ to $CL_{P-1}$, assuming that each element processor of each cluster is in charge of processing each one of allocated rows of said coefficient matrix and each one of allocated components of said know vector and unknown vector, (b) if $n - \{n/k\}k = 0$, instructing said P clusters $CL_0$ to $CL_{P-1}$ to repeat parallel preprocessing $CLA_1$, parallel preprocessings $CLA_2$ to $CLA_k$ and parallel updating process $PB_c$ from p=0 to p={n/k}-2 and, further, to execute parallel preprocessing $CLA_1$ to parallel preprocessing $CLA_{P-1}$, for p={n/k}-1, and if $n - \{n/k\}k > 0$, instructing said P nodes $\alpha_0$ to $\alpha_{P-1}$ to repeat parallel preprocessing $CLA_k$ to parallel preprocessing $CLA_k$ and parallel updating process $PB_c$ from p=0 to p={n/k}-1 and, further, to execute parallel preprocesses $PA_1$ to $PA_{n-\{n/k\}k}$ for p={n/k}, and (c) instructing each cluster to obtain values of said unknown vector using backward substitution and transmitter of each element processor of each cluster after completion of steps of (a) and (b);

said parallel preprocessing $CLA_1$ including, assuming a cluster $CL_u$ ($0 \leq u \leq P-1$) to which (pk+1)-th to (pk+1)k-th rows have been allocated, allocating each element of (pk+1)-th row of said coefficient matrix and each element of (pk+1)-th component of said known vector to each of said element processors of said cluster $CL_u$ in turn;

calculating Eq. 1 and Eq. 2 ($pk+2 \leq j \leq n$) at respective preprocessing section $A_1$ of said element processors of said cluster $CL_u$ simultaneously after said pivot choosing section of each element processor chooses a pivot represented by Eq. 3;

transmitting results of calculation to said memories of clusters other than $CL_u$ by said transmitter of said cluster $CL_u$;

in parallel to the above equation, calculating Eq. 12 at each updating section B of each element processor of said clusters other than $CL_u$ for each of allocated rows of said coefficient matrix; and if rows other than (pk+1)-th to (p+1)k-th rows have been allocated to said cluster $CL_u$;

said parallel preprocessings $CLA_2$ to $CLA_k$ including allocating each element of (pk+t)-th row ($2 \leq t \leq k$) of said coefficient matrix and each element of (pk+t)-th component of said known vector to each of said element processors of said cluster $CL_u$ in turn;

calculating Eq. 4 to Eq. 8 (pk+t$\leq$j$\leq$n) at each of said preprocessing sections $A_2$ to $A_k$ of said element processor of said cluster $CL_u$ simultaneously;

calculating Eq. 10 to Eq. 11, after choice of a pivot represented by Eq. 9 at said pivot choosing section B of each element processor, at each of said preprocessing sections $A_2$ to $A_k$ (for pk+t+1$\leq$j$\leq$n) of each element processor simultaneously;

transmitting results of calculation to each of said memories of clusters other than $CL_u$ by said transmitter of $CL_u$;

in parallel to the above equation, calculating Eq. 17 for each row of said coefficient matrix stored in each of said memories of clusters other than $CL_u$ at each updating section B of said element processors of clusters other than $CL_u$; and if rows other than (pk+1)-th to (p+1)k-th rows have been allocated to said cluster $CL_u$, $$Reg_i^{(t-1)} = a_{i,pk+t}^{(pk)} - \sum_{m=1}^{t-1} Reg_i^{(m-1)} a_{pk+m,pk+t}^{(pk+m)} \qquad \text{Eq. 17}$$

calculating Eq. 17 at each updating section B of said element processors in said cluster $CL_u$;

parallel updating processing $B_c$ including calculating Eq. 15 and Eq. 16 for $\{(p+1)k+1\}$-th row to n-th row at respective updating sections of all clusters to which $\{(p+1)k+1\}$-th row to n-th row have been allocated, respectively, while holding variables Reg in said register set.

6. A data processing machine for the numerical solution of linear equations represented by Ax=b, where A= ($a_{i,j}$)($1 \leq i \leq n$, $1 \leq j \leq n$, and n is an integer larger than 1) is a coefficient matrix of n rows and n columns, x=($x_1, x_2, \ldots, x_n$)$^{Trans}$ is an unknown vector and b=($b_1, b_2, \ldots, b_n$)$^{Trans}$ is a known vector, comprising:

(A) P clusters $CL_0$ to $CL_{P-1}$, connected with each other through a network, each comprising $P_c$ element processors $PE_1$ to $PE_{Pc}$ connected with each other, a memory, a C gate-way for connecting each cluster with an external apparatus, and a transmitter connected to said memory for transmitting data between each cluster and said external apparatus, each element processor comprising;

a memory;

a pivot choosing section connected to said memory for choosing pivots by searching said coefficient matrix in a row direction and interchanging elements of said coefficient matrix according to a column-interchange method;

a preprocessing section $A_1$ connected to said memory for calculating $$a_{pk+1,j}^{(pk+1)} = a_{pk+1,j}^{(pk)}/a_{pk+1,pk+1}^{(pk)} \qquad \text{Eq. 1}$$

$$b_{pk+1}^{(pk+1)} = b_{pk+1}^{(pk)}/a_{pk+1,pk+1}^{(pk)} \qquad \text{Eq. 2}$$

after said pivot choosing section chooses $$a_{pk+1,pk+1}^{(pk)} \qquad \text{Eq. 3}$$

wherein $a_{i,j}^{(r)}$ denotes (i,j) element of a coefficient matrix obtained when first to r-th columns are eliminated from A=($a_{i,j}$), $b_i^{(r)}$ denotes i-th component of a known vector obtained when first to r-th columns are eliminated from A=($a_{i,j}$), k is an integer satisfying $1 \leq k \leq n-1$, if n−{n/k}k=0, wherein {n/k} denotes a maximum integer not exceeding n/k, p is an integer satisfying $0 \leq p \leq \{n/k\}-1$, and, if n−{n/k}k>0, p is an integer satisfying $0 \leq p \leq \{n/k\}$, and j is an integer satisfying pk+2$\leq$j$\leq$n;

2nd to k-th preprocessing sections $A_t$ (t is an integer satisfying $2 \leq t \leq k$) connected to said memory, respectively, each for calculating the following equations:

$$Reg_{pk+t}^{(0)} = a_{pk+t,pk+1}^{(pk)} \qquad \text{Eq. 4}$$

$$Reg_{pk+t}^{(1)} = a_{pk+t,pk+2}^{(pk)} - Reg_{pk+t}^{(0)} Reg_{pk+1,pk+2}^{(pk+1)} \qquad \text{Eq. 5}$$

$$\ldots$$
$$\ldots$$
$$\ldots$$

$$Reg_{pk+t}^{(t-2)} = a_{pk+t,pk+t-1}^{(pk)} - \sum_{m=1}^{t-2} Reg_{pk+2}^{(m-1)} a_{pk+m,pk+t-1}^{(pk+m)} \qquad \text{Eq. 6}$$

$$a_{pk+t,j}^{(pk+t-1)} = a_{pk+t,j}^{(pk)} - \sum_{m=1}^{t-1} Reg_{pk+t}^{(m-1)} a_{pk+m,j}^{(pk+m)} \qquad \text{Eq. 7}$$

$$b_{pk+t}^{(pk+t-1)} = b_{pk+t}^{(pk)} - \sum_{m=1}^{t-1} Reg_{pk+t}^{(m-1)} b_{pk+m}^{(pk+m)} \qquad \text{Eq. 8}$$

wherein j is integer satisfying pk+t$\leq$j$\leq$n and, after said pivot choosing section chooses $$a_{pk+t,pk+t}^{(pk+t-1)} \qquad \text{Eq. 9}$$

calculating equations $$a_{pk+t,j}^{(pk+t)} = a_{pk+t,j}^{(pk+t-1)}/a_{pk+t,pk+t}^{(pk+t-1)} \qquad \text{Eq. 10}$$

$$b_{pk+t}^{(pk+t)} = b_{pk+t}^{(pk+t-1)}/a_{pk+t,pk+t}^{(pk+t-1)} \qquad \text{Eq. 11}$$

for each element of a (pk+t)-th row of said coefficient matrix and for a (pk+t)-th component of said known vector wherein j is integer satisfying pk+t+1$\leq$j$\leq$n;

an updating section B connected to said memory and comprised of a register set consisting of k registers for registering variables Reg and an arithmetic unit;

said arithmetic unit for calculating the following equations:

$$Reg_i^{(0)} = a_{i,pk+1}^{(pk)} \qquad \text{Eq. 12}$$

$$Reg_i^{(1)} = a_{i,pk+2}^{(pk)} - Reg_i^{(0)} a_{pk+1,pk+2}^{(pk+1)} \qquad \text{Eq. 13}$$

$$\ldots,$$

$$Reg_i^{(k-1)} = a_{i,(p+1)k}^{(pk)} - \sum_{m=1}^{k-1} Reg_i^{(m-1)} a_{pk+m,(p+1)k}^{(pk+m)} \qquad \text{Eq. 14}$$

$$a_{i,j}^{((p+1)k)} = a_{i,j}^{(pk)} - \sum_{m=1}^{k} Reg_i^{(m-1)} a_{pk+m,j}^{(pk+m)} \qquad \text{Eq. 15}$$

$$b_i^{((p+1)k)} = b_i^{(pk)} - \sum_{m=1}^{k} Reg_i^{(m-1)} b_{pk+m}^{(pk+m)} \qquad \text{Eq. 16}$$

using (i, j) elements of i-th row of said coefficient matrix for i satisfying $1 \leq i \leq pk$ or $(p+1)k+1 \leq i \leq n$ and j satisfying $(p+1)k+1 \leq j \leq n$ while holding variables Reg in said register set;

(k−1) postprocessors $C_1$ to $C_{k-1}$ each connected to said pivot choosing section for calculating $$Reg^{(0)} = a_{pk+1,pk+t+1}^{(pk+t)} \qquad \text{Eq. 17}$$

$$Reg^{(1)} = a_{pk+2,pk+t+1}^{(pk+t)} \qquad \text{Eq. 18}$$

$$Reg^{(t-1)} = a_{pk+t,pk+t+1}^{(pk+t)} \qquad \text{Eq. 19}$$

$$a_{pk+1,j}^{(pk+t+1)} = a_{pk+1,j}^{(pk+t)} - Reg^{(0)} a_{pk+t+1,j}^{(pk+t+1)} \qquad \text{Eq. 20}$$

$$a_{pk+2,j}^{(pk+t+1)} = a_{pk+2,j}^{(pk+t)} - Reg^{(1)} a_{pk+t+1,j}^{(pk+t+1)} \qquad \text{Eq. 21}$$

$$a_{pk+t,j}^{(pk+t+1)} = a_{pk+t,j}^{(pk+t)} - Reg^{(t-1)} a_{pk+t+1,j}^{(pk+t+1)} \qquad \text{Eq. 22}$$

$$b_{pk+1}^{(pk+t+1)} = b_{pk+1}^{(pk+t)} - Reg^{(0)} b_{pk+t+1}^{(pk+t+1)} \qquad \text{Eq. 23}$$

$$b_{pk+2}^{(pk+t+1)} = b_{pk+2}^{(pk+t)} - Reg^{(1)} b_{pk+t+1}^{(pk+t+1)} \qquad \text{Eq. 24}$$

$$b_{pk+t}^{(pk+t+1)} = b_{pk+t}^{(pk+t)} - Reg^{(t-1)} b_{pk+t+1}^{(pk+t+1)} \qquad \text{Eq. 25}$$

using elements of (pk+1)-th row to (pk+t)-th row and (pk+1)-th to (pk+t)-th components of said known vector for j satisfying pk+t+2≦j≦n; and
(B) a main controller for obtaining said unknown vector by executing control of:
  (a) allocating every k rows of said coefficient matrix and every k components of each of said unknown vector and said known vector each of which has a component number equal to a row number of each of every k rows allocated to said P clusters $CL_0$ to $CL_{P-1}$, in an order of $CL_0$ to $CL_{P-1}$ cyclically until all elements of said coefficient matrix and all components of each of said unknown vector and said known vector are completely allocated to said memories of said P clusters $CL_0$ to $CL_{P-1}$, assuming that each element processor of each cluster is in charge of processing each one of allocated rows of said coefficient matrix and each one of allocated components of said known vector and unknown vector; and
  (b) if n−{n/k}k=0, instructing said P clusters $CL_0$ to $CL_{P-1}$ to repeat parallel preprocessing $PA_1$ to parallel preprocessings $PA_2$ to $PA_k$ and parallel updating processing $PB_c'$ and post-eliminating processing $PC_c$ for every P from p=0 to p={n/k}−1 and,
  if n−{n/k}k>0, instructing said P clusters $CL_0$ to $CL_{P-1}$ to repeat parallel preprocessing $PA_1$ to parallel preprocessing $PA_2$ to $PA_k$, parallel updating processing $PB_c'$ and post-eliminating processing $PC_c$ for every P from p=0 to p={n/k}−1 and, further, to execute parallel preprocessings $PA_1$ to $PA_{n-\{n/k\}k}$, after setting p={n/k}, parallel updating processing $PB_c'$, after setting a number of pivots equal to n−{n/k}k and post-eliminating processings $PC_1$ to $PC_{n-\{n/k\}k}$;
said parallel preprocessing $PA_1$ including calculating Eq. 1 and Eq. 2 (pk+2≦j≦n) for elements of (pk+1)-th row of said coefficient matrix and (pk+1)-th component of said known vector at cluster $CL_u$ (0≦u≦P−1), after said pivot choosing section of said cluster $CL_u$ chooses a pivot represented by Eq. 3, to which (pk+1)-th to (p+1)k-th rows of said coefficient matrix have been allocated, transmitting results of calculation to respective memories of clusters other than $CL_u$ by said transmitter of $CL_u$,
calculating Eq. 15 at each updating section B of said clusters other than $CL_u$ for respective elements of allocated rows of said coefficient matrix in parallel to calculation of Eq. 1 and Eq. 2, and
calculating Eq. 15 at said updating section B of said cluster $CL_u$ if rows other than (pk+1)-th to (p+1)k-th rows of said coefficient matrix are allocated to said cluster $CL_u$;
said parallel preprocessings $PA_t$ (2≦t≦k) including
  calculating Eq. 4, Eq. 5, ..., Eq. 6, Eq. 7 and Eq. 8 for each element of (pk+k)-th row of said coefficient matrix and (pk+t)-th component of said known vector (pk+t≦j≦n) at said preprocessing section $A_t$ (2≦t≦k) of said clusters $CL_u$,
  calculating Eq. 1 and Eq. 11, after choice of a pivot represented by Eq. 9, at said pivot choosing section for each element of (pk+t)-th row of said coefficient matrix and (pk+t)-th component of said known vector, transmitting results of calculation to respective memories of clusters other than $CL_u$, and
  calculating $$Reg_i^{(t-1)} = a_{i,pk+t}^{(pk)} - \sum_{m=1}^{t-1} Reg_i^{(m-1)} a_{pk+m,pk+t}^{(pk+m)} \qquad \text{Eq. 26}$$

for allocated rows of said coefficient matrix at respective updating sections B of clusters other than $CL_u$ and calculating Eq. 17 at said updating section B of said cluster $CL_u$ if rows other than (pk+1)-th to (p+1)k-th rows of said coefficient matrix have been allocated to said cluster $CL_u$, and
  said parallel updating processing $PB_c'$ including calculating Eq. 15 and Eq. 16 for 1≦i≦pk, (p+1)k+1≦i≦n, (p+1)k+1≦j≦n at respective updating sections B of all nodes to which ((p+1)k+1)-th row to n-th row have been allocated, respectively, while holding variables Reg in said register set; and
  said post-eliminating processing $PC_c$ including calculating equations from Eq. 17 to Eq. 25 for each element of (pk+1)-th to (pk+t)-th row of said coefficient matrix and (pk+1)-th to (pk+t)-th components of said known vector (pk+t+2≦j≦n, t=1, 2, ..., k−1).

7. Parallel elimination method for numerical solution of linear equations represented by Ax=b wherein A=($a_{i,j}$)(1≦i≦n, 1≦j≦n, and n is an integer larger than 1) is a coefficient matrix of n columns and n rows, x=($x_1, x_2, ..., x_n$)$^{Trans}$ is an unknown vector and b=($b_1, b_2, ..., b_n$)$^{Trans}$ is a known vector with use of a parallel computer consisting of first to C-th clusters (C is an integer larger than 1) connected by a network, each cluster consisting of first to $P_c$-th element processors ($P_c$ is an integer larger than 1) and a memory common to said first to $P_c$-th element processors, comprising
(A) data allocation step for allocating every $P_c$ rows of a coefficient matrix $A^{(r)} = (a_{i,j}^{(r)})$ and every $P_c$ components of each of known vector $b^{(r)}$ and unknown vector $x^{(r)}$, component numbers of said $P_c$ components corresponding to row numbers of said $P_c$ rows one to one, to respective memories of said clusters in turn wherein said coefficient matrix $A^{(r)}$, known vector $b^{(r)}$ and unknown vector $x^{(r)}$ denote coefficient matrix, known vector and unknown vector obtained by eliminating first to r-th columns of the coefficient matrix A−($a_{i,j}$), respectively;
  repeating said data allocation step until all rows of the coefficient matrix $A^{(r)}$ and all components of each of the known vector $b^{(r)}$ and unknown vector $x^{(r)}$ have been allocated, and, further, allocating said $P_c$ rows of the coefficient matrix $A^{(r)}$ and $P_c$ components of each of the known and unknown vectors $b^{(r)}$ and $x^{(r)}$ to $P_c$ element processors in each cluster;
(B) fundamental pre-elimination step for repeating a series of following operations from l=3 to l=$P_c$;
  choosing a pivot represented by Eq. 1 at the first element processor of the corresponding cluster $$a_{Pck+1,Pck+1}^{(Pck)} \qquad \text{Eq. 1}$$

wherein, if $n-\{n/P_c\}P_c>0$, wherein $\{n/P_c\}$ denotes a maximum integer not exceeding $n/P_c$, k is an integer satisfying $0 \leq k \leq \{n/P_c\}$, and, if $n-\{n/P_c\}P_c=0$, k is an integer satisfying $0 \leq k \leq \{n/P_c\}-1$; calculating Eq. 2 and Eq. 3

$$a_{Pck+1,j}^{(Pck+1)} = a_{Pck+1,j}^{(Pck)} / a_{Pck+1,Pck+1}^{(Pck)} \qquad \text{Eq. 2}$$

$$b_{Pck+1}^{(Pck+1)} = b_{Pck+1}^{(Pck)} / a_{Pck+1,Pck+1}^{(Pck)} \qquad \text{Eq. 3}$$

and transmitting calculation results to respective memories of clusters other than those to which elements processors in charge of $(P_ck+2)$-th to n-th rows of the coefficient matrix belong and an element processor in charge of a $(P_ck+1)$-th row belongs, calculating Eq. 4 for the i-th row at the i-th element processor wherein $P_ck+2 \leq i \leq n$;

$$t_i^{(1)} = a_{i,Pck+2}^{(Pck)} - a_{i,Pck+2}^{(Pck)} \, a_{Pck+1,Pck+2}^{(Pck+1)} \qquad \text{Eq. 4}$$

calculating Eq. 5 and Eq. 6 at the second element processor of the cluster $$a_{Pck+2,j}^{(Pck+2)} = a_{Pck+2,j}^{(Pck)} - a_{Pck+2,Pck+1}^{(Pck)} \, a_{Pck+1,j}^{(Pck+1)} \qquad \text{Eq. 5}$$

$$b_{Pck+2}^{(Pck+1)} = b_{Pck+2}^{(Pck)} - a_{Pck+2,Pck+1}^{(Pck)} \, b_{Pck+1}^{(Pck+1)} \qquad \text{Eq. 6}$$

choosing a pivot represented by Eq. 7;

$$a_{Pck+2,Pck+2}^{(Pck+1)} \qquad \text{Eq. 7}$$

calculating Eq. 8 and Eq. 9;

$$a_{Pck+2,j}^{(Pck+2)} = a_{Pck+2,j}^{(Pck+1)} / a_{Pck+2,Pck+2}^{(Pck+1)} \qquad \text{Eq. 8}$$

$$b_{Pck+2}^{(Pck+2)} = b_{Pck+2}^{(Pck+1)} / a_{Pck+2,Pck+2}^{(Pck+1)} \qquad \text{Eq. 9}$$

transmitting calculation results of Eq. 8 and Eq. 9 to memories of clusters other than those to which element processors in charge of the $(P_ck+3)$-th to n-th rows of the coefficient matrix belong and an element processor in charge of the $(P_ck+2)$-th row belongs, calculating Eq. 10 for each of the $(P_ck+1)$-th to n-th rows at each of element processors in charge of $(P_ck+1)$-th to n-th rows, respectively;

$$t_1^{(l-1)} = a_{i,Pck+l}^{(Pck)} - a_{i,Pck+1}^{(Pck)} \, a_{ck+1,Pck+l}^{(Pck+1)} - \sum_{m=2}^{l-1} t_i^{(m-1)} a_{Pck+m,Pck+l}^{(Pck+m)} \qquad \text{Eq. 10}$$

calculating Eq. 11 and Eq. 12 at the l-th element processor of the cluster;

$$a_{Pck+l,j}^{(Pck+l-1)} = a_{Pck+l,j}^{(Pck)} - a_{Pck+l,Pck+1}^{(Pck)} a_{ck+1,j}^{(Pck+1)} - \sum_{m=2}^{l-1} t_{Pck+l}^{(m-1)} a_{Pck+m,j}^{(Pck+m)} \qquad \text{Eq. 11}$$

$$b_{Pck+l}^{(Pck+l-1)} = a_{Pck+l}^{(Pck)} - a_{Pck+l,Pck+1}^{(Pck)} b_{Pck+1}^{(Pck+1)} - \sum_{m=2}^{l-1} t_{Pck+l}^{(m-1)} b_{Pck+m}^{(Pck+m)} \qquad \text{Eq. 12}$$

choosing a pivot represented by Eq. 13 and calculating Eq. 14 and Eq. 15;

$$a_{Pck+l,Pck+l}^{(Pck+l-1)} \qquad \text{Eq. 13}$$

$$a_{Pck+l,j}^{(Pck+l)} = a_{Pck+l,j}^{(Pck+l-1)} / a_{Pck+l,Pck+l}^{(Pck+l-1)} \qquad \text{Eq. 14}$$

$$b_{Pck+l}^{(Pck+l)} = b_{Pck+l}^{(Pck+l-1)} / a_{Pck+l,Pck+l}^{(Pck+l-1)} \qquad \text{Eq. 15}$$

transmitting results of calculation of Eq. 14 and Eq. 15 to memories of clusters other than those to which element processors in charge of $(P_ck+l+1)$-th row to n-th row belong and an element processor in charge of $(P_ck+l)$-th row belongs;

(C) multi-pivot elimination step of calculating Eq. 16 and Eq. 17 for each of $((k+1)P_c+1)$-th to n-th rows at each of elements processors in charge of $[(k+1)P_c+1]$-th to n-th rows;

$$a_{i,j}^{((k+1)Pc)} = a_{i,j}^{(Pck)} - \qquad \text{Eq. 16}$$

$$a_{i,Pck+1}^{(Pck)} a_{ck+1,j}^{(Pck+1)} \sum_{m=2}^{Pc} t_i^{(m-1)} a_{ck+m,j}^{(Pck+m)}$$

$$b_i^{((k+1)Pc)} = b_i^{(Pck)} - \qquad \text{Eq. 17}$$

$$a_{i,Pck+1}^{(Pck)} b_{Pck+1}^{(Pck+1)} = \sum_{m=2}^{Pc} t_i^{(m-1)} b_{Pck+m}^{(Pck+m)}$$

(D) repetition elimination judgment step of judging whether or not a series of operation executing said fundamental pre-elimination step in unit of cluster in turn and, thereafter, executing said multi-pivot elimination step have been repeated by $\{n/P_c\}$ times;

(E) remainder elimination step of executing said fundamental pre-elimination step for the $([n/P_c]P_c+1)$-th to n-th rows of the coefficient matrix at element processors in charge of the $([n/P_c]P_c+1)$-th to n-th row, respectively, if $n-\{n/P_c\}P_c>0$ when it is judged in said repetition elimination judgement step that said series of operation have been completed; and unknown vector generation step for obtaining said unknown vector using results of steps (A) through (E).

8. The parallel elimination method as claimed in claim 7, said unknown vector generation step comprises (F) fundamental back-substitution step of setting $$x_i = b_i^{(n)} \qquad \text{Eq. 18}$$

at an element processor in charge of i-th row;

(G) fundamental back transmission step of transmitting $x_i$ to the memory of the cluster to which element processors in charge of first to (i–1)-th components of the unknown vector;

(H) fundamental back calculation step of calculating Eq. 19 for components in charge at element processors in charge of first to (i–1)-th components;

$$b_i^{(r+1)} = b_i^{(r)} - a_{i,j}^{(i)} x_j \qquad \text{Eq. 19}$$

and (I) repetition back procession step of calculating Eq. 20 by said fundamental back-substitution step in an element processor in charge of (n–l+1)-th component of each of the known and unknown vectors;

$$x_{n-l+1} = b_{n-l+1}^{(n)} \qquad \text{Eq. 20}$$

repeating a series of operation executing calculation by said fundamental back calculation at respective element processors in charge of first to (n–l)-th components for l from 1 to (n–1) after transmitting $x_{n-l+1}$ to a memory of a cluster to which element processors in charge of first to (n–l)-th components of each of the known and unknown vectors; and finally setting Eq. 21 by said fundamental back-substitution step $$x_i = b_i^{(n)} \qquad \text{Eq 21.}$$

9. The parallel elimination method as claimed in claim 7 wherein, upon choosing a pivot, the following steps are executed:

searching a non-zero element in an increase direction in the row number from a zero diagonal element when found at an element processor in charge of the row to which said zero diagonal element belongs;

announcing the row number of the non-zero element found at the above step to other element processors;

interchanging the non-zero element of the coefficient matrix having the row number having been announced with an element having a row number equal to that of said zero diagonal element; and interchanging a component of the unknown vector having a component number equal to the row number having been announced with another component of the unknown vector having a component number equal to the row number of the non-zero diagonal element.

10. The parallel elimination method as claimed in claim 7, wherein, upon choosing a pivot, the following steps are executed:

searching an element having a maximum absolute value in an increase direction in the row number from a given diagonal element of the coefficient matrix at an element processor in charge of the row to which said given diagonal element belongs;

announcing the row number of the element found at the above searching to element processors other than said element processor;

interchanging an element having the row number announced with an element having the row number of said given diagonal number for each row at each element processor in charge of said each row;

interchanging a component of the unknown vector having a component number equal to the row number announced with another component of the unknown vector having a component number equal to the row number of the given diagonal element at element processors in charge of the above two components of the unknown vector, respectively.

11. Parallel elimination method for numerical solution of linear equations represented by $Ax=b$ wherein $A=(a_{i,j})$ ($1 \leq i \leq n$, $1 \leq j \leq n$, and n is an integer larger than 1) is a coefficient matrix of n columns and n rows, $x=(x_1, x_2, \ldots, x_n)^{Trans}$ is an unknown vector and $b=(b_1, b_2, \ldots, b_n)^{Trans}$ is a known vector with use of a parallel computer consisting of first to C-th clusters (C is an integer larger than 1) connected by a network, each cluster consisting of first to $P_c$-th element processors ($P_c$ is an integer larger than 1) and a memory common to said first to $P_c$-th element processors, comprising (A) data allocation step for allocating every $P_c$ rows of a coefficient matrix $A^{(r)}=(a_{ij}^{(r)})$ and every $P_c$ components of each of known vector $b^{(r)}$ and unknown vector $x^{(r)}$, component numbers of said $P_c$ components corresponding to row numbers of said $P_c$ rows one to one, to respective memories of said clusters in turn wherein said coefficient matrix $A^{(r)}$, known vector $b^{(r)}$ and unknown vector $x^{(r)}$ denote coefficient matrix, known vector and unknown vector obtained by eliminating first to r-th columns of the coefficient matrix $A=(a_{ij})$, respectively;

repeating said data allocation step until all rows of the coefficient matrix $A^{(r)}$ and all components of each of the known vector $b^{(r)}$ and unknown vector $x^{(r)}$ have been allocated, and, further, allocating said $P_c$ rows of the coefficient matrix $A^{(r)}$ and $P_c$ components of each of the known and unknown vectors $b^{(r)}$ and $x^{(r)}$ to $P_c$ element processors in each cluster;

(B) fundamental pre-elimination step for repeating a series of following operations from $l=3$ to $l=P_c$;

choosing a pivot represented by Eq. 1 at the first element processor of the corresponding cluster $$a_{Pck+1,Pck+1}^{(Pck)} \qquad \text{Eq. 1}$$

wherein, if $n-\{n/P_c\}P_c>0$, wherein $\{n/P_c\}$ denotes a maximum integer not exceeding $n/P_c$, k is an integer satisfying $0 \leq k \leq \{n/P_c\}$, and, if $n-\{n/P_c\}P_c=0$, k is an integer satisfying $0 \leq k \leq \{n/P_c\}-1$; calculating Eq. 2 and Eq. 3

$$a_{Pck+1,j}^{(Pck+1)} = a_{Pck+1,j}^{(Pck)}/a_{Pck+1,Pck+1}^{(Pck)} \qquad \text{Eq. 2}$$

$$b_{Pck+1}^{(Pck+1)} = b_{Pck+1}^{(Pck)}/a_{Pck+1,Pck+1}^{(Pck)} \qquad \text{Eq. 3}$$

and transmitting calculation results to respective memories of clusters other than those to which element processors in charge of $(P_ck+2)$-th to n-th rows of the coefficient matrix belong and an element processor in charge of a $(P_ck+1)$-th row belongs, calculating Eq. 4 for the i-th row at the i-th element processor wherein $P_ck+2 \leq i \leq n$;

$$t_i^{(1)} = a_{i,Pck+2}^{(Pck)} - a_{i,Pck+2}^{(Pck)} \, a_{Pck+1,Pck+2}^{(Pck+1)} \qquad \text{Eq. 4}$$

calculating Eq. 5 and Eq. 6 at the second element processor of the cluster $$a_{Pck+2,j}^{(Pck+2)} = a_{Pck+2,j}^{(Pck)} - a_{Pck+2,Pck+1}^{(Pck)} \, a_{Pck+1,j}^{(Pck+1)} \qquad \text{Eq. 5}$$

$$b_{Pck+2}^{(Pck+1)} = b_{Pck+2}^{(Pck)} - a_{Pck+2,Pck+1}^{(Pck)} \, b_{Pck+1}^{(Pck+1)} \qquad \text{Eq. 6}$$

choosing a pivot represented by Eq. 7;

$$a_{Pck+2,Pck+2}^{(Pck+1)} \qquad \text{Eq. 7}$$

calculating Eq. 8 and Eq. 9;

$$a_{Pck+2,j}^{(Pck+2)} = a_{Pck+2,j}^{(Pck+1)}/a_{Pck+2,Pck+2}^{(Pck+1)} \qquad \text{Eq. 8}$$

$$b_{Pck+2}^{(Pck+2)} = b_{Pck+2}^{(Pck+1)}/a_{Pck+2,Pck+2}^{(Pck+1)} \qquad \text{Eq. 9}$$

transmitting calculation results of Eq. 8 and Eq. 9 to memories of clusters other than those to which element processors in charge of the $(P_ck+3)$-th to n-th rows of the coefficient matrix belong and an element processor in charge of the $(P_ck+2)$-th row belongs, calculating Eq. 10 for each of the $(P_ck+1)$-th to n-th rows at each of element processors in charge of $(P_ck+1)$-th to n-th rows, respectively;

$$t_i^{(l-1)} = a^{(Pck)}_{i,Pck+l} - \qquad \text{Eq. 10}$$

$$a_{i,Pck+1}^{(Pck)} a_{Pck+1,Pck+l}^{(Pck+1)} - \sum_{m=2}^{l-1} t_i^{(m-1)} a_{Pck+m,Pck+l}^{(Pck+m)}$$

calculating Eq. 11 and Eq. 12 at the l-th element processor of the cluster;

$$a_{Pck+l,j}^{(Pck+l-1)} = a^{(Pck)}_{Pck+l,j} - \qquad \text{Eq. 11}$$

$$a_{Pck+l,Pck+1}^{(Pck)} a_{Pck+1,j}^{(Pck+1)} - \sum_{m=2}^{l-1} t_{Pck+l}^{(m-1)} a_{Pck+m,j}^{(Pck+m)}$$

$$b_{Pck+l}^{(Pck+l-1)} = a^{(Pck)}_{Pck+l} - \qquad \text{Eq. 12}$$

$$a_{Pck+l,Pck+1}^{(Pck)} b_{Pck+1}^{(Pck+1)} - \sum_{m=2}^{l-1} t_{Pck+l}^{(m-1)} b_{Pck+m}^{(Pck+m)}$$

choosing a pivot represented by Eq. 13 and calculating Eq. 14 and Eq. 15;

$$a_{Pck+l,Pck+l}^{(Pck+l-1)} \qquad \text{Eq. 13}$$

$$a_{Pck+l,j}^{(Pck+l)} = a_{Pck+l,j}^{(Pck+l-1)} / a_{Pck+l,Pck+l}^{(Pck+l-1)} \qquad \text{Eq. 14}$$

$$b_{Pck+l}^{(Pck+l)} = b_{Pck+l}^{(Pck+l-1)} / a_{Pck+l,Pck+l}^{(Pck+l-1)} \qquad \text{Eq. 15}$$

transmitting results of calculation of Eq. 14 and Eq. 15 to memories of clusters other than those to which element processors in charge of $(P_ck+l+1)$-th row to n-th row belong and an element processor in charge of $(P_ck+l)$-th row belongs;

(C) multi-pivot elimination step of calculating Eq. 16 and Eq. 17 for each of $((k+1)P_c+1)$-th to n-th rows at each of elements processors in charge of $[(k+1)P_c+1]$-th to n-th rows;

$$a_{i,j}^{((k+1)Pc)} = a_{i,j}^{(Pck)} - \qquad \text{Eq. 16}$$

$$a_{i,Pck+1}^{(Pck)} a_{Pck+1,j}^{(Pck+1)} = \sum_{m=2}^{Pc} t_i^{(m-1)} a_{Pck+m,j}^{(Pck+m)}$$

$$b_i^{((k+1)Pc)} = b_i^{(Pck)} - \qquad \text{Eq. 17}$$

$$a_{i,Pck+1}^{(Pck)} b_{Pck+1}^{(Pck+1)} = \sum_{m=2}^{Pc} t_i^{(m-1)} b_{Pck+m}^{(Pck+m)}$$

(D) fundamental post-elimination step of calculating Eq. 18 and Eq. 19 at each element processor;

$$a_{i,j}^{(r+1)} = a_{i,j}^{(r)} - a_{i,i+1}^{(r)} a_{i+1,j}^{(r+1)} \qquad \text{Eq. 18}$$

$$b_i^{(r+1)} = b_i^{(r)} - a_{i,i+1}^{(r)} b_{i+1}^{(r+1)} \qquad \text{Eq. 19}$$

(E) post-elimination procession step of repeating the following operation at respective element processors in charge of $(P_ck+1)$-th to $(P_ck+q)$-th rows of the coefficient matrix from q=1 to q=$P_c$−1, said operation executing said fundamental post-elimination step for $(P_ck+1)$-th to $(P_ck+q)$-th rows of the coefficient matrix simultaneously after setting l=−w+q+1 in each of Eq. 18 and Eq. 19 for $(P_ck+w)$-th row ($1 \leq w \leq q$);

(F) repetition elimination judgment step of judging whether or not a series of operations have been repeated by $\{n/P_c\}$ times, said series of operations executing said fundamental pre-elimination step for every $P_c$ rows and, then, executing said multi-pivot elimination procession step and post-elimination procession step at each cluster;

(G) remainder elimination step of executing, if n−{n/$P_c$}$P_{ac}$> 0 at the time when it is judged that said series of operations have been repeated by {n/$P_{ac}$} times at repetition elimination step, said fundamental pre-elimination step, said multi-pivot elimination step and post-elimination procession step for remaining $([n/P_c]P_c+1)$-th to n-th rows of the coefficient matrix at respective element processors in charge of them (H) unknown vector generation step for obtaining said unknown vector using results of steps (A) through (G).

12. The parallel elimination method as claimed in claim 11 wherein, upon choosing a pivot, the following steps are executed;

searching a non-zero element in an increase direction in the row number from a zero diagonal element when found at an element processor in charge of the row to which said zero diagonal element belongs;

announcing the row number of the non-zero element found at the above step to other element processors;

interchanging the non-zero element of the coefficient matrix having the row number having been announced with an element having a row number equal to that of said zero diagonal element; and interchanging a component of the unknown vector having a component number equal to the row number having been announced with another component of the unknown vector having a component number equal to the row number of the non-zero diagonal element.

13. The parallel elimination method as claimed in claim 12 wherein, upon choosing a pivot, the following steps are executed;

searching an element having a maximum absolute value in an increase direction in the row number from a given diagonal element of the coefficient matrix at an element processor in charge of the row to which said zero diagonal element belongs;

announcing the row number of the element found at the above searching to element processors other than said element processor;

interchanging an element having the row number announced with an element having a row number of said given diagonal number for each row at each element processor in charge of said each row;

interchanging a component of the unknown vector having a component number equal to the row number announced with another component of the unknown vector having a component number equal to the row number of the given diagonal element at element processors in charge of the above two components of the unknown vector, respectively.

* * * * *